United States Patent
Watanabe

(10) Patent No.: US 12,371,557 B2
(45) Date of Patent: Jul. 29, 2025

(54) AQUEOUS DISPERSION OF ACRYLIC URETHANE COMPOSITE RESIN PARTICLES, AQUEOUS COATING COMPOSITION, METHOD OF FORMING COATING FILM, AND METHOD OF FORMING MULTILAYER COATING FILM

(71) Applicant: KANSAI PAINT CO., LTD., Hyogo (JP)

(72) Inventor: Kazuya Watanabe, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 51 days.

(21) Appl. No.: 18/206,838

(22) Filed: Jun. 7, 2023

(65) Prior Publication Data

US 2024/0026144 A1 Jan. 25, 2024

(30) Foreign Application Priority Data

Jul. 22, 2022 (JP) .................................. 2022-116798

(51) Int. Cl.
| | | |
|---|---|---|
| *C08L 33/08* | (2006.01) | |
| *B05D 7/00* | (2006.01) | |
| *C09D 133/08* | (2006.01) | |

(52) U.S. Cl.
CPC .............. *C08L 33/08* (2013.01); *B05D 7/576* (2013.01); *C09D 133/08* (2013.01); *C08L 2207/53* (2013.01)

(58) Field of Classification Search
CPC combination set(s) only.
See application file for complete search history.

(56) References Cited

U.S. PATENT DOCUMENTS

2016/0333219 A1\* 11/2016 Kanda .................. C09D 133/06

FOREIGN PATENT DOCUMENTS

| JP | 4860072 B2 * | 1/2012 |
| JP | 4860073 B2 * | 1/2012 |
| JP | 2015174958 A | 10/2015 |

\* cited by examiner

*Primary Examiner* — Peter A Salamon
(74) *Attorney, Agent, or Firm* — MARSHALL, GERSTEIN & BORUN LLP

(57) ABSTRACT

The present invention is directed to providing an aqueous dispersion of acrylic urethane composite resin (AB) particles that, when used as a constituent component of an aqueous coating composition, provides the aqueous coating composition with excellent storage stability, the aqueous coating composition being capable of forming a coating film with excellent abrasion resistance, chipping resistance, and glass adhesiveness even when the aqueous coating composition is cured at a relatively low temperature. The aqueous dispersion of acrylic urethane composite resin (AB) particles including a urethane resin portion (A) produced from constituent components including a compound (a1) having a secondary amino group and an alkoxysilyl group and an isocyanate group-containing urethane prepolymer (a2), and an acrylic resin portion (B) produced from constituent components including a compound (b) having a polymerizable unsaturated group and having no hydroxyl group or one hydroxyl group.

11 Claims, No Drawings

# AQUEOUS DISPERSION OF ACRYLIC URETHANE COMPOSITE RESIN PARTICLES, AQUEOUS COATING COMPOSITION, METHOD OF FORMING COATING FILM, AND METHOD OF FORMING MULTILAYER COATING FILM

TECHNICAL FIELD

The present invention relates to an aqueous dispersion of acrylic urethane composite resin particles, an aqueous coating composition, a method of forming a coating film, and a method of forming a multilayer coating film.

BACKGROUND ART

In automobile coating, a method for forming a multilayer coating film through a 3-coat 2-bake (3C2B) scheme is widely used, which includes applying an electrodeposition coating material onto an object to be coated, then applying an intermediate coating material thereon, baking and curing, applying an aqueous base coating material, preheating, and then applying a clear coating material thereon and baking and curing. However, in recent years, from the perspective of energy conservation, the step of baking and curing after application of the intermediate coating material is omitted, and a 3-coat 1-bake (3C1B) scheme is spreading, which includes applying the electrodeposition coating material onto the object to be coated, then applying an aqueous intermediate coating material thereon, preheating as required, then applying an aqueous base coating material, preheating, and then applying a clear coating material, and baking and curing.

Recently, it has been required to lower a heating temperature in the baking and curing step to further reduce an energy to be used.

However, in a case where the heating temperature is low, chipping resistance against a chipping phenomenon in which a coating film is peeled off due to collision of pebbles with a coated surface of an automobile body outer panel and glass adhesiveness which is resistance against a load applied to an adhesion portion between glass and the coating film are insufficient in some cases.

In addition, studies have been made to further reduce the number of coating steps in a portion of an automobile body to be coated, the portion having an appearance demand which is not high. For example, a 1-coat 1-bake (1C1B) scheme has been studied, which includes applying an electrodeposition coating material onto an object to be coated, then applying an aqueous base coating material, preheating, and baking and curing. In this case, a coating film of an uppermost layer is a base coating film formed of the aqueous base coating material, and thus, the base coating film is required to have high coating film performance such as abrasion resistance.

However, a coating composition having high coating film performance even at a relatively low heating temperature generally has high reactivity, which may lead to insufficient storage stability.

JP 2015-174958 A describes an aqueous coating composition including (A) an aqueous resin, (B) a melamine resin, and (C) a weak acid catalyst, in which the aqueous resin (A) has a hydroxyl value from 80 mg KOH/g to 200 mg KOH/g in terms of resin solid content, the melamine resin (B) has an average imino group amount of 1.0 or greater and an average methylol group amount of 0.5 or greater per melamine nucleus, and the mass ratio of the aqueous resin (A) to the melamine resin (B) is from 90/10 to 60/40 in terms of solid content, and a content of the weak acid catalyst (C) is from 0.1 to 10.0 parts by mass with respect to 100 parts by mass of the total of the aqueous resin (A) and the melamine resin (B), and describes that this aqueous coating composition is excellent in low-temperature curability and storage stability as compared with coating compositions in the related art.

In the technique described in JP 2015-174958 A, the produced aqueous coating composition is excellent in low-temperature curability and storage stability, but a formed coating film may be insufficient in abrasion resistance, chipping resistance, and glass adhesiveness.

SUMMARY OF THE DISCLOSURE

An object of the present invention is to provide an aqueous dispersion of acrylic urethane composite resin particles which, when used as a constituent component of an aqueous coating composition, provides the aqueous coating composition with excellent storage stability, the aqueous coating composition being capable of forming a coating film with excellent abrasion resistance, chipping resistance, and glass adhesiveness even when the aqueous coating composition is cured at a relatively low temperature.

As a result of intensive studies to achieve the above object, the present inventors have found that the above object can be achieved with an aqueous dispersion of acrylic urethane composite resin (AB) particles including: a urethane resin portion (A) produced from constituent components including a compound (a1) having a secondary amino group and an alkoxysilyl group and an isocyanate group-containing urethane prepolymer (a2); and an acrylic resin portion (B) produced from constituent components including a compound (b) having a polymerizable unsaturated group and having no hydroxyl group or one hydroxyl group, in which the compound (a1) having a secondary amino group and an alkoxysilyl group is produced from constituent components including a compound (a11) containing a primary amino group and an alkoxysilyl group and a polymerizable unsaturated group-containing compound (a12), and the isocyanate group-containing urethane prepolymer (a2) is produced from constituent components including a polyisocyanate component (a21) and a polyol component (a22).

That is, the present invention relates to the following <1> to <13>.

<1>

An aqueous dispersion of acrylic urethane composite resin (AB) particles including:
 a urethane resin portion (A) produced from constituent components including a compound (a1) having a secondary amino group and an alkoxysilyl group and an isocyanate group-containing urethane prepolymer (a2); and
 an acrylic resin portion (B) produced from constituent components including a compound (b) having a polymerizable unsaturated group and having no hydroxyl group or one hydroxyl group, in which
 the compound (a1) having a secondary amino group and an alkoxysilyl group is produced from constituent components including a compound (a11) containing a primary amino group and an alkoxysilyl group and a polymerizable unsaturated group-containing compound (a12), and the isocyanate group-containing urethane prepolymer (a2) is produced from constituent components including a polyisocyanate component (a21) and a polyol component (a22).

<2>
The aqueous dispersion of acrylic urethane composite resin (AB) particles according to <1>, in which the compound (a11) containing a primary amino group and an alkoxysilyl group includes a compound (a11-1) containing a primary amino group, a secondary amino group, and an alkoxysilyl group.
<3>
The aqueous dispersion of acrylic urethane composite resin (AB) particles according to <1> or <2>, in which the polymerizable unsaturated group-containing compound (a12) includes (meth)acrylate.
<4>
The aqueous dispersion of acrylic urethane composite resin (AB) particles according to any one of <1> to <3>, in which the polyisocyanate component (a21) includes an alicyclic polyisocyanate compound (a21-1).
<5>
The aqueous dispersion of acrylic urethane composite resin (AB) particles according to any one of <1> to <4>, in which the polyol component (a22) includes at least one selected from the group consisting of polycarbonate polyol (a22-1) and polyether polyol (a22-2).
<6>
The aqueous dispersion of acrylic urethane composite resin (AB) particles according to any one of <1> to <5>, having a core-shell structure consisting of a shell portion of the urethane resin portion (A) and a core portion of the acrylic resin portion (B).
<7>
An aqueous coating composition containing the aqueous dispersion of acrylic urethane composite resin (AB) particles according to any one of <1> to <6>.
<8>
The aqueous coating composition according to <7>, wherein a content of the acrylic urethane composite resin (AB) particles is in a range from 10 parts by mass to 70 parts by mass based on 100 parts by mass of a total resin solid content in the aqueous coating composition.
<9>
The aqueous coating composition according to <7> or <8>, further containing at least one resin selected from the group consisting of an acrylic resin (C) and a polyester resin (D).
<10>
The aqueous coating composition according to any one of <7> to <9>, further containing a curing agent (E).
<11>
A method of forming a coating film, the method including:
 (I-1) applying the aqueous coating composition according to any one of <7> to <10> onto an object to be coated to form an uncured colored coating film; and
 (I-2) heating and curing the uncured colored coating film formed in the step (I-1).
<12>
A method of forming a multilayer coating film, the method including:
 (II-1) applying the aqueous coating composition according to any one of <7> to <10> onto an object to be coated to form an uncured intermediate coating film;
 (II-2) applying a basecoat coating composition onto the uncured intermediate coating film formed in the step (II-1) to form an uncured basecoat coating film;
 (II-3) applying a clearcoat coating composition onto the uncured basecoat coating film formed in the step (II-2) to form an uncured clearcoat coating film; and
 (II-4) heating and curing the uncured intermediate coating film formed in the step (II-1), the uncured basecoat coating film formed in the step (II-2), and the uncured clearcoat coating film formed in the step (II-3) at a time.
<13>
A method of forming a multilayer coating film, the method including:
 (IV-1) applying the aqueous coating composition according to any one of <7> to <10> onto an object to be coated to form an uncured intermediate coating film;
 (IV-2) applying the aqueous coating composition according to any one of <7> to <10> onto the uncured intermediate coating film formed in the step (IV-1) to form an uncured basecoat coating film;
 (IV-3) applying a clearcoat coating composition onto the uncured basecoat coating film formed in the step (IV-2) to form an uncured clearcoat coating film; and
 (IV-4) heating and curing the uncured intermediate coating film formed in the step (IV-1), the uncured basecoat coating film formed in the step (IV-2), and the uncured clearcoat coating film formed in the step (IV-3) at a time.

According to the aqueous dispersion of acrylic urethane composite resin (AB) particles of the present invention, in a case where it is used as a constituent component of an aqueous coating composition, the aqueous coating composition has excellent storage stability, and even in a case where the aqueous coating composition is cured at a relatively low temperature, it is possible to form a coating film having excellent abrasion resistance, chipping resistance, and glass adhesiveness.

DETAILED DESCRIPTION OF EMBODIMENTS

The present invention is described in detail below through embodiments, but these embodiments are merely examples of preferred embodiments, and the present invention is not limited by the content of these embodiments.

Aqueous Dispersion of Acrylic Urethane Composite Resin (AB) Particles

In some embodiments, an aqueous dispersion of acrylic urethane composite resin (AB) particles includes: a urethane resin portion (A) produced from constituent components including a compound (a1) having a secondary amino group and an alkoxysilyl group and an isocyanate group-containing urethane prepolymer (a2); and an acrylic resin portion (B) produced from constituent components including a compound (b) having a polymerizable unsaturated group and having no hydroxyl group or one hydroxyl group, in which the compound (a1) having a secondary amino group and an alkoxysilyl group is produced from constituent components including a compound (a11) containing a primary amino group and an alkoxysilyl group and a polymerizable unsaturated group-containing compound (a12), and the isocyanate group-containing urethane prepolymer (a2) is produced from constituent components including a polyisocyanate component (a21) and a polyol component (a22).

The aqueous dispersion of acrylic urethane composite resin (AB) particles can be produced by a method for producing an acrylic urethane composite resin that has been known in the related art, but is preferably produced by the following method (including the following production steps 1 to 5) from the perspective of production stability and the like.

Production step 1. A compound (a11) containing a primary amino group and an alkoxysilyl group is reacted with a polymerizable unsaturated group-containing compound (a12) to synthesize a compound (a1) having a secondary amino group and an alkoxysilyl group.

Production step 2. An isocyanate group-containing urethane prepolymer (a2) is synthesized under the presence of a compound (b) having a polymerizable unsaturated group and having no hydroxyl group or one hydroxyl group, which is a constituent component of an acrylic resin portion (B).

Production step 3: The compound (a1) having a secondary amino group and an alkoxysilyl group produced in Production step 1 is added to a mixture including the isocyanate group-containing urethane prepolymer (a2) produced in Production step 2 and the compound (b) having a polymerizable unsaturated group and having no hydroxyl group or one hydroxyl group to react the isocyanate group-containing urethane prepolymer (a2) with the compound (a1) having a secondary amino group and an alkoxysilyl group, thereby producing a urethane resin portion (A).

Production step 4: Deionized water is added to the urethane resin portion (A) and emulsification is performed to produce an aqueous dispersion liquid. As necessary, the aqueous dispersion liquid is further subjected to chain extension reaction and solvent removal.

Production step 5: A polymerization initiator is added to the aqueous dispersion liquid to perform polymerization reaction, thereby producing an aqueous dispersion of acrylic urethane composite resin (AB) particles including the urethane resin portion (A) and the acrylic resin portion (B).

Production Step 1

A compound (a11) containing a primary amino group and an alkoxysilyl group is reacted with a polymerizable unsaturated group-containing compound (a12) to synthesize a compound (a1) having a secondary amino group and an alkoxysilyl group.

Examples of the compound (a11) containing a primary amino group and an alkoxysilyl group include 3-aminopropyltrimethoxysilane, 3-aminopropyltriethoxysilane, N-2-(aminoethyl)-3-aminopropylmethyldimethoxysilane, and N-2-(aminoethyl)-3-aminopropyltrimethoxysilane.

The compounds (a11) containing a primary amino group and an alkoxysilyl group can be used alone or in combination of two or more.

As the compound (a11) containing a primary amino group and an alkoxysilyl group, a commercially available product can be used. Examples of a trade name of the commercially available product include "KBM-903", "KBE-903", "KBM-602", and "KBM-603" (all available from Shin-Etsu Chemical Co., Ltd., trade names), "Dynasylan AMEO", "Dynasylan AMMO", "Dynasylan DAMO", and "Dynasylan DAMO-T" (all available from Evonik Industries AG, trade names), "DOWSIL Z-6610 Silane", "DOWSIL Z-6611 Silane", "DOWSIL Z-6094 Silane", and "XIAMETER OFS-6020 Silane" (all available from Dow Corning Toray Co., Ltd., trade names), and "A-1100", "A-1110", "A-1120", and "A-2120" (all available from Momentive Performance Materials Inc., trade names).

The compound (a11) containing a primary amino group and an alkoxysilyl group preferably includes a compound (a11-1) containing a primary amino group, a secondary amino group, and an alkoxysilyl group from the perspective of storage stability of an aqueous coating composition to be produced and abrasion resistance and glass adhesiveness of a coating film to be formed.

Examples of the compound (a11-1) containing a primary amino group, a secondary amino group, and an alkoxysilyl group include N-2-(aminoethyl)-3-aminopropylmethyldimethoxysilane and N-2-(aminoethyl)-3-aminopropyltrimethoxysilane.

As the compound (a11-1) containing a primary amino group, a secondary amino group, and an alkoxysilyl group, a commercially available product can be used. Examples of a trade name of the commercially available product include "KBM-602" and "KBM-603" (both available from Shin-Etsu Chemical Co., Ltd., trade names), "Dynasylan DAMO" and "Dynasylan DAMO-T" (both available from Evonik Industries AG, trade names), "DOWSIL Z-6094 Silane" and "XIAMETER OFS-6020 Silane" (both available from Dow Corning Toray Co., Ltd., trade names), and "A-1120" and "A-2120" (both available from Momentive Performance Materials Inc., trade names).

In a case where the compound (a11-1) containing a primary amino group, a secondary amino group, and an alkoxysilyl group is included as the compound (a11) containing a primary amino group and an alkoxysilyl group, a content of the compound (a11-1) containing a primary amino group, a secondary amino group, and an alkoxysilyl group is preferably in a range from 20 mass % to 100 mass %, more preferably in a range from 50 mass % to 100 mass %, and even more preferably in a range from 90 mass % to 100 mass %, based on a total solid content amount of the compound (a11) containing a primary amino group and an alkoxysilyl group, from the perspective of storage stability of the aqueous coating composition to be produced and abrasion resistance, chipping resistance, glass adhesiveness, and the like of the coating film to be formed.

The polymerizable unsaturated group is an unsaturated group capable of radical polymerization, and specific examples thereof include an acryloyl group, a methacryloyl group, a vinyl group, an allyl group, a propenyl group, an isopropenyl group, a maleimide group, and a vinyl ether group. Among the polymerizable unsaturated groups, from the perspective of excellent reactivity, an acryloyl group and a methacryloyl group are preferable, and an acryloyl group is particularly preferable.

In the present specification, "(meth)acrylate" means "acrylate and/or methacrylate". "(Meth)acrylic acid" means "acrylic acid and/or methacrylic acid". In addition, "(meth)acryloyl" means "acryloyl and/or methacryloyl". Furthermore, "(meth)acrylamide" means "acrylamide and/or methacrylamide".

Examples of the polymerizable unsaturated group-containing compound (a12) include: hydroxyl group-containing polymerizable unsaturated monomers such as monoesterified products of (meta)acrylic acid and dihydric alcohol having 2 to 8 carbon atoms, such as 2-hydroxyethyl (meth)acrylate, 2-hydroxypropyl (meth)acrylate, 3-hydroxypropyl (meth)acrylate, and 4-hydroxybutyl (meth)acrylate, ε-caprolactone modified products of the monoesterified products, N-hydroxymethyl (meth)acrylamide, allyl alcohol, and (meth)acrylate having a polyoxyethylene chain with a hydroxyl group at the molecular terminal; alkyl or cycloalkyl (meth)acrylates such as methyl (meth)acrylate, ethyl (meth)acrylate, n-propyl (meth)acrylate, i-propyl (meth)acrylate, n-butyl (meth)acrylate, i-butyl (meth)acrylate, tert-butyl (meth)acrylate, n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, "isostearyl acrylate" (trade name, available from OSAKA ORGANIC CHEMICAL INDUSTRY LTD.), cyclohexyl (meth)acrylate, methylcyclohexyl (meth)acrylate, t-butylcyclohexyl (meth)acrylate, cyclododecyl (meth)acrylate, and tricyclodecanyl (meth)acrylate; polymerizable unsaturated monomers having an isobornyl group such as isobornyl (meth)acrylate; polymerizable unsaturated monomers having an adamantyl group such as adamantyl (meth)acrylate; polymerizable unsaturated monomers having a tricyclodecenyl group such as tricyclodecenyl (meth)acrylate; aromatic ring-containing polymerizable unsaturated monomers such as benzyl (meth)acrylate, styrene, α-methylstyrene, and vinyltoluene; polymerizable unsaturated monomers having an alkoxysilyl group such as vinyltrimethoxysilane, vinyltriethoxysilane, vinyltris(2-methoxyethoxy)silane, γ-(meth)acryloyloxypropyltrimethoxysilane, and γ-(meth)acryloyloxypropyltriethoxysilane; perfluoroalkyl (meth)acrylates such as perfluorobutylethyl (meth)acrylate and perfluorooctylethyl (meth)acrylate; polymerizable unsaturated monomers having a fluorinated alkyl group such as fluoroolefin; polymerizable unsaturated monomers having a photopolymerizable functional group such as maleimide; vinyl compounds such as N-vinylpyrrolidone, ethylene, butadiene, chloroprene, vinyl propionate, and vinyl acetate; carboxyl group-containing polymerizable unsaturated monomers such as (meth)acrylic acid, maleic acid, crotonic acid, and β-carboxyethyl acrylate; nitrogen-containing polymerizable unsaturated monomers such as (meth)acrylonitrile, (meth)acrylamide, N,N-dimethylaminoethyl (meth)acrylate, N,N-diethylaminoethyl (meth)acrylate, N,N-dimethylaminopropyl (meth)acrylamide, and an adduct of glycidyl (meth)acrylate and amines; an epoxy group-containing polymerizable unsaturated monomers such as glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate, and allyl glycidyl ether; (meth)acrylates having a polyoxyethylene chain with an alkoxy group at the molecular terminal; glycerol di(meth)acrylate, 1,1,1-trishydroxymethylethane di(meth)acrylate, allyl (meth)acrylate, ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol tetra(meth)acrylate, 1,1,1-trishydroxymethylethane tri(meth)acrylate, 1,1,1-trishydroxymethylpropane tri(meth)acrylate, methylenebis (meth)acrylamide, ethylenebis (meth)acrylamide, triallyl isocyanurate, diallyl terephthalate, divinylbenzene, polyethylene glycol di(meth)acrylate, and polytetramethylene glycol di(meth)acrylate.

The polymerizable unsaturated group-containing compounds (a12) can be used alone or in combination of two or more.

The polymerizable unsaturated group-containing compound (a12) preferably includes (meth)acrylate, more preferably includes alkyl or cycloalkyl (meth)acrylate, even more preferably includes an alkyl (meth)acrylate having an alkyl group with 2 to 6 carbon atoms, and particularly preferably includes alkyl (meth)acrylate having an alkyl group with 3 to 6 carbon atoms, from the perspective of storage stability of the aqueous coating composition to be produced and abrasion resistance, chipping resistance, glass adhesiveness, and the like of the coating film to be formed.

Examples of the (meth)acrylate include monoesterified compounds of (meth)acrylic acid and dihydric alcohol having 2 to 8 carbon atoms, such as 2-hydroxyethyl (meth)acrylate, 2-hydroxypropyl (meth)acrylate, 3-hydroxypropyl (meth)acrylate, and 4-hydroxybutyl (meth)acrylate, ε-caprolactone-modified products of the monoesterified products, (meth)acrylate having a polyoxyethylene chain with a hydroxyl group at the molecular terminal, methyl (meth)acrylate, ethyl (meth)acrylate, n-propyl (meth)acrylate, i-propyl (meth)acrylate, n-butyl (meth)acrylate, i-butyl (meth)acrylate, tert-butyl (meth)acrylate, n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, "isostearyl acrylate" (trade name, available from OSAKA ORGANIC CHEMICAL INDUSTRY LTD.), cyclohexyl (meth)acrylate, methylcyclohexyl (meth)acrylate, t-butylcyclohexyl (meth)acrylate, cyclododecyl (meth)acrylate, tricyclodecanyl (meth)acrylate, isobornyl (meth)acrylate, adamantyl (meth)acrylate, tricyclodecenyl (meth)acrylate, benzyl (meth)acrylate, perfluorobutylethyl (meth)acrylate, perfluorooctylethyl (meth)acrylate, β-carboxyethyl acrylate, N,N-dimethylaminoethyl (meth)acrylate, N,N-diethylaminoethyl (meth)acrylate, nitrogen-containing polymerizable unsaturated monomers such as adducts of glycidyl (meth)acrylate and amines, glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate, (meth)acrylate having a polyoxyethylene chain with an alkoxy group at the molecular terminal; glycerol di(meth)acrylate, 1,1,1-trishydroxymethylethane di(meth)acrylate, allyl (meth)acrylate, ethylene glycol di(meth)acrylate, triethylene glycol di(meth)acrylate, tetraethylene glycol di(meth)acrylate, 1,3-butyleneglycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol tetra(meth)acrylate, 1,1,1-trishydroxymethylethane tri(meth)acrylate, 1,1,1-trishydroxymethylpropane tri(meth)acrylate, polyethylene glycol di(meth)acrylate, and polytetramethylene glycol di(meth)acrylate.

In a case where the (meth)acrylate is included as the polymerizable unsaturated group-containing compound (a12), a content of the (meth)acrylate is preferably in a range from 20 mass % to 100 mass %, more preferably in a range from 50 mass % to 100 mass %, and even more preferably in a range from 90 mass % to 100 mass %, based on a total solid content amount of the polymerizable unsaturated group-containing compound (a12), from the perspective of storage stability of the aqueous coating composition to be produced and abrasion resistance, glass adhesiveness, and the like of the coating film to be formed.

Examples of the alkyl or cycloalkyl (meth)acrylate include methyl (meth)acrylate, ethyl (meth)acrylate, n-propyl (meth)acrylate, i-propyl (meth)acrylate, n-butyl (meth)acrylate, i-butyl (meth)acrylate, tert-butyl (meth)acrylate, n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, "isostearyl acrylate" (trade name, available from OSAKA ORGANIC CHEMICAL INDUSTRY LTD.), cyclohexyl (meth)acrylate, methylcyclohexyl (meth)acrylate, t-butylcyclohexyl (meth)acrylate, cyclododecyl (meth)acrylate, and tricyclodecanyl (meth)acrylate.

In a case where the alkyl or cycloalkyl (meth)acrylate is included as the polymerizable unsaturated group-containing compound (a12), a content of the alkyl or cycloalkyl (meth)acrylate is preferably in a range from 20 mass % to 100 mass %, more preferably in a range from 50 mass % to 100 mass %, and even more preferably in a range from 90 mass % to 100 mass %, based on the total solid content amount of the polymerizable unsaturated group-containing compound (a12), from the perspective of storage stability of the aqueous coating composition to be produced and abrasion resistance, glass adhesiveness, and the like of the coating film to be formed.

Examples of the alkyl (meth)acrylate having an alkyl group with 2 to 6 carbon atoms include ethyl (meth)acrylate, n-propyl (meth)acrylate, i-propyl (meth)acrylate, n-butyl (meth)acrylate, i-butyl (meth)acrylate, tert-butyl (meth)acrylate, and n-hexyl (meth)acrylate.

In a case where the alkyl (meth)acrylate having an alkyl group with 2 to 6 carbon atoms is included as the polymerizable unsaturated group-containing compound (a12), a content of the alkyl (meth)acrylate having an alkyl group with 2 to 6 carbon atoms is preferably in a range from 20 mass % to 100 mass %, more preferably in a range from 50 mass % to 100 mass %, and even more preferably in a range from 90 mass % to 100 mass %, based on the total solid content amount of the polymerizable unsaturated group-containing compound (a12), from the perspective of storage stability of the aqueous coating composition to be produced and abrasion resistance, glass adhesiveness, and the like of the coating film to be formed.

Examples of the alkyl (meth)acrylate having an alkyl group with 3 to 6 carbon atoms include n-propyl (meth)acrylate, i-propyl (meth)acrylate, n-butyl (meth)acrylate, i-butyl (meth)acrylate, tert-butyl (meth)acrylate, and n-hexyl (meth)acrylate.

In a case where the alkyl (meth)acrylate having an alkyl group with 3 to 6 carbon atoms is included as the polymerizable unsaturated group-containing compound (a12), a content of the alkyl (meth)acrylate having an alkyl group with 3 to 6 carbon atoms is preferably in a range from 20 mass % to 100 mass %, more preferably in a range from 50 mass % to 100 mass %, and even more preferably in a range from 90 mass % to 100 mass %, based on the total solid content amount of the polymerizable unsaturated group-containing compound (a12), from the perspective of storage stability of the aqueous coating composition to be produced and abrasion resistance, glass adhesiveness, and the like of the coating film to be formed.

The compound (a1) having a secondary amino group and an alkoxysilyl group is preferably synthesized at a temperature in a range from 30° C. to 100° C.

In the synthesis of the compound (a1) having a secondary amino group and an alkoxysilyl group, an organic solvent that does not interfere with reaction between the compound (a11) containing a primary amino group and an alkoxysilyl group and the polymerizable unsaturated group-containing compound (a12) can be used. Examples of the organic solvent include: aromatic hydrocarbon-based solvents such as toluene and xylene; alicyclic hydrocarbon-based solvents such as cyclohexane and methylcyclohexane; and ester-based solvents such as ethyl acetate and butyl acetate. Among them, alicyclic hydrocarbon-based solvents and ester-based solvents can be suitably used.

The above organic solvents can be used alone or in combination of two or more.

In the synthesis of the compound (a1) having a secondary amino group and an alkoxysilyl group, an antioxidant can be added as necessary.

Examples of the antioxidant include dibutylhydroxytoluene, hydroquinone, methylhydroquinone, and t-butylhydroquinone.

A mass ratio (a11)/(a12) of the compound (a11) containing a primary amino group and an alkoxysilyl group to the polymerizable unsaturated group-containing compound (a12) in the compound (a1) having a secondary amino group and an alkoxysilyl group is preferable in a range from 25/75 to more preferably in a range from 35/65 to 55/45, and even more preferably in a range from 40/60 to from the perspective of storage stability of the aqueous coating composition to be produced and abrasion resistance, chipping resistance, glass adhesiveness, and the like of the coating film to be formed.

Production Step 2

An isocyanate group-containing urethane prepolymer (a2) is synthesized under the presence of a compound (b) having a polymerizable unsaturated group and having no hydroxyl group or one hydroxyl group, which is a constituent component of the acrylic resin portion (B).

Examples of the compound (b) having a polymerizable unsaturated group and having no hydroxyl group or one hydroxyl group include a compound (b1) having a polymerizable unsaturated group and one hydroxyl group and a compound (b2) having a polymerizable unsaturated group and no hydroxyl group.

Examples of the compound (b1) having a polymerizable unsaturated group and one hydroxyl group include a compound (b1-1) having one polymerizable unsaturated group and one hydroxyl group, and a compound (b1-2) having two or more polymerizable unsaturated groups and one hydroxyl group.

Examples of the compound (b1-1) having one polymerizable unsaturated group and one hydroxyl group include: monoesterified products of dihydric alcohol having 2 to 8 carbon atoms and (meth)acrylic acid, such as 2-hydroxyethyl (meth)acrylate, 2-hydroxypropyl (meth)acrylate, 3-hydroxypropyl (meth)acrylate, and 4-hydroxybutyl (meth)acrylate; ε-caprolactone modified products of the monoesterified products; N-hydroxymethyl (meth)acrylamides; allyl alcohols; and hydroxyl group-containing polymerizable unsaturated monomer such as (meth)acrylates having a polyoxyethylene chain with a hydroxyl group at the molecular terminal.

The compounds (b1-1) having one polymerizable unsaturated group and one hydroxyl group can be used alone or in combination of two or more.

Examples of the compound (b1-2) having two or more polymerizable unsaturated groups and one hydroxyl group include glycerol di(meth)acrylate and 1,1,1-trishydroxymethylethane di(meth)acrylate.

The compounds (b1-2) having two or more polymerizable unsaturated groups and one hydroxyl group can be used alone or in combination of two or more.

In a case where the compound (b1) having a polymerizable unsaturated group and one hydroxyl group is included as the compound (b) having a polymerizable unsaturated group and having no hydroxyl group or one hydroxyl group, a content of the compound (b1) having a polymerizable unsaturated group and one hydroxyl group is preferably in a range from 1 mass % to 50 mass %, more preferably in a range from 2 mass % to 40 mass %, and even more preferably in a range from 5 mass % to 30 mass %, based on a total solid content amount of the compound (b) having a polymerizable unsaturated group and having no hydroxyl group or one hydroxyl group, from the perspective of production stability.

Examples of the compound (b2) having a polymerizable unsaturated group and no hydroxyl group include a compound (b2-1) having one polymerizable unsaturated group and no hydroxyl group and a compound (b2-2) having two or more polymerizable unsaturated groups and no hydroxyl group.

Examples of the compound (b2-1) having one polymerizable unsaturated group and no hydroxyl group include:

alkyl or cycloalkyl (meth)acrylates such as methyl (meth)acrylate, ethyl (meth)acrylate, n-propyl (meth)acrylate, i-propyl (meth)acrylate, n-butyl (meth)acrylate, i-butyl (meth)acrylate, tert-butyl (meth)acrylate, n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, "isostearyl acrylate" (trade name, available from OSAKA ORGANIC CHEMICAL INDUSTRY LTD.), cyclohexyl (meth)acrylate, methylcyclohexyl (meth)acrylate, t-butylcyclohexyl (meth)acrylate, cyclododecyl (meth)acrylate, and tricyclodecanyl (meth)acrylate; polymerizable unsaturated monomers having an isobornyl group such as isobornyl (meth)acrylate; polymerizable unsaturated monomers having an adamantyl group such as adamantyl (meth)acrylate; polymerizable unsaturated monomers having a tricyclodecenyl group such as tricyclodecenyl (meth)acrylate; aromatic ring-containing polymerizable unsaturated monomers such as benzyl (meth)acrylate, styrene, α-methylstyrene, and vinyltoluene; polymerizable unsaturated monomers having an alkoxysilyl group such as vinyltrimethoxysilane, vinyltriethoxysilane, vinyltris(2-methoxyethoxy) silane, γ-(meth)acryloyloxypropyltrimethoxysilane, and γ-(meth)acryloyloxypropyltriethoxysilane; perfluoroalkyl (meth)acrylates such as perfluorobutylethyl (meth)acrylate and perfluorooctylethyl (meth)acrylate; polymerizable unsaturated monomers having a fluorinated alkyl group such as fluoroolefin; polymerizable unsaturated monomers having a photopolymerizable functional group such as maleimide; vinyl compounds such as N-vinylpyrrolidone, ethylene, butadiene, chloroprene, vinyl propionate, and vinyl acetate; carboxyl group-containing polymerizable unsaturated monomers such as (meth)acrylic acid, maleic acid, crotonic acid, and β-carboxyethyl acrylate; nitrogen-containing polymerizable unsaturated monomers such as adducts of (meth)acrylonitrile, (meth)acrylamide, N,N-dimethylaminoethyl (meth)acrylate, N,N-diethylaminoethyl (meth)acrylate, N,N-dimethylaminopropyl (meth)acrylamide, glycidyl (meth)acrylate and amines; epoxy group-containing polymerizable unsaturated monomers such as glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate, and allyl glycidyl ether; and (meth)acrylates having a polyoxyethylene chain with an alkoxy group at the molecular terminal.

The compound (b2-1) having one polymerizable unsaturated group and no hydroxyl group can be used alone or in combination of two or more.

Examples of the compound (b2-2) having two or more polymerizable unsaturated groups and no hydroxyl group include allyl (meth)acrylate, ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol tetra(meth)acrylate, 1,1,1-trishydroxymethylethane tri(meth)acrylate, 1,1,1-trishydroxymethylpropane tri(meth)acrylate, methylenebis (meth)acrylamide, ethylenebis (meth)acrylamide, triallylisocyanurate, diallyltetraphthalate, divinylbenzene, polyethylene glycol di(meth)acrylate, and polyethylene glycol di(meth)acrylate.

The compounds (b2-2) having two or more polymerizable unsaturated groups and no hydroxyl group can be used alone or in combination of two or more.

As the compound (b2) having a polymerizable unsaturated group and no hydroxyl group, preferably the compound (b2-2) having two or more polymerizable unsaturated groups and no hydroxyl group is included from the perspective of storage stability and the like of the aqueous coating composition to be produced.

The compound (b2-2) having two or more polymerizable unsaturated groups and no hydroxyl group has a function of imparting a crosslinked structure to a copolymer.

In a case where the compound (b2-2) having two or more polymerizable unsaturated groups and no hydroxyl group is included as the compound (b2) having a polymerizable unsaturated group and no hydroxyl group, a content of the compound (b2-2) having two or more polymerizable unsaturated groups and no hydroxyl group is preferably in a range from 0.5 mass % to 50 mass %, more preferably in a range from 1.0 mass % to 40 mass %, and even more preferably in a range from 2.0 mass % to 20 mass %, based on a total solid content amount of the compound (b2) having a polymerizable unsaturated group and no hydroxyl group, from the perspective of chipping resistance, glass adhesiveness, and the like of the coating film to be formed.

In a case where the compound (b2) having a polymerizable unsaturated groups and no hydroxyl group is included as the compound (b) having a polymerizable unsaturated group and having no hydroxyl group or one hydroxyl group, a content of the compound (b2) having a polymerizable unsaturated group and no hydroxyl group is preferably in a range from 50 mass % to 99 mass %, more preferably in a range from 60 mass % to 97 mass %, and even more preferably in a range from 70 mass % to 95 mass %, based on the total solid content amount of the compound (b) having a polymerizable unsaturated group and having no hydroxyl group or one hydroxyl group, from the perspective of production stability and the like.

Synthesis of Isocyanate Group-Containing Urethane Prepolymer (a2)

The isocyanate group-containing urethane prepolymer (a2) can be produced from constituent components including a polyisocyanate component (a21), a polyol component (a22), and, as necessary, a compound having an active hydrogen group as a water-dispersible group-providing component and an ion-forming group in combination.

Polyisocyanate Component (a21)

Examples of the polyisocyanate component (a21) include alicyclic polyisocyanates (a21-1), aliphatic polyisocyanates, aromatic-aliphatic polyisocyanates, aromatic polyisocyanates, and derivatives of the polyisocyanates.

The polyisocyanate component (a21) preferably includes an alicyclic polyisocyanate (a21-1) from the perspective of glass adhesiveness and the like of the coating film to be formed.

Examples of the alicyclic polyisocyanate (a21-1) include: alicyclic diisocyanates, such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4-methyl-1,3-cyclohexylene diisocyanate (common name: hydrogenated TDI), 2-methyl-1,3-cyclohexylene diisocyanate, 1,3- or 1,4-bis(isocyanatomethyl)cyclohexane (common name: hydrogenated xylylene diisocyanate) or its mixture, methylenebis(4,1-cyclohexanediyl) diisocyanate (common name: hydrogenated MDI), and norbornane diisocyanate; and alicyclic triisocyanates, such as 1,3,5-triisocyanatocyclohexane, 1,3,5-trimethylisocyanatocyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1)heptane, 3-(3-isocyanatopropyl)-2,5-di(isocyanatomethyl)-bicyclo(2.2.1)

heptane, 5-(2-isocyanatoethyl)-2-isocyanatomethyl-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)-heptane, and 6-(2-isocyanatoethyl)-2-isocyanatomethyl-2-(3-isocyanatopropyl)-bicyclo(2.2.1)heptane.

In a case where the polyisocyanate component (a21) includes the alicyclic polyisocyanate (a21-1), a content of the alicyclic polyisocyanate (a21-1) is preferably in a range from 50 mass % to 100 mass %, more preferably in a range from 70 mass % to 100 mass %, and even more preferably in a range from 90 mass % to 100 mass %, based on a total solid content amount of the polyisocyanate component (a21), from the perspective of abrasion resistance, chipping resistance, glass adhesiveness, and the like of the coating film to be formed.

Examples of the aliphatic polyisocyanates include: aliphatic diisocyanates, such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, dimer acid diisocyanate, and methyl 2,6-diisocyanatohexanoate (common name: lysine diisocyanate); and aliphatic triisocyanates, such as 2-isocyanatoethyl 2,6-diisocyanatohexanoate, 1,6-diisocyanato-3-isocyanatomethylhexane, 1,4,8-triisocyanatooctane, 1,6,11-triisocyanatoundecane, 1,8-diisocyanato-4-isocyanatomethyloctane, 1,3,6-triisocyanatohexane, and 2,5,7-trimethyl-1,8-diisocyanato-5-isocyanatomethyloctane.

Examples of the aromatic-aliphatic polyisocyanates include: aromatic-aliphatic diisocyanates, such as methylenebis(4,1-phenylene) diisocyanate (common name: MDI), 1,3- or 1,4-xylylene diisocyanate or its mixture, ω,ω'-diisocyanato-1,4-diethylbenzene, and 1,3- or 1,4-bis(1-isocyanato-1-methylethyl)benzene (common name: tetramethylxylylene diisocyanate) or its mixture; and aromatic-aliphatic triisocyanates, such as 1,3,5-triisocyanatomethylbenzene.

Examples of the aromatic polyisocyanates include: aromatic diisocyanates, such as m-phenylene diisocyanate, p-phenylene diisocyanate, 4,4'-diphenyl diisocyanate, 1,5-naphthalene diisocyanate, 2,4-tolylene diisocyanate (common name: 2,4-TDI) or 2,6-tolylene diisocyanate (common name: 2,6-TDI) or its mixture, 4,4'-toluidine diisocyanate, and 4,4'-diphenyl ether diisocyanate; aromatic triisocyanates, such as triphenylmethane-4,4',4"-triisocyanate, 1,3,5-triisocyanatobenzene, and 2,4,6-triisocyanatotoluene; and aromatic tetraisocyanates, such as 4,4'-diphenylmethane-2,2',5,5'-tetraisocyanate.

Examples of the derivatives of the polyisocyanates include dimers, trimers, biuret, allophanate, uretdione, uretoimine, isocyanurates, oxadiazinetrione, and polymethylene polyphenyl polyisocyanates (crude MDI and polymeric MDI), and crude TDI of the polyisocyanates described above.

The polyisocyanates and their derivatives may each be used alone or in combination of two or more.

The polyisocyanate may be used in a form of a blocked isocyanate which is blocked with a blocking agent.

Examples of the blocking agent include: phenolic compounds, such as phenol, cresol, xylenol, nitrophenol, ethylphenol, hydroxydiphenyl, butylphenol, isopropylphenol, nonylphenol, octylphenol, and methyl hydroxybenzoate; lactam-based compounds, such as ε-caprolactam, δ-valerolactam, γ-butyrolactam, and β-propiolactam; aliphatic alcohol-based compounds, such as methanol, ethanol, propyl alcohol, butyl alcohol, amyl alcohol, and lauryl alcohol; ether-based compounds, such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, and methoxymethanol; alcohol-based compounds, such as benzyl alcohol, glycolic acid, methyl glycolate, ethyl glycolate, butyl glycolate, lactic acid, methyl lactate, ethyl lactate, butyl lactate, methylol urea, methylol melamine, diacetone alcohol, 2-hydroxyethyl acrylate, and 2-hydroxyethyl methacrylate; oxime-based compounds, such as formamide oxime, acetoamide oxime, acetoxime, methyl ethyl ketoxime, diacetyl monoxime, benzophenone oxime, and cyclohexane oxime; active methylene-based compounds, such as dimethyl malonate, diethyl malonate, ethyl acetoacetate, methyl acetoacetate, and acetylacetone; mercaptan-based compounds, such as butyl mercaptan, t-butyl mercaptan, hexyl mercaptan, t-dodecyl mercaptan, 2-mercaptobenzothiazole, thiophenol, methylthiophenol, and ethylthiophenol; acid amide-based compounds, such as acetanilide, acetanisidide, acetotoluide, acrylamide, methacrylamide, acetic amide, stearic amide, and benzamide; imide-based compounds, such as succinimide, phthalimide, and maleimide; amine-based compounds, such as diphenylamine, phenylnaphthylamine, xylidine, N-phenylxylidine, carbazole, aniline, naphthylamine, butylamine, dibutylamine, and butylphenylamine; imidazole-based compounds, such as imidazole and 2-ethylimidazole; urea-based compounds, such as urea, thiourea, ethyleneurea, ethylenethiourea, and diphenylurea; carbamic ester-based compounds, such as phenyl N-phenylcarbamate; imine-based compounds, such as ethyleneimine and propyleneimine; sulfite-based compounds, such as sodium bisulfite and potassium bisulfite; and azole-based compounds. Examples of the azole-based compounds include pyrazole or pyrazole derivatives, such as pyrazole, 3,5-dimethylpyrazole, 3-methylpyrazole, 4-benzyl-3,5-dimethylpyrazole, 4-nitro-3,5-dimethylpyrazole, 4-bromo-3,5-dimethylpyrazole, and 3-methyl-5-phenylpyrazole; imidazole or imidazole derivatives, such as imidazole, benzimidazole, 2-methylimidazole, 2-ethylimidazole, and 2-phenylimidazole; and imidazoline derivatives, such as 2-methylimidazoline and 2-phenylimidazoline.

When the polyisocyanate is blocked (the polyisocyanate is reacted with a blocking agent), a solvent can be added as necessary to perform blocking. The solvent used in the blocking reaction is preferably a solvent not reactive with an isocyanate group, and examples include ketones, such as acetone and methyl ethyl ketone; esters, such as ethyl acetate; and a solvent such as N-methyl-2-pyrrolidone (NMP).

Polyol Component (a22)

The polyol component (a22) is a compound having at least two hydroxyl groups per molecule.

The polyol component (a22) preferably include at least one selected from the group consisting of polycarbonate polyol (a22-1) and polyether polyol (a22-2), and more preferably include polycarbonate polyol (a22-1) and polyether polyol (a22-2), from the perspective of storage stabilities of the aqueous coating composition to be produced and abrasion resistance, chipping resistance, glass adhesiveness, and the like of the coating film to be formed.

The polycarbonate polyol (a22-1) is a compound produced by subjecting a known polyol component and a carbonylating agent to polycondensation reaction in a common method. Examples of the polyol component include diol components and polyhydric alcohol components such as trihydric or higher alcohols.

Examples of the diol components include: linear diols such as 1,3-propanediol, 1,4-butanediol, 1,5-pentanediol, 1,6-hexanediol, 1,7-heptanediol, 1,8-octanediol, 1,9-nonanediol, and 1,10-decanediol; branched diols such as 2-methyl-1,3-propanediol, 3-methyl-1,5-pentanediol, neopentyl glycol, 2-ethyl-1,6-hexanediol, 2,2-diethyl-1,3-propanediol, 2-butyl-2-ethyl-1,3-propanediol, 2-methyl-1,8-octanediol, 2,2,4-trimethyl-1,3-pentanediol, and 2-ethyl-1,3-hexanediol; alicyclic diols such as 1,3-cyclohexanediol, 1,4-cyclohexanediol, 1,4-cyclohexanedimethanol, and 2,2,4,4-tetramethyl-1,3-cyclobutanediol; aromatic diols such as p-xylenediol and p-tetrachloroxylenediol; and ether-based diols such as diethylene glycol and dipropylene glycol. The diol components can be used alone or in combination of two or more.

Examples of the trihydric or higher alcohols include glycerin, trimethylolethane, trimethylolpropane, a dimer of trimethylolpropane, and pentaerythritol. The trihydric or higher alcohols can be used alone or in combination of two or more.

As the carbonylating agent, a known agent can be used. Specific examples thereof include alkylene carbonate, dialkyl carbonate, diallyl carbonate, and phosgene, and these can be used alone or in combination of two or more. Among them, preferred examples include ethylene carbonate, propylene carbonate, dimethyl carbonate, diethyl carbonate, dibutyl carbonate, and diphenyl carbonate.

The number average molecular weight of the polycarbonate polyol (a22-1) is preferably in a range from 1000 to 5000, more preferably in a range from 1300 to 4500, and even more preferably in a range from 1500 to 3500, from the perspective of chipping resistance and the like of the coating film to be formed.

In a case where the polyol component (a22) includes the polycarbonate polyol (a22-1), a content of the polycarbonate polyol (a22-1) is preferably in a range from 35 mass % to 80 mass %, more preferably in a range from 40 mass % to 70 mass %, and even more preferably in a range from 45 mass % to 60 mass %, based on a total solid content amount of the polyol component (a22), from the perspective of abrasion resistance, chipping resistance, glass adhesiveness, and the like of the coating film to be formed.

As the polyether polyol (a22-2), alkyleneoxide adducts, alkylene oxides, or ring-opening (co)polymers of cyclic ether (such as tetrahydrofuran) of polyols having a low molecular weight, which will be described below. Specific examples of the polyether polyol (a22-2) include polyethylene glycol, polypropylene glycol, polytetramethylene glycol, (block or random) copolymers of ethylene glycol-propylene glycol, polyhexamethylene glycol, and polyoctamethylene glycol.

The polyether polyol (a22-2) can be used alone or in combination of two or more types.

The number average molecular weight of the polyether polyol (a22-2) is preferably in a range from 500 to 10000, more preferably in a range from 1000 to 5000, and even more preferably in a range from 1600 to 4000, from the perspective of storage stability of the aqueous coating composition to be produced and abrasion resistance, chipping resistance, glass adhesiveness, and the like of the coating film to be formed.

In a case where the polyol component (a22) includes the polyether polyol (a22-2), a content of the polyether polyol (a22-2) is preferably in a range from 10 mass % to 85 mass %, more preferably in a range from 15 mass % to 60 mass %, and even more preferably in a range from 20 mass % to 40 mass %, based on the total solid content amount of the polyol component (a22), from the perspective of abrasion resistance, chipping resistance, glass adhesiveness, and the like of the coating film to be formed.

The polyether polyol (a22-2) preferably includes polytetramethylene ether glycol from the perspective of storage stability of the aqueous coating composition to be produced and abrasion resistance, chipping resistance, and the like of the coating film to be formed.

In a case where the polyether polyol (a22-2) includes polytetramethylene ether glycol, a content of the polytetramethylene ether glycol is preferably in a range from 50 mass % to 100 mass %, more preferably in a range from 70 mass % to 100 mass %, and even more preferably in a range from 90 mass % to 100 mass %, based on a total solid content amount of the polyether polyol (a22-2), from the perspective of storage stability of the aqueous coating composition to be produced and abrasion resistance, chipping resistance, and the like of the coating film to be formed.

As the polyol component (a22), a compound (a22-3) having two or more hydroxyl groups and one or more polymerizable unsaturated groups can be included.

The compound (a22-3) having two or more hydroxyl groups and one or more polymerizable unsaturated groups imparts a polymerizable unsaturated group to a side chain of the isocyanate group-containing urethane prepolymer (a2).

Examples of the compound (a22-3) having two or more hydroxyl groups and one or more polymerizable unsaturated groups include reaction products between glycidyl group-containing compounds and (meth)acrylic acids and reaction products between polyols having three or more functional groups and (meth)acrylic acids.

As the compound (a22-3) having two or more hydroxyl groups and one or more polymerizable unsaturated groups, commercially available products can be used. Examples of trade names of the commercially available products include "Epoxy Ester 40EM", "Epoxy Ester 70PA", "Epoxy Ester 200PA", "Epoxy Ester 80MFA", "Epoxy Ester 3002M", "Epoxy Ester 3002A", "Epoxy Ester 3000MK", and "Epoxy Ester 3000A" (all available from KYOEISHA CHEMICAL Co., Ltd.), "Denacol Acrylate DA-212", "Denacol Acrylate DA-314", "Denacol Acrylate DA-911M", "Denacol Acrylate DA-920", and "Denacol Acrylate DA-931" (all available from Nagase ChemteX Corporation), "Blemmer GLM", "Blemmer GLM-EX", and "Blemmer GLM-R" (all available from NOF Corporation).

As the compound (a22-3) having two or more hydroxyl groups and one or more polymerizable unsaturated groups, a compound having two or more hydroxyl groups and one polymerizable unsaturated group is preferably included, and a compound having two hydroxyl groups and one polymerizable unsaturated group is more preferably included, from the perspective of storage stability of the aqueous coating composition to be produced and chipping resistance and the like of the coating film to be formed.

As the compound having two hydroxyl groups and one polymerizable unsaturated group, commercially available products can be used. Examples of trade names of the commercially available products include "Blemmer GLM", "Blemmer GLM-EX", and "Blemmer GLM-R" (all available from NOF Corporation).

In a case where the polyol component (a22) includes the compound (a22-3) having two or more hydroxyl groups and one or more polymerizable unsaturated groups, a content of the compound (a22-3) having two or more hydroxyl groups and one or more polymerizable unsaturated groups is preferably in a range from 1.0 mass % to 15 mass %, more preferably in a range from 2.0 mass % to 10 mass %, and even more preferably in a range from 3.0 mass % to 8.0 mass %, based on the total solid content amount of the polyol component (a22), from the perspective of storage stability of the aqueous coating composition to be produced and chipping resistance and the like of the coating film to be formed.

The polyol component (a22) can include a polyol component (a22-4) other than the polycarbonate polyol (a22-1), the polyether polyol (a22-2), and the compound (a22-3) having two or more hydroxyl groups and one or more polymerizable unsaturated groups (hereinafter sometimes simply referred to as "polyol component (a22-4)").

As the polyol component (a22-4), it is possible to use, as polyol having a low molecular weight, ethyleneglycol, propyleneglycol, diethyleneglycol, triethyleneglycol, 1,2-butyleneglycol, 1,3-butyleneglycol, 2,3-butyleneglycol, 1,4-butyleneglycol, 1,5-pentanediol, neopentylglycol, 1,6-hexaneglycol, 2,5-hexanediol, dipropyleneglycol, 2,2,4-trimethyl-1,3-pentanediol, tricyclodecanedimethanol, and 1,4-cyclohexanedimethanol, for example. The polyols having a low molecular weight can be used alone or in combination of two or more.

As the polyol component (a22-4), it is possible to use, as polyol having a high molecular weight, polyester polyol and polyetherester polyol, for example. The polyols having a low molecular weight can be used alone or in combination of two or more.

Examples of the polyester polyol include those produced by polycondensing a dicarboxylic acid (anhydride) such as adipic acid, succinic acid, sebacic acid, glutaric acid, maleic acid, fumaric acid, or phthalic acid with the above-described polyol having a low molecular weight such as ethylene glycol, propylene glycol, 1,4-butanediol, 1,6-hexanediol, 1,8-octamethylendiol, or neopentyl glycol under a condition of excess hydroxyl groups. Specific examples thereof include an ethylene glycol-adipic acid condensate, a butanediol-adipic acid condensate, a hexamethylene glycol-adipic acid condensate, an ethylene glycol-propylene glycol-adipic acid condensate, and a polylactone polyol produced by ring-opening polymerization of lactone using glycol as an initiator. The polyester polyol can be used alone or in combination of two or more types.

Examples of the polyetheresterpolyol include those produced by adding an ether group-containing polyol (such as the polyether polyol (a22-2) or diethylene glycol) or a mixture thereof with another glycol to such an (anhydrous) dicarboxylic acid as exemplified in the polyester polyol to react an alkylene oxide, such as a polytetramethylene glycol-adipic acid condensate. The polyetheresterpolyol can be used alone or in combination of two or more types.

Compound Having Both Active Hydrogen Group and Ion-Forming Group

Examples of the compound having both an active hydrogen group and an ion-forming group include a compound having two or more hydroxyl groups and one or more carboxyl groups per molecule, a compound having two or more hydroxyl groups and one or more sulfonic acid groups per molecule, and a compound having two or more amino groups and one or more carboxyl groups per molecule, and these can be used alone or in combination of two or more.

Among them, as the compound having both an active hydrogen group and an ion-forming group, a compound having two or more hydroxyl groups and one or more carboxyl groups per molecule and a compound having two or more hydroxyl groups and one or more sulfonic acid groups per molecule can be suitably used.

In the present invention, compounds having both two or more hydroxyl groups and an ion-forming group, such as the compound having two or more hydroxyl groups and one or more carboxyl groups per molecule and the compound having two or more hydroxyl groups and one or more sulfonic acid groups per molecule, are included in the polyol component (a22).

Examples of the compound having two or more hydroxyl groups and one or more carboxyl groups per molecule include: alkanol carboxylic acid compounds such as dimethylolpropionic acid, dimethylolacetic acid, dimethylolbutanoic acid, dimethylolheptanoic acid, dimethylolnonanoic acid, 1-carboxy-1,5-pentylenediamine, dihydroxybenzoic acid, and 3,5-diaminobenzoic acid; and half ester compounds of polyoxypropylenetriol with maleic anhydride and/or phthalic anhydride.

Examples of the compound having two or more hydroxyl groups and one or more sulfonic acid groups per molecule include 2-sulfonic acid-1,4-butanediol, 5-sulfonic acid-di-β-hydroxyethyl isophthalate, and N,N-bis(2-hydroxyethyl)aminoethylsulfonic acid.

As the compound having both an active hydrogen group and an ion-forming group, it is preferable to use a compound having two or more hydroxyl groups and one or more carboxyl groups per molecule from the perspective of flexibility and the like of the coating film to be formed.

In a case where the polyol component (a22) includes the compound having two or more hydroxyl groups and one or more carboxyl groups, a content thereof is preferably in a range from 1 mass % to 30 mass %, more preferably in a range from 1 mass % to 25 mass %, and even more preferably in a range from 1 mass % to 20 mass %, with respect to a total amount of compounds constituting the polyol component (a22), from the perspective of storage stability of the aqueous coating composition to be produced.

A method for producing the isocyanate group-containing urethane prepolymer (a2) is not particularly limited, and a method that has been known in the related art can be applied. As the production method, for example, the polyisocyanate component (a21) and the polyol component (a22) are subjected to urethanization reaction in an organic solvent, or as necessary, a compound having both an active hydrogen group and an ion-forming group in combination is further added to perform urethanization reaction to synthesize the isocyanate group-containing urethane prepolymer (a2).

The isocyanate group-containing urethane prepolymer (a2) preferably includes the compound having both an active hydrogen group and an ion-forming group from the perspective of storage stability of the aqueous coating composition to be produced.

In the production of the isocyanate group-containing urethane prepolymer (a2), a polymerization inhibitor can be added as necessary.

In the urethanization reaction between the polyisocyanate component (a21) and the polyol component (a22), a catalyst can be used as necessary.

Examples of the catalyst include: bismuth carboxylate compounds such as bismuth (III) tris(2-ethylhexanoate); organotin compounds such as dibutyltin dilaurate, dibutyltin dioctoate, and stannous octoate; and tertiary amine compounds such as triethylamine and triethylenediamine The urethanization reaction is preferably carried out at 50 to 120° C.

In the synthesis of the isocyanate group-containing urethane prepolymer (a2), an organic solvent that is inert to isocyanate and does not interfere with the urethanization reaction can be used. Examples of such an organic solvent include: aromatic hydrocarbon-based solvents such as toluene and xylene; ester-based solvents such as ethyl acetate and butyl acetate; and ketone-based solvents such as acetone and methylethylketone. Among them, from the perspective of water dispersion stability and the like, a ketone-based solvent and an ester-based solvent can be suitably used.

The above organic solvents can be used alone or in combination of two or more.

The compound (b) having a polymerizable unsaturated group and having no hydroxyl group or one hydroxyl group can be used instead of the solvent. In a case where the compound is used as the solvent, it is preferable to use the compound (b2) having a polymerizable unsaturated group and no hydroxyl group.

As the polymerization inhibitor, it is possible to use polymerization inhibitors known per se, examples of which include: phenolic hydroxyl group-containing compounds such as di-t-butylhydroxytoluene and methoxyphenol; carbonyl group-containing aromatic compounds such as benzoquinone; nitroso skeleton-containing compounds; and N-oxyl skeleton-containing compounds.

A content ratio of the polyisocyanate component (a21) and the polyol component (a22) in the isocyanate group-containing urethane prepolymer (a2) is preferably in a range from 1/1.01 to 1/3.0, and more preferably in a range from 1/1.05 to 1/2.0 in terms of a molar ratio of active-hydrogen groups included in the polyol component (a22) to isocyanate groups included in the polyisocyanate component (a21), from the perspective of productivity and the like.

The number average molecular weight of the isocyanate group-containing urethane prepolymer (a2) is preferably in a range from 1000 to 20000, more preferably in a range from 2000 to 15000, and still more preferably in a range from 2500 to 10000, from the perspective of abrasion resistance, chipping resistance, glass adhesiveness, and the like of the coating film to be formed.

Note that in the present specification, the average molecular weight is a value calculated from a chromatogram measured by a gel permeation chromatograph calibrated with the molecular weight of standard polystyrene. For the gel permeation chromatograph, "HLC8120 GPC" (available from Tosoh Corporation) is used. The gel permeation chromatography is performed using four columns "TSKgel G-4000HXL", "TSKgel G-3000HXL", "TSKgel G-2500HXL", and "TSKgel G-2000HXL" (all available from Tosoh Corporation, trade names) under conditions of a mobile phase of tetrahydrofuran, a measurement temperature of 40° C., a flow rate of 1 mL/min, and a detector of RI.

Production Step 3

Next, the compound (a1) having a secondary amino group and an alkoxysilyl group produced in the production step 1 is added to a mixture including the isocyanate group-containing urethane prepolymer (a2) produced in the production step 2 and the compound (b) having a polymerizable unsaturated group and having no hydroxyl group or one hydroxyl group to react the isocyanate group-containing urethane prepolymer (a2) with the compound (a1) having a secondary amino group and an alkoxysilyl group, thereby producing a urethane resin portion (A).

The reaction between the isocyanate group-containing urethane prepolymer (a2) and the compound (a1) having a secondary amino group and an alkoxysilyl group is preferably performed at a temperature in a range from 40° C. to 100° C.

A mass ratio (a2)/(a1) of the isocyanate group-containing urethane prepolymer (a2) to the compound (a1) having a secondary amino group and an alkoxysilyl group in the urethane resin portion (A) is preferably in a range from 1/99 to 20/80, more preferably in a range from 3/97 to 10/90, and even more preferably in a range from 4/96 to 7/93, from the perspective of storage stability of the aqueous coating composition to be produced and abrasion resistance, glass adhesiveness, and the like of the coating film to be formed.

Furthermore, as necessary, the urethane resin portion (A) may be reacted with a compound (b1) having a polymerizable unsaturated group and one hydroxyl group to convert a part or all of terminals of the urethane resin portion (A) into a polymerizable unsaturated group.

Production Step 4

Deionized water is added to the urethane resin portion (A) and emulsification is performed to produce an aqueous dispersion liquid. As necessary, the aqueous dispersion liquid may be further subjected to chain extension reaction and solvent removal.

When deionized water is added to the urethane resin portion (A), a neutralizing agent for the ion-forming group may be added as necessary.

The neutralizing agent is not particularly limited as long as the ion-forming group can be neutralized, and examples of a basic compound for neutralization include: organic amines such as ammonia, diethylamine, ethylethanolamine, diethanolamine, triethanolamine, monoethanolamine, monopropanolamine, isopropanolamine, ethylaminoethylamine, hydroxyethylamine, triethylamine, tributylamine, dimethylethanolamine, diethylenetriamine, N-methylmorpholine, and N-ethylmorpholine; and alkali metal hydroxides such as sodium hydroxide and potassium hydroxide. The neutralizing agent can be used alone or in combination of two or more types.

The neutralizing agent is preferably used in such an amount that the aqueous dispersion of acrylic urethane composite resin (AB) particles finally has a pH from about 6.0 to 9.0.

In a case where the neutralizing agent is added, an amount of the neutralizing agent to be added is preferably from 0.1 to 1.5 equivalents, more preferably from 0.3 to 1.2 equivalents, with respect to an acid group such as a carboxyl group.

An emulsifier such as a surfactant can be used to improve water dispersion stability of the aqueous dispersion of acrylic urethane composite resin (AB) particles.

As the emulsifier, it is possible to use a well-known general anionic surfactant, a nonionic surfactant, a cationic surfactant, an amphoteric surfactant, a polymeric surfactant, a reactive surfactant, and the like. In a case where these surfactants are used, the anionic surfactant, the nonionic surfactant, or the cationic surfactant is preferable because of low cost and good emulsification.

Examples of the anionic surfactant include: alkyl sulfates such as sodium dodecyl sulfate, potassium dodecyl sulfate, and ammonium dodecyl sulfate; sodium dodecyl polyglycol ether sulfate; sodium sulforicinoleate; alkyl sulfonates such as alkali metal salts of sulfonated paraffin and ammonium salts of sulfonated paraffin; fatty acid salts such as sodium laurate, triethanolamine oleate, and triethanolamine abietate; alkylaryl sulfonates such as sodium benzenesulfonate and alkali metal sulfate of alkaline phenolhydroxyethylene; higher alkyl naphthalenesulfonates; naphthalenesulfonic acid-formalin condensates; dialkyl sulfosuccinates; polyoxyethylene alkyl sulfate salts; and polyoxyethylene alkylaryl sulfate salts.

Examples of the nonionic surfactant include ethylene oxide and/or propylene oxide adducts of alcohols having 1 to 18 carbon atoms, ethylene oxide and/or propylene oxide adducts of alkylphenols, and ethylene oxide and/or propylene oxide adducts of alkylene glycols and/or alkylene diamines Examples of the alcohol having 1 to 18 carbon atoms constituting the nonionic surfactant include methanol, ethanol, propanol, 2-propanol, butanol, 2-butanol, tert-butanol, amyl alcohol, isoamyl alcohol, tert-amyl alcohol, hexanol, octanol, decane alcohol, lauryl alcohol, myristyl alcohol, palmityl alcohol, and stearyl alcohol, examples of the alkylphenol include phenol, methylphenol, 2,4-di-tert-butylphenol, 2,5-di-tert-butylphenol, 3,5-di-tert-butylphenol, 4-(1,3-tetramethylbutyl)phenol, 4-isooctylphenol, 4-nonylphenol, 4-tert-octylphenol, 4-dodecylphenol, 2-(3,5-dimethylheptyl)phenol, 4-(3,5-dimethylheptyl)phenol, naphthol, bisphenol A, and bisphenol F, examples of the alkylene glycol include ethylene glycol, 1,2-propanediol, 1,3-propanediol, 2-methyl-1,3-propanediol, 2-butyl-2-ethyl-1,3-propanediol, 1,4-butanediol, neopentyl glycol, 1,5-pentanediol, 3-methyl-1,5-pentanediol, 2,4-diethyl-1,5-pentanediol, and 1,6-hexanediol, and examples of the alkylenediamine include one produced by substituting an alcoholic hydroxyl group of the alkylene glycol with an amino group. Each of the ethylene oxide and propylene oxide adducts may be a random adduct or a blocked adduct.

Examples of the cationic surfactant include primary to tertiary amine salts, pyridinium salts, alkyl pyridinium salts, and quaternary ammonium salts such as halogenated alkyl quaternary ammonium salts.

The surfactants can be used alone or in combination of two or more.

The emulsification can be performed by dispersion with an ordinary stirrer, but it is possible to use a homomixer, a homogenizer, a disper, a line mixer, or the like to produce a uniform aqueous dispersion liquid with a finer particle size.

In a case where the chain extension reaction (molecular weight increase) is performed, a chain extender other than water may be added as necessary to react the urethane resin portion (A) with the chain extender. As the chain extender, a known chain extender having active hydrogen can be used. Specific examples thereof include: diamine compounds such as ethylenediamine, hexamethylenediamine, cyclohexanediamine, cyclohexylmethanediamine, and isophoronediamine; triamine compounds such as diethylenetriamine; tetraamine compounds such as triethylenetetraamine; aminoalcohol compounds such as hydroxyethylhydrazine, hydroxyethyldiethylenetriamine, N-(2-aminoethyl)ethanol, 1,3-diamino-2-propanol, and 3-aminopropanediol; and hydrazine.

As the chain extender, an amine compound having three or more functional groups such as diethylenetriamine can be suitably used from the perspective of abrasion resistance, glass adhesiveness, and the like of the coating film to be formed, and a diamine compound such as ethylenediamine can be suitably used from the perspective of the chipping resistance of the coating film to be formed.

As the chain extender, an amino alcohol compound such as N-(2-aminoethyl)ethanol can be used for the purpose of introducing a reactive functional group into the aqueous dispersion of acrylic urethane composite resin (AB) particles.

Production Step 5

A polymerization initiator is added to the aqueous dispersion liquid to carry out polymerization reaction, thereby producing the aqueous dispersion of acrylic urethane composite resin (AB) particles including the urethane resin portion (A) and the acrylic resin portion (B).

Examples of the polymerization initiator include: organic peroxides, such as benzoyl peroxide, octanoyl peroxide, lauroyl peroxide, stearoyl peroxide, cumene hydroperoxide, tert-butyl peroxide, tert-butyl peroxylaurate, tert-butyl-peroxyisopropyl carbonate, tert-butyl-peroxyacetate, and diisopropylbenzene hydroperoxide; azo compounds, such as azobis(isobutyronitrile), azobis(2,4-dimethylvaleronitrile), azobis(2-methylpropionitrile), azobis(2-methylbutyronitrile), 4,4'-azobis(4-cyanobutanoic acid), dimethyl azobis(2-methylproprionate), azobis[2-methyl-N-(2-hydroxyethyl)-propionamide], azobis 2-methyl-N-[2-(1-hydroxybutyl)]-propionamide, and 2,2'-azobis[N-(2-carboxyethyl)-2-methylpropionamide]; and persulfates, such as potassium persulfate, ammonium persulfate, and sodium persulfate. The polymerization initiators can each be used alone or in combination of two or more. Furthermore, as necessary, a reducing agent such as sugar, sodium formaldehyde sulfoxylate, or an iron complex may be used in combination with the polymerization initiator to form a redox initiator.

In general, an amount of the polymerization initiator to be used is preferably 0.1 mass % or greater, more preferably 0.2 mass % or greater, and preferably 5 mass % or less, more preferably 3 mass % or less, with respect to a total amount of all the monomers used. The method of adding the polymerization initiator is not particularly limited, and can be appropriately selected according to a type, an amount, and the like of the polymerization initiator. For example, the polymerization initiator can be contained in a monomer mixture or an aqueous medium in advance, or can be added all at once or added dropwise at the time of polymerization.

The polymerization reaction can be carried out by a method that has been known in the related art, for example, an emulsion polymerization method in water, a self-emulsification method, or the like.

The acrylic urethane composite resin (AB) synthesized in the above production steps 1 to 5 is synthesized as a dispersion in an aqueous solvent and has a particle form.

Here, the aqueous solvent refers to a solvent containing water as a main component (for example, 70 to 100 mass % of the solvent is water).

The acrylic urethane composite resin (AB) has an average particle size preferably in a range from 10 nm to 5000 nm, more preferably in a range from 10 nm to 1000 nm, particularly preferably in a range from 20 nm to 500 nm, and further particularly preferably in a range from 50 nm to 140 nm, from the perspective of storage stability and the like of the aqueous coating composition to be produced.

The average particle size of the acrylic urethane composite resin (AB) particles can be set to a desired average particle size by adjusting particle size control factors such as a composition of raw materials (polyisocyanate component, polyol component, amine component, and the like), a type of the emulsifier, an amount of the emulsifier, a charging distribution of the emulsifier, a type of the neutralizing agent, an amount of the neutralizing agent, and the like.

In the present specification, the average particle size of the acrylic urethane composite resin (AB) particles is a value measured at 20° C. using a particle size distribution measurement device based on a dynamic light scattering method after dilution with deionized water by a common method. As the particle size distribution measurement device based on the dynamic light scattering method, for example, "ELSZ-2000" (trade name, available from Otsuka Electronics Co., Ltd.) can be used.

The urethane resin portion (A) has a hydroxyl value preferably in a range from 0 mg KOH/g to mg KOH/g, more preferably in a range from 0 mg KOH/g to 30 mg KOH/g, and even more preferably in a range from 0 mg KOH/g to 25 mg KOH/g, from the perspective of abrasion resistance, chipping resistance, glass adhesiveness, and the like of the coating film to be formed.

The urethane resin portion (A) has an acid value preferably in a range from 3.0 mg KOH/g to mg KOH/g, more preferably in a range from 10 mg KOH/g to 60 mg KOH/g, and even more preferably in a range from 20 mg KOH/g to 40 mg KOH/g, from the perspective of storage stability of the aqueous coating composition to be produced.

The acrylic resin portion (B) has a hydroxyl value preferably in a range from 0.5 mg KOH/g to mg KOH/g, more preferably in a range from 2.0 mg KOH/g to 65 mg KOH/g, and even more preferably in a range from 10 mg KOH/g to 45 mg KOH/g, from the perspective of abrasion resistance, chipping resistance, glass adhesiveness, and the like of the coating film to be formed.

The acrylic resin portion (B) has an acid value preferably in a range from 0.7 mg KOH/g to 80 mg KOH/g, more preferably in a range from 3.5 mg KOH/g to 40 mg KOH/g, and particularly preferably in a range from 7.5 mg KOH/g to 25 mg KOH/g, from the perspective of storage stability of the aqueous coating composition to be produced.

The acrylic urethane composite resin (AB) has a hydroxyl value preferably in a range from 0 mg KOH/g to 100 mg KOH/g, more preferably in a range from 0 mg KOH/g to 50 mg KOH/g, and even more preferably in a range from 0 mg KOH/g to 10 mg KOH/g, from the perspective of abrasion resistance, chipping resistance, glass adhesiveness, and the like of the coating film to be formed.

The acrylic urethane composite resin (AB) has an acid value preferably in a range from 5 mg KOH/g to 40 mg KOH/g, more preferably in a range from 5 mg KOH/g to 30 mg KOH/g, and particularly preferably in a range from 7 mg KOH/g to 30 mg KOH/g, from the perspective of storage stability and the like of the aqueous coating composition to be produced.

A mass ratio (B)/(A) of the acrylic resin portion (B) to the urethane resin portion (A) in the aqueous dispersion of acrylic urethane composite resin (AB) particles is preferably in a range from 20/80 to 80/20, more preferably in a range from 30/70 to 70/30, and particularly preferably in a range from to 60/40, from the perspective of storage stability of the aqueous coating composition to be produced and abrasion resistance, chipping resistance, glass adhesiveness, and the like of the coating film to be formed.

A solid content concentration in the aqueous dispersion of acrylic urethane composite resin (AB) particles is preferably in a range from 20 mass % to 50 mass %, and more preferably in a range from mass % to 50 mass %. When the solid content concentration is 50 mass % or less, emulsification becomes easy, and an aqueous dispersion can be easily produced. When the solid content concentration is mass % or greater, an amount of the solvent component decreases, and thus the solid content concentration of the aqueous coating composition can be increased.

Note that in the present specification, the "solid content" refers to nonvolatile components such as a resin, a curing agent, and a pigment remaining after drying at 110° C. for 1 hour. The solid content can be determined, for example, by weighing a sample in a heat-resistant container such as an aluminum foil cup, spreading the sample on the bottom surface of the container, then drying the sample at 110° C. for 1 hour, and weighing the mass of the components remaining after drying.

In addition, in the present specification, the "solid content concentration" refers to a content mass ratio of the solid content in a composition. Thus, the solid content concentration of the composition can be calculated, for example, by weighing 1.0 g of the composition into a heat-resistant container such as an aluminum foil cup, spreading the composition on the bottom surface of the container, then drying the composition at 110° C. for 1 hour, weighing the mass of the components in the composition remaining after drying, and determining a ratio of the mass of the components remaining after drying to the total mass of the composition before drying.

The composition of the urethane resin portion (A), the composition of the acrylic resin portion (B), the reaction conditions, and the like are adjusted in the aqueous dispersion of acrylic urethane composite resin (AB) particles, so that it is possible to produce the aqueous dispersion of acrylic urethane composite resin (AB) particles having a desired form such as a core-shell structure including at least two layers of a core layer including any one of the urethane resin portion (A) and the acrylic resin portion (B) and a shell layer including any one of the urethane resin portion (A) and the acrylic resin portion (B), or a form in which the urethane resin portion (A) and the acrylic resin portion (B) are partially or entirely mixed.

Note that specifically, the core-shell structure refers to a structure in which components having different resin compositions are present in the same particle, and a central portion (core) and an outer shell portion (shell) include different resin compositions.

The aqueous dispersion of acrylic urethane composite resin (AB) particles is preferably an aqueous dispersion of acrylic urethane composite resin (AB') particles having a core-shell structure including a shell portion of the urethane resin portion (A) and a core portion of the acrylic resin portion (B) from the perspective of storage stability of the aqueous coating composition to be formed and abrasion resistance, chipping resistance, glass adhesiveness, and the like of the coating film to be formed.

Aqueous Dispersion of Acrylic Urethane Composite Resin (AB') Particles Having Core-Shell Structure The aqueous dispersion of acrylic urethane composite resin (AB') particles having a core-shell structure is usually synthesized as a dispersion in an aqueous solvent.

In the aqueous dispersion of acrylic urethane composite resin (AB') particles having a core-shell structure, preferably, particles each having a structure in which the urethane resin portion (A) constituting the shell portion is located around the acrylic resin portion (B) constituting the core portion in a dispersion stabilizer manner are dispersed in an aqueous medium. In other words, preferably, particles are dispersed in the aqueous solvent in a form having a core-shell structure in which the urethane resin portion (A) constituting the shell portion is on the outer side and the acrylic resin portion (B) constituting the core portion is on the inner side. It is believed that particles actually have such a form.

The core-shell structure described above is typically a layer structure in which the core portion is completely covered by the shell portion, but depending on the mass ratio of the core portion to the shell portion and other conditions, an amount of the shell portion may be insufficient for forming a layer structure. In such a case, it is not necessary to have a complete layer structure as described above, and the structure may be a structure in which a part of the core portion is covered by the shell portion.

As a method for producing the aqueous dispersion of acrylic urethane composite resin (AB') particles having the core-shell structure, a method for producing an acrylic urethane composite resin that has been known in the related art can be used as long as the method can produce a form having the core-shell structure. For example, in the production step 2 of the aqueous dispersion of acrylic urethane composite resin (AB) particles, a compound having both an active hydrogen group and an ion-forming group as a constituent component of the urethane resin portion (A) is used, so that it is possible to produce the aqueous dispersion of acrylic urethane composite resin (AB') particles having the core-shell structure.

As the compound having both an active hydrogen group and an ion-forming group, the compounds having both an active hydrogen group and an ion-forming group exemplified in the aqueous dispersion of acrylic urethane composite resin (AB) particles can be used, and these compounds can be used alone or in combination of two or more.

Among them, as the compound having both an active hydrogen group and an ion-forming group, a compound having two or more hydroxyl groups and one or more carboxyl groups per molecule and a compound having two or more hydroxyl groups and one or more sulfonic acid groups per molecule can be suitably used.

As the compound having two or more hydroxyl groups and one or more carboxyl groups per molecule, the compounds having two or more hydroxyl groups and one or more carboxyl groups per molecule exemplified for the aqueous dispersion of acrylic urethane composite resin (AB) particles can be used, and these compounds can be used alone or in combination of two or more.

As the compound having two or more hydroxyl groups and one or more sulfonic acid groups per molecule, the compounds having two or more hydroxyl groups and one or more sulfonic acid groups per molecule exemplified for the aqueous dispersion of acrylic urethane composite resin (AB) particles can be used, and these compounds can be used alone or in combination of two or more.

As the compound having both an active hydrogen group and an ion-forming group, it is preferable to use a compound having two or more hydroxyl groups and one or more carboxyl groups in the molecule from the perspective of storage stability and the like of the aqueous coating composition to be produced.

In a case where the urethane resin portion (A) constituting the shell portion contains the compound having two or more hydroxyl groups and one or more carboxyl groups, a content thereof is preferably in a range from 1 mass % to 30 mass %, more preferably in a range from 1 mass % to 25 mass %, and even more preferably in a range from 1 mass % to 20 mass %, with respect to the total amount of the compounds constituting the polyol component (a22), from the perspective of storage stability and the like of the aqueous coating composition to be produced.

The average particle size of the acrylic urethane composite resins (AB') particles having the core-shell structure is preferably in a range from 10 nm to 5000 nm, more preferably in a range from 10 nm to 1000 nm, particularly preferably in a range from 20 nm to 500 nm, and further particularly preferably in a range from 50 nm to 140 nm, from the perspective of storage stability of the aqueous coating composition to be produced.

The average particle size of the acrylic urethane composite resin (AB') particles having the core-shell structure can be set to a desired average particle size by adjusting particle size control factors such as the composition of the raw materials (polyisocyanate component, polyol component, amine component, and the like), a type of the emulsifier, an amount of the emulsifier, a charging distribution of the emulsifier, a type of the neutralizing agent, and an amount of the neutralizing agent.

The urethane resin portion (A) constituting the shell portion has a hydroxyl value preferably in a range from 0 mg KOH/g to 45 mg KOH/g, more preferably in a range from 0 mg KOH/g to 30 mg KOH/g, and even more preferably in a range from 0 mg KOH/g to 25 mg KOH/g, from the perspective of abrasion resistance, chipping resistance, glass adhesiveness, and the like of the coating film to be formed.

The urethane resin portion (A) constituting the shell portion has an acid value preferably in a range from 3.0 mg KOH/g to 75 mg KOH/g, more preferably in a range from 10 mg KOH/g to 60 mg KOH/g, and even more preferably in a range from 20 mg KOH/g to 40 mg KOH/g, from the perspective of storage stability and the like of the aqueous coating composition to be produced.

The acrylic resin portion (B) constituting the core portion has a hydroxyl value preferably in a range from 0.5 mg KOH/g to 90 mg KOH/g, more preferably in a range from 2.0 mg KOH/g to 65 mg KOH/g, and even more preferably in a range from 10 mg KOH/g to 45 mg KOH/g, from the perspective of abrasion resistance, chipping resistance, glass adhesiveness, and the like of the coating film to be formed.

The acrylic resin portion (B) constituting the core portion has an acid value preferably in a range from 0.7 mg KOH/g to 80 mg KOH/g, more preferably in a range from 3.5 mg KOH/g to 40 mg KOH/g, and even more preferably in a range from 7.5 mg KOH/g to 25 mg KOH/g, from the perspective of the storage stability and the like of the aqueous coating composition to be produced.

The acrylic urethane composite resin (AB') having the core-shell structure has a hydroxyl value preferably in a range from 0 mg KOH/g to 100 mg KOH/g, more preferably in a range from 0 mg KOH/g to 50 mg KOH/g, and particularly preferably in a range from 0 mg KOH/g to 10 mg KOH/g, from the perspective of abrasion resistance, chipping resistance, glass adhesiveness, and the like of the coating film to be formed.

The acrylic urethane composite resin (AB') having the core-shell structure has an acid value preferably in a range from 5 mg KOH/g to 40 mg KOH/g, more preferably in a range from 5 mg KOH/g to 30 mg KOH/g, and particularly preferably in a range from 7 mg KOH/g to 30 mg KOH/g, from the perspective of storage stability of the aqueous coating composition to be produced.

A mass ratio (B)/(A) of the acrylic resin portion (B) constituting the core portion to the urethane resin portion (A) constituting the shell portion in the aqueous dispersion of acrylic urethane composite resin (AB') particles having the core-shell structure is preferably in a range from 20/80 to 80/20, more preferably in a range from 30/70 to 70/30, and particularly preferably in a range from 40/60 to 60/40, from the perspective of storage stability of the aqueous coating composition to be produced and abrasion resistance, chipping resistance, glass adhesiveness, and the like of the coating film to be formed.

A solid content concentration in the aqueous dispersion of acrylic urethane composite resin (AB') particles having the core-shell structure is preferably in a range from 20 mass % to 50 mass %, and more preferably in a range from 30 mass % to 50 mass %. When the solid content concentration is 50 mass % or less, emulsification becomes easy, and an aqueous dispersion can be easily produced. When the solid content concentration is 20 mass % or greater, an amount of the solvent component decreases, and thus the solid content concentration of the aqueous coating composition can be increased.

Aqueous Coating Composition

The aqueous coating composition of the present invention is an aqueous coating composition that contains the aqueous dispersion of acrylic urethane composite resin (AB) particles and further contains, as necessary, at least one resin selected from the group consisting of an acrylic resin (C) and a polyester resin (D), and a curing agent (E).

A content of the acrylic urethane composite resin (AB) particles in the aqueous coating composition of the present invention is preferably in a range from 10 mass % to 70 mass %, more preferably in a range from 15 mass % to 60 mass %, and even more preferably in a range from 20 mass % to 55 mass %, based on a resin solid content amount in the aqueous coating composition, from the perspective of chipping resistance, glass adhesiveness, and the like of the coating film to be formed.

In a case where the aqueous dispersion of acrylic urethane composite resin (AB') particles having the core-shell structure is contained as the aqueous dispersion of acrylic urethane composite resin (AB) particles, a content of the acrylic urethane composite resin (AB') particles having the core-shell structure is preferably in a range from 50 mass % to 100 mass %, more preferably in a range from 70 mass % to 100 mass %, and further preferably in a range from 90 mass % to 100 mass %, based on a total solid content amount of the aqueous dispersion of acrylic urethane composite resin (AB) particles, from the perspective of storage stability of the aqueous coating composition to be produced and abrasion resistance, chipping resistance, glass adhesiveness, and the like of the coating film to be formed.

Acrylic Resin (C)

As the acrylic resin (C), it is possible to use a water-soluble or water-dispersible acrylic resin known per se that has been used in a water-based coating material in the related art.

The acrylic resin (C) preferably has a crosslinkable functional group capable of reacting with the curing agent (E) described below. Examples of the crosslinkable functional group include a hydroxyl group, a carboxyl group, and an alkoxysilyl group.

The acrylic resin (C) can be produced, for example, by copolymerizing polymerizable unsaturated monomers by a method known per se, such as a solution polymerization method in an organic solvent or an emulsion polymerization method in water.

As the polymerizable unsaturated monomers, for example, the following monomers (i) to (xxi) and the like can be used. The polymerizable unsaturated monomers can be used alone or in combination of two or more.

(i) Alkyl or cycloalkyl (meth)acrylates: such as, for example, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, isostearyl (meth)acrylate, cyclohexyl (meth)acrylate, methylcyclohexyl (meth)acrylate, t-butylcyclohexyl (meth)acrylate, cyclododecyl (meth)acrylate, and tricyclodecanyl (meth)acrylate.

(ii) Polymerizable unsaturated monomers having an isobornyl group: such as isobornyl (meth)acrylate.

(iii) Polymerizable unsaturated monomers having an adamantyl group: such as adamantyl (meth)acrylate.

(iv) Polymerizable unsaturated monomers having a tricyclodecenyl group: such as tricyclodecenyl (meth)acrylate.

(v) Aromatic ring-containing polymerizable unsaturated monomers: such as benzyl (meth)acrylate, styrene, α-methylstyrene, and vinyl toluene.

(vi) Polymerizable unsaturated monomers having an alkoxysilyl groups: such as vinyl trimethoxysilane, vinyltriethoxysilane, vinyltris (2-methoxyethoxy)silane, γ-(meth)acryloyloxypropyl trimethoxysilane, and γ-(meth)acryloyloxypropyl triethoxysilane.

(vii) Polymerizable unsaturated monomers having a fluorinated alkyl group: such as perfluoroalkyl (meth)acrylates such as perfluorobutyl ethyl (meth)acrylate and perfluorooctyl ethyl (meth)acrylate; and fluoroolefins.

(viii) Polymerizable unsaturated monomers having a photopolymerizable functional group such as a maleimide group.

(ix) Vinyl compounds: such as N-vinylpyrrolidone, ethylene, butadiene, chloroprene, vinyl propionate, and vinyl acetate.

(x) Carboxyl group-containing polymerizable unsaturated monomers: such as (meth)acrylic acid, maleic acid, crotonic acid, and β-carboxyethyl (meth)acrylate.

(xi) Nitrogen-containing polymerizable unsaturated monomers: such as (meth)acrylonitrile, (meth)acrylamide, N,N-dimethylaminoethyl (meth)acrylate, N,N-diethylaminoethyl (meth)acrylate, N,N-dimethylaminopropyl (meth)acrylamide, methylene bis(meth)acrylamide, ethylene bis (meth)acrylamide, and adducts of glycidyl (meth)acrylate and amine compounds.

(xii) Polymerizable unsaturated monomers having two or more polymerizable unsaturated groups per molecule: such as allyl (meth)acrylate, ethylene glycol di(meth)acrylate, 1,4-butanediol di(meth)acrylate, neopentyl glycol di(meth)acrylate, and 1,6-hexanediol di(meth)acrylate.

(xiii) Epoxy group-containing polymerizable unsaturated monomers: such as glycidyl (meth)acrylate, β-methylglycidyl (meth)acrylate, 3,4-epoxycyclohexyl methyl(meth)acrylate, 3,4-epoxycyclohexyl ethyl(meth)acrylate, 3,4-epoxycyclohexylpropyl (meth)acrylate, and allyl glycidyl ether.

(xiv) (Meth)acrylates having a polyoxyethylene chain with an alkoxy group at the molecular terminal.

(xv) Polymerizable unsaturated monomers having a sulfonic acid group: such as 2-acrylamido-2-methylpropane sulfonic acid, 2-sulfoethyl (meth)acrylate, allyl sulfonic acid, 4-styrene sulfonic acid, and the like, and sodium salts and ammonium salts of these sulfonic acids.

(xvi) Polymerizable unsaturated monomers having a phosphate group: such as acid phosphoxyethyl (meth)acrylate, acid phosphoxypropyl (meth)acrylate, acid phosphoxypoly(oxyethylene)glycol (meth)acrylate, and acid phosphoxypoly(oxypropylene)glycol (meth)acrylate.

(xvii) Polymerizable unsaturated monomers having a UV-absorbing functional group; such as 2-hydroxy-4-(3-methacryloyloxy-2-hydroxypropoxy)benzophenone, 2-hydroxy-4-(3-acryloyloxy-2-hydroxypropoxy)benzophenone, 2,2'-dihydroxy-4-(3-methacryloyloxy-2-hydroxypropoxy) benzophenone, 2,2'-dihydroxy-4-(3-acryloyloxy-2-hydroxypropoxy)benzophenone, and 2-[2-hydroxy-5-[2-(methacryloyloxy)ethyl]phenyl]-2H-benzotriazole.

(xviii) Photostable polymerizable unsaturated monomers: such as 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine, and 1-crotonoyl-4-crotonoyloxy-2,2,6,6-tetramethylpiperidine.

(xix) Polymerizable unsaturated monomers having a carbonyl group: such as acrolein, diacetone acrylamide, diacetone methacrylamide, acetoacetoxy ethyl methacrylate, formylstyrol, and vinyl alkyl ketones having 4 to 7 carbon atoms (for example, vinyl methyl ketone, vinyl ethyl ketone, vinyl butyl ketone).

(xx) Polymerizable unsaturated monomers having an acid anhydride group: such as maleic anhydride, itaconic anhydride, and citraconic anhydride.

(xxi) Hydroxyl group-containing polymerizable unsaturated monomers: such as monoesterified products of a (meth)acrylic acid and a dihydric alcohol having 2 to 8 carbon atoms, such as 2-hydroxyethyl (meth)acrylate, 2-hydroxypropyl (meth)acrylate, 3-hydroxypropyl (meth)acrylate, and 4-hydroxybutyl (meth)acrylate; ε-caprolactone modified products of these monoesterified products of a (meth)acrylic acid and a dihydric alcohol having 2 to 8 carbon atoms; N-hydroxymethyl (meth)acrylamide; allyl alcohols; and (meth)acrylates having a polyoxyethylene chain with a hydroxyl group at the molecular terminal.

However, a monomer corresponding to "(xvii) Polymerizable unsaturated monomers having a UV-absorbing functional group" described above is excluded from the "hydroxyl group-containing polymerizable unsaturated monomer" described above even though the monomer is a monomer having a hydroxyl group.

In a case where the acrylic resin (C) includes the hydroxyl group-containing polymerizable unsaturated monomer as a constituent component of the acrylic resin (C), a proportion of the hydroxyl group-containing polymerizable unsaturated monomer to be used is preferably in a range from 1 mass % to mass %, more preferably in a range from 2 mass % to 40 mass %, and even more preferably in a range from 3 mass % to 30 mass %, based on the total amount of the monomer components.

In a case where the acrylic resin (C) includes the carboxyl group-containing polymerizable unsaturated monomer as a constituent component of the acrylic resin (C), a proportion of the carboxyl group-containing polymerizable unsaturated monomer to be used is preferably in a range from 1 mass % to mass %, more preferably in a range from 1.5 mass % to 40 mass %, and even more preferably in a range from 2 mass % to 30 mass %, based on the total amount of the monomer components.

In a case where the acrylic resin (C) includes the alkoxysilyl group-containing polymerizable unsaturated monomer as a constituent component of the acrylic resin (C), a proportion of the alkoxysilyl group-containing polymerizable unsaturated monomer to be used is preferably in a range from 1 mass % to mass %, more preferably in a range from 1.5 mass % to 60 mass %, and even more preferably in a range from 2 mass % to 40 mass %, based on the total amount of the monomer components.

The acrylic resin (C) has a hydroxyl value preferably in a range from 1 mg KOH/g to 200 mg KOH/g, more preferably in a range from 2 mg KOH/g to 180 mg KOH/g, and particularly preferably in a range from 5 mg KOH/g to 150 mg KOH/g, from the perspective of curability, abrasion resistance, chipping resistance, glass adhesiveness, and the like of the coating film to be formed.

In addition, the acrylic resin (C) has an acid value preferably in a range from 1 mg KOH/g to 150 mg KOH/g, more preferably in a range from 5 mg KOH/g to 100 mg KOH/g, and even more preferably in a range from 5 mg KOH/g to 80 mg KOH/g, from the perspective of storage stability and the like of the aqueous coating composition to be produced.

In a case where the aqueous coating composition of the present invention contains the acrylic resin (C), a content of the acrylic resin (C) is preferably in a range from 2 mass % to 70 mass %, more preferably in a range from 5 mass % to 60 mass %, and even more preferably in a range from 10 mass % to mass %, based on the resin solid content amount in the aqueous coating composition.

Polyester Resin (D)

As the polyester resin (D), it is possible to use a water-soluble or water-dispersible polyester resin known per se that has been used in water-based coating materials in the related art.

The polyester resin (D) preferably has a crosslinkable functional group capable of reacting with the curing agent (E) described below. Examples of the crosslinkable functional group include a hydroxyl group and a carboxyl group.

The polyester resin (D) can be ordinarily produced by an esterification reaction or a transesterification reaction between an acid component and an alcohol component.

As the acid component, a compound commonly used as an acid component in the production of a polyester resin can be used. Examples of such an acid component include aliphatic polybasic acids, alicyclic polybasic acids, and aromatic polybasic acids.

The aliphatic polybasic acid is generally an aliphatic compound having two or more carboxyl groups per molecule, an acid anhydride of the aliphatic compound, and an esterified product of the aliphatic compound. Examples of the aliphatic polybasic acid include aliphatic polybasic carboxylic acids such as succinic acid, glutaric acid, adipic acid, pimelic acid, suberic acid, azelaic acid, sebacic acid, undecanedioic acid, dodecanedioic acid, brassylic acid, octadecanedioic acid, citric acid, and butanetetracarboxylic acid; anhydrides of these aliphatic polybasic carboxylic acids; and esterified products of lower alkyls having about 1 to 4 carbon atoms of these aliphatic polybasic carboxylic acids. The aliphatic polybasic acids can be used alone or in combination of two or more.

As the aliphatic polybasic acid, adipic acid and/or adipic anhydride is preferably used from the perspective of chipping resistance and the like of the coating film to be formed.

The alicyclic polybasic acid is generally a compound having one or more alicyclic structures and two or more carboxyl groups per molecule, an acid anhydride of the compound, or an esterified product of the compound. The alicyclic structure is primarily a ring structure having four to six members. Examples of the alicyclic polybasic acid include alicyclic polybasic carboxylic acids such as 1,2-cyclohexane dicarboxylic acid, 1,3-cyclohexane dicarboxylic acid, 1,4-cyclohexane dicarboxylic acid, 4-cyclohexene-1,2-dicarboxylic acid, 3-methyl-1,2-cyclohexane dicarboxylic acid, 4-methyl-1,2-cyclohexane dicarboxylic acid, 1,2,4-cyclohexane tricarboxylic acid, and 1,3,5-cyclohexane tricarboxylic acid; anhydrides of these alicyclic polybasic carboxylic acids; and esterified products of lower alkyls having about 1 to 4 carbon atoms of these alicyclic polybasic carboxylic acids. The alicyclic polybasic acids can be used alone or in combination of two or more.

As the alicyclic polybasic acids, from the perspective of chipping resistance and the like of the coating film to be formed, 1,2-cyclohexane dicarboxylic acid, 1,2-cyclohexane dicarboxylic anhydride, 1,3-cyclohexane dicarboxylic acid, 1,4-cyclohexane dicarboxylic acid, 4-cyclohexene-1,2-dicarboxylic acid, or 4-cyclohexene-1,2-dicarboxylic anhydride is preferably used, and among these, 1,2-cyclohexane dicarboxylic acid and/or 1,2-cyclohexane dicarboxylic anhydride is more preferably used.

The aromatic polybasic acid is generally an aromatic compound having two or more carboxyl groups per molecule, an acid anhydride of the aromatic compound, or an esterified product of the aromatic compound, and examples thereof include: aromatic polybasic carboxylic acids, such as phthalic acid, isophthalic acid, terephthalic acid, naphthalene dicarboxylic acid, 4,4'-biphenyl dicarboxylic acid, trimellitic acid, and pyromellitic acid; anhydrides of these aromatic polybasic carboxylic acids; and esterified products of lower alkyls having about 1 to 4 carbon atoms of these aromatic polybasic carboxylic acids. The aromatic polybasic acids can be used alone or in combination of two or more.

As the aromatic polybasic acid, phthalic acid, phthalic anhydride, isophthalic acid, trimellitic acid, or trimellitic anhydride is preferably used.

Furthermore, an acid component other than the aliphatic polybasic acid, the alicyclic polybasic acid, and the aromatic polybasic acid can be used as the acid component. Such acid component is not particularly limited, and examples include fatty acids, such as coconut oil fatty acid, cotton seed oil fatty acid, hempseed oil fatty acid, rice bran oil fatty acid, fish oil fatty acid, tall oil fatty acid, soybean oil fatty acid, linseed oil fatty acid, tung oil fatty acid, rapeseed oil fatty acid, castor oil fatty acid, dehydrated castor oil fatty acid, and safflower oil fatty acid; monocarboxylic acids such as lauric acid, myristic acid, palmitic acid, stearic acid, oleic acid, linoleic acid, linolenic acid, benzoic acid, p-tert-butylbenzoic acid, cyclohexanoic acid, and 10-phenyloctadecanoic acid; and hydroxycarboxylic acids such as lactic acid, 3-hydroxybutanoic acid and 3-hydroxy-4-ethoxybenzoic acid. The acid components can be used alone or in combination of two or more.

As the alcohol component, a polyhydric alcohol having two or more hydroxyl groups per molecule can be suitably used. Examples of the polyhydric alcohols include: dihydric alcohols, such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 2-methyl-1,3-propanediol, 3-methyl-1,2-butanediol, 2-butyl-2-ethyl-1,3-propanediol, 1,2-pentanediol, 1,5-pentanediol, 1,4-pentanediol, 2,4-pentanediol, 2,3-dimethyl trimethylene glycol, tetramethylene glycol, 3-methyl-4,3-pentanediol, 3-methyl-1,5-pentanediol, 2,2,4-trimethyl-1,3-pentanediol, 1,6-hexanediol, 1,5-hexanediol, 1,4-hexanediol, 2,5-hexanediol, neopentylglycol, 1,4-cyclohexane dimethanol, tricyclodecane dimethanol, neopentylglycol hydroxypivalate, hydrogenated bisphenol A, hydrogenated bisphenol F, and dimethylolpropionic acid; polylactone diols produced by adding a lactone compound such as ε-caprolactone to these dihydric alcohols; ester diol compounds such as bis(hydroxyethyl) terephthalate; polyether diol compounds such as an alkylene oxide adduct of bisphenol A, polyethylene glycol, polypropylene glycol, polybutylene glycol, and polytetramethylene ether glycol; trihydric and higher polyhydric alcohols, such as glycerin, trimethylol ethane, trimethylol propane, diglycerin, triglycerin, 1,2,6-hexanetriol, pentaerythritol, dipentaerythritol, tris(2-hydroxyethyl) isocyanuric acid, sorbitol, and mannitol; polylactone polyol compounds produced by adding a lactone compound such as ε-caprolactone to these trihydric and higher polyhydric alcohols; and fatty acid ester compounds of glycerin.

Furthermore, an alcohol component other than the polyhydric alcohols described above can be used. Such an alcohol component is not particularly limited, and examples include monoalcohols such as methanol, ethanol, propyl alcohol, butyl alcohol, stearyl alcohol, and 2-phenoxyethanol; and alcohol compounds produced by reacting an acid with a monoepoxy compound such as a propylene oxide, butylene oxide, and "Cardura E10P" (trade name, glycidyl ester of a synthetic highly-branched saturated fatty acid, available from Hexion Inc.).

The method for producing the polyester resin (D) is not particularly limited, and the polyester resin (D) can be produced according to a typical method. For example, a method can be used in which the acid component and the alcohol component are heated at approximately 150 to 250° C. in a nitrogen stream for approximately 5 to 10 hours, and the acid component and the alcohol component are subjected to an esterification reaction or a transesterification reaction to thereby produce the polyester resin (D).

When the acid component and the alcohol component are to be subjected to the esterification reaction or transesterification reaction, these components may be added all at once into a reaction vessel, or one or both components may be added in multiple batches. Also, first, a hydroxyl group-containing polyester resin may be synthesized, and then an acid anhydride may be reacted with the produced hydroxyl group-containing polyester resin to form a half-ester, thereby producing a carboxyl group-containing polyester resin. In addition, first, the carboxyl group-containing polyester resin may be synthesized, and then the alcohol component may be added to produce a hydroxyl group-containing polyester resin.

For the esterification or transesterification reaction, a catalyst known per se can be used as a catalyst for promoting the reaction. Examples of such catalysts include dibutyltin oxide, antimony trioxide, zinc acetate, manganese acetate, cobalt acetate, calcium acetate, lead acetate, tetrabutyl titanate, and tetraisopropyl titanate.

Furthermore, the polyester resin can be modified with a fatty acid, a monoepoxy compound, a polyisocyanate compound, an acrylic resin, or the like during or after preparation of the resin.

Examples of the fatty acid include coconut oil fatty acid, a cottonseed oil fatty acid, hempseed oil fatty acid, rice bran oil fatty acid, fish oil fatty acid, tall oil fatty acid, soybean oil fatty acid, linseed oil fatty acid, tung oil fatty acid, rapeseed oil fatty acid, castor oil fatty acid, a dehydrated castor oil fatty acid, and safflower oil fatty acid. Further, as the monoepoxy compound, for example, "Cardura E10P" (trade name, glycidyl ester of a synthetic highly-branched saturated fatty acid, available from Hexion Inc.) can be suitably used.

Moreover, examples of the polyisocyanate compound include: aliphatic diisocyanate compounds, such as lysine diisocyanate, hexamethylene diisocyanate, and trimethylhexane diisocyanate; alicyclic diisocyanate compounds, such as hydrogenated xylylene diisocyanate, isophorone diisocyanate, methylcyclohexane-2,4-diisocyanate, methylcyclohexane-2,6-diisocyanate, 4,4'-methylene bis (cyclohexyl isocyanate), and 1,3-(isocyanatomethyl)cyclohexane; aromatic diisocyanate compounds, such as tolylene diisocyanate, xylylene diisocyanate, and diphenylmethane diisocyanate; organic polyisocyanates themselves, such as trivalent and higher valent polyisocyanates such as lysine triisocyanate; adducts of each of these organic polyisocyanates with a polyhydric alcohol, a low molecular weight polyester resin, water, or the like; and cyclized polymers (for example, isocyanurate) and biuret-type adducts of each of these organic polyisocyanates. These polyisocyanate compounds can be used alone or as a mixture of two or more.

As a method of modifying the polyester resin with the acrylic resin, a known method can be used, and examples thereof include a method of polymerizing a mixture of a polymerizable unsaturated group-containing polyester resin and a polymerizable unsaturated monomer, and a method of reacting a polyester resin and an acrylic resin with each other.

The polyester resin (D) has a hydroxyl value preferably in a range from 1 mg KOH/g to 250 mg KOH/g, more preferably in a range from 2 mg KOH/g to 200 mg KOH/g, and even more preferably in a range from 5 mg KOH/g to 180 mg KOH/g.

The polyester resin (D) has an acid value preferably in a range from 1 mg KOH/g to 150 mg KOH/g, more preferably in a range from 2 mg KOH/g to 100 mg KOH/g, and even more preferably in a range from 2 mg KOH/g to 80 mg KOH/g.

The number average molecular weight of the polyester resin (D) is preferably in a range from 500 to 50000, more preferably in a range from 800 to 30000, and even more preferably in a range from 1000 to 10000.

In a case where the aqueous coating composition of the present invention contains the polyester resin (D), a content of the polyester resin (D) is preferably in a range from 2 mass % to 70 mass %, more preferably in a range from 5 mass % to 50 mass %, and even more preferably in a range from 10 mass % to mass %, based on the resin solid content amount in the aqueous coating composition.

Curing Agent (E)

The curing agent (E) is a compound capable of curing the aqueous coating composition by reacting with the crosslinkable functional groups in the aqueous dispersion of acrylic urethane composite resin (AB) particles, the acrylic resin (C), and the polyester resin (D). The curing agent (E) can be used alone or in combination of two or more.

Examples of the curing agent (E) include polycarbodiimide compounds, amino resins, polyisocyanate compounds, blocked polyisocyanate compounds, epoxy group-containing compounds, carboxyl group-containing compounds, hydrazide group-containing compounds, and semicarbazide group-containing compounds.

Among them, from the perspective of abrasion resistance, chipping resistance, glass adhesiveness, and the like of the coating film to be formed, it is preferable to include at least one selected from the group consisting of a polycarbodiimide compound (E1), an amino resin (E2), a polyisocyanate compound (E3), and a blocked polyisocyanate compound (E4), it is more preferable to include at least one selected from the group consisting of a polycarbodiimide compound (E1), an amino resin (E2), and a blocked polyisocyanate compound (E4), and it is even more preferable to contain a polycarbodiimide compound (E1).

The polycarbodiimide compound (E1) is a compound having at least two carbodiimide groups per molecule, and for example, a compound produced by subjecting an isocyanate group of an isocyanate group-containing compound to a carbon dioxide removal reaction can be used.

As the polycarbodiimide compound (E1), it is preferable to use a water-soluble or water-dispersible polycarbodiimide compound from the perspective of storage stability of the aqueous coating composition to be produced and abrasion resistance, glass adhesiveness, and the like of the coating film to be formed. The water-soluble or water-dispersible polycarbodiimide compound is not particularly limited as long as it can be stably dissolved or dispersed in an aqueous medium.

Specific examples of the water-soluble polycarbodiimide compound include "CARBODILITE SV-02", "CARBODILITE V-02", "CARBODILITE V-02-L2", and "CARBODILITE V-04" (all available from Nisshinbo Chemical, Inc., trade names). Examples of the water-dispersible polycarbodiimide compound include "CARBODILITE E-01", "CARBODILITE E-02", and "CARBODILITE E-05" (all available from Nisshinbo Chemical, Inc., trade names).

In a case where the curing agent (E) contains the polycarbodiimide compound (E1), a content of the polycarbodiimide compound (E1) is preferably in a range from 10 mass % to 80 mass %, more preferably in a range from 15 mass % to 70 mass %, and even more preferably in a range from 20 mass % to 65 mass %, based on a total solid content amount of the curing agent (E), from the perspective of storage stability of the aqueous coating composition to be produced and abrasion resistance, glass adhesiveness, and the like of the coating film to be formed.

As the amino resin (E2), a partially methylolated amino resin or a completely methylolated amino resin produced by a reaction of an amino component with an aldehyde component can be used. Examples of the amino component include melamine, urea, benzoguanamine, acetoguanamine, steroguanamine, spiroguanamine, and dicyandiamide. Examples of the aldehyde component include formaldehyde, paraformaldehyde, acetaldehyde, and benzaldehyde.

Furthermore, it is possible to use one produced by partially or completely etherifying methylol groups of the methylolated amino resin with an appropriate alcohol. Examples of the alcohol to be used for the etherification include methyl alcohol, ethyl alcohol, n-propyl alcohol, isopropyl alcohol, n-butyl alcohol, isobutyl alcohol, 2-ethyl-1-butanol, and 2-ethyl-1-hexanol.

As the amino resin (E2), a melamine resin is preferred. As the melamine resin, a methyl-etherified melamine resin produced by partially or completely etherifying methylol groups of a partially or completely methylolated melamine resin with methyl alcohol, a butyl-etherified melamine resin produced by partially or completely etherifying methylol groups of a partially or completely methylolated melamine resin with butyl alcohol, or a methyl-butyl mixed etherified melamine resin produced by partially or completely etherifying methylol groups of a partially or completely methylolated melamine resin with methyl alcohol and butyl alcohol is preferable, and a methyl-butyl mixed etherified melamine resin is more preferable.

The melamine resin has a weight average molecular weight of preferably 400 to 6000, more preferably 500 to 4000, and even more preferably 600 to 3000.

As the melamine resin, commercially available products can be used. Examples of trade names of the commercially available products include "CYMEL 202", "CYMEL 203", "CYMEL 238", "CYMEL 250", "CYMEL 251", "CYMEL 303", "CYMEL 323", "CYMEL 324", "CYMEL 325", "CYMEL 327", "CYMEL 350", "CYMEL 385", "CYMEL 1156", "CYMEL 1158", "CYMEL 1116", and "CYMEL 1130" (all available from Allnex Japan Inc.), and "U-VAN 120", "U-VAN 20HS", "U-VAN 20SE60", "U-VAN 2021", "U-VAN 2028", and "U-VAN 28-60" (all available from Mitsui Chemicals, Inc.).

In a case where the aqueous coating composition of the present invention contains the melamine resin, the aqueous coating composition may contain, as a curing catalyst, a sulfonic acid such as p-toluenesulfonic acid, dodecylbenzenesulfonic acid, or dinonylnaphthalenesulfonic acid; a neutralized salt of the sulfonic acid with an amine; a neutralized salt of a phosphoric acid ester compound with an amine; or the like.

In a case where the curing agent (E) contains the amino resin (E2), a content of the amino resin (E2) is preferably in a range from 10 mass % to 80 mass %, more preferably in a range from 15 mass % to mass %, and even more preferably in a range from 20 mass % to 65 mass %, based on the total solid content amount of the curing agent (E), from the perspective of storage stability of the aqueous coating composition to be produced and abrasion resistance, glass adhesiveness, and the like of the coating film to be formed.

The polyisocyanate compound (E3) is a compound having at least two isocyanate groups per molecule, and examples thereof include aliphatic polyisocyanates, alicyclic polyisocyanates, aromatic-aliphatic polyisocyanates, aromatic polyisocyanates, and derivatives of the polyisocyanates.

Examples of the aliphatic polyisocyanates include: aliphatic diisocyanates, such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, dimer acid diisocyanate, and methyl 2,6-diisocyanatohexanoate (common name: lysine diisocyanate); and aliphatic triisocyanates, such as 2-isocyanatoethyl 2,6-diisocyanatohexanoate, 1,6-diisocyanato-3-isocyanatomethylhexane, 1,4,8-triisocyanatooctane, 1,6,11-triisocyanatoundecane, 1,8-diisocyanato-4-isocyanatomethyloctane, 1,3,6-triisocyanatohexane, and 2,5,7-trimethyl-1,8-diisocyanato-5-isocyanatomethyloctane.

Examples of the alicyclic polyisocyanates include: alicyclic diisocyanates, such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4-methyl-1,3-cyclohexylene diisocyanate (common name: hydrogenated TDI), 2-methyl-1,3-cyclohexylene diisocyanate, 1,3- or 1,4-bis(isocyanatomethyl)cyclohexane (common name: hydrogenated xylylene diisocyanate) or its mixture, methylenebis(4,1-cyclohexanediyl) diisocyanate (common name: hydrogenated MDI), and norbornane diisocyanate; and alicyclic triisocyanates, such as 1,3,5-triisocyanatocyclohexane, 1,3,5-trimethylisocyanatocyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1)heptane, 3-(3-isocyanatopropyl)-2,5-di(isocyanatomethyl)-bicyclo(2.2.1)heptane, 5-(2-isocyanatoethyl)-2-isocyanatomethyl-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)-heptane, and 6-(2-isocyanatoethyl)-2-isocyanatomethyl-2-(3-isocyanatopropyl)-bicyclo(2.2.1)heptane.

Examples of the aromatic-aliphatic polyisocyanates include: aromatic-aliphatic diisocyanates, such as methylenebis(4,1-phenylene) diisocyanate (common name: MDI), 1,3- or 1,4-xylylene diisocyanate or its mixture, ω,ω'-diisocyanato-1,4-diethylbenzene, and 1,3- or 1,4-bis(1-isocyanato-1-methylethyl)benzene (common name: tetramethylxylylene diisocyanate) or its mixture; and aromatic-aliphatic triisocyanates, such as 1,3,5-triisocyanatomethylbenzene.

Examples of the aromatic polyisocyanates include: aromatic diisocyanates, such as m-phenylene diisocyanate, p-phenylene diisocyanate, 4,4'-diphenyl diisocyanate, 1,5-naphthalene diisocyanate, 2,4-tolylene diisocyanate (common name: 2,4-TDI) or 2,6-tolylene diisocyanate (common name: 2,6-TDI) or its mixture, 4,4'-toluidine diisocyanate, and 4,4'-diphenyl ether diisocyanate; aromatic triisocyanates, such as triphenylmethane-4,4',4"-triisocyanate, 1,3,5-triisocyanatobenzene, and 2,4,6-triisocyanatotoluene; and aromatic tetraisocyanates, such as 4,4'-diphenylmethane-2,2',5,5'-tetraisocyanate.

Examples of the derivatives of the polyisocyanates include dimers, trimers, biuret, allophanate, uretdione, uretoimine, isocyanurates, oxadiazinetrione, and polymethylene polyphenyl polyisocyanates (crude MDI and polymeric MDI), and crude TDI of the polyisocyanates described above.

The polyisocyanates and their derivatives may each be used alone or in combination of two or more. Among these polyisocyanates, aliphatic diisocyanates, alicyclic diisocyanates and the derivatives thereof are preferred.

In addition, as the polyisocyanate compound, a prepolymer formed by reacting the polyisocyanate or its derivative described above with a compound capable of reacting with the polyisocyanate under a condition of excess isocyanate groups may be used. Examples of the compound capable of reacting with the polyisocyanate include a compound having an active hydrogen group such as a hydroxyl group or an amino group, and specifically, for example, polyhydric alcohols, low molecular weight polyester resins, amines, and water can be used.

In a case where the curing agent (E) contains the polyisocyanate compound (E3), a content of the polyisocyanate compound (E3) is preferably in a range from 10 mass % to 80 mass %, more preferably in a range from 15 mass % to 70 mass %, and even more preferably in a range from 20 mass % to 65 mass %, based on the total solid content amount of the curing agent (E), from the perspective of storage stability of the aqueous coating composition to be produced and abrasion resistance, glass adhesiveness, and the like of the coating film to be formed.

As the polyisocyanate compound (E3), polymers of an isocyanate group-containing polymerizable unsaturated monomer or copolymers of the isocyanate group-containing polymerizable unsaturated monomer and a polymerizable unsaturated monomer other than the isocyanate group-containing polymerizable unsaturated monomer may be used.

The blocked polyisocyanate compound (E4) is a compound produced by blocking an isocyanate group of the polyisocyanate compound (E3) with a blocking agent.

Examples of the blocking agent include: phenolic compounds, such as phenol, cresol, xylenol, nitrophenol, ethylphenol, hydroxydiphenyl, butylphenol, isopropylphenol, nonylphenol, octylphenol, and methyl hydroxybenzoate; lactam-based compounds, such as ε-caprolactam, δ-valerolactam, γ-butyrolactam, and β-propiolactam; aliphatic alcohol-based compounds, such as methanol, ethanol, propyl alcohol, butyl alcohol, amyl alcohol, and lauryl alcohol; ether-based compounds, such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, and methoxymethanol; alcohol-based compounds, such as benzyl alcohol, glycolic acid, methyl glycolate, ethyl glycolate, butyl glycolate, lactic acid, methyl lactate, ethyl lactate, butyl lactate, methylol urea, methylol melamine, diacetone alcohol, 2-hydroxyethyl acrylate, and 2-hydroxyethyl methacrylate; oxime-based compounds, such as formamide oxime, acetoamide oxime, acetoxime, methyl ethyl ketoxime, diacetyl monoxime, benzophenone oxime, and cyclohexane oxime; active methylene-based compounds, such as dimethyl malonate, diethyl malonate, ethyl acetoacetate, methyl acetoacetate, and acetylacetone; mercaptan-based compounds, such as butyl mercaptan, t-butyl mercaptan, hexyl mercaptan, t-dodecyl mercaptan, 2-mercaptobenzothiazole, thiophenol, methylthiophenol, and ethylthiophenol; acid amide-based compounds, such as acetanilide, acetanisidide, acetotoluide, acrylamide, methacrylamide, acetic amide, stearic amide, and benzamide; imide-based compounds, such as succinimide, phthalimide, and maleimide; amine-based compounds, such as diphenylamine, phenylnaphthylamine, xylidine, N-phenylxylidine, carbazole, aniline, naphthylamine, butylamine, dibutylamine, and butylphenylamine; imidazole-based compounds, such as imidazole and 2-ethylimidazole; urea-based compounds, such as urea, thiourea, ethyleneurea, ethylenethiourea, and diphenylurea; carbamic ester-based compounds, such as phenyl N-phenylcarbamate; imine-based compounds, such as ethyleneimine and propyleneimine; sulfite-based compounds, such as sodium bisulfite and potassium bisulfite; and azole-based compounds. Examples of the azole-based compounds include pyrazole or pyrazole derivatives, such as pyrazole, 3,5-dimethylpyrazole, 3-methylpyrazole, 4-benzyl-3,5-dimethylpyrazole, 4-nitro-3,5-dimethylpyrazole, 4-bromo-3,5-dimethylpyrazole, and 3-methyl-5-phenylpyrazole; imidazole or imidazole derivatives, such as imidazole, benzimidazole, 2-methylimidazole, 2-ethylimidazole, and 2-phenylimidazole; and imidazoline derivatives, such as 2-methylimidazoline and 2-phenylimidazoline.

Among them, preferred examples of the blocking agent include active methylene-based blocking agents, pyrazole, and pyrazole derivatives.

When the polyisocyanate compound is blocked (the polyisocyanate compound is reacted with a blocking agent), a solvent can be added as necessary to perform blocking. The solvent used in the blocking reaction is preferably a solvent not reactive with an isocyanate group, and examples include ketones, such as acetone and methyl ethyl ketone; esters, such as ethyl acetate; and a solvent such as N-methyl-2-pyrrolidone (NMP).

Furthermore, as the blocking agent, it is also possible to use hydroxycarboxylic acids having one or more hydroxyl groups and one or more carboxyl groups, such as hydroxypivalic acid and dimethylolpropionic acid. In particular, it is possible to suitably use a blocked polyisocyanate compound produced by blocking an isocyanate group using the hydroxycarboxylic acid and then neutralizing a carboxyl group of the hydroxycarboxylic acid to impart water dispersibility.

In a case where the curing agent (E) contains the blocked polyisocyanate compound (E4), a content of the blocked polyisocyanate compound (E4) is preferably in a range from 10 mass % to 80 mass %, more preferably in a range from 15 mass % to 70 mass %, and even more preferably in a range from 20 mass % to 65 mass %, based on the total solid content amount of the curing agent (E), from the perspective of storage stability of the aqueous coating composition to be produced and abrasion resistance, glass adhesiveness, and the like of the coating film to be formed.

The curing agents (E) can each be used alone or in combination of two or more.

In a case where the aqueous coating composition contains the curing agent (E), a content of the curing agent (E) is preferably in a range from 1 mass % to 50 mass %, more preferably in a range from 5 mass % to 45 mass %, and even more preferably in a range from 10 mass % to 40 mass %, based on the resin solid content amount in the aqueous coating composition.

Other Components

The aqueous coating composition of the present invention may further contain, as necessary, a resin other than the aqueous dispersion of acrylic urethane composite resin (AB) particles, the acrylic resin (C), the polyester resin (D), and the curing agent (E), a pigment, an organic solvent, a curing catalyst, a dispersant, an antisettling agent, a defoaming agent, a thickener, an ultraviolet absorber, a photostabilizer, a surface conditioner, and the like.

Examples of the resin other than the aqueous dispersion of acrylic urethane composite resin (AB) particles, the acrylic resin (C), the polyester resin (D), and the curing agent (E) include acrylic urethane composite resins other than the aqueous dispersion of acrylic urethane composite resin (AB) particles, polyurethane resins, polyolefin resins, and epoxy resins.

Examples of the pigment include color pigments, extender pigments, and photoluminescent pigments. The pigments can be used alone or in combination of two or more.

In a case where the aqueous coating composition of the present invention contains the pigment, a compounding amount of the pigment is preferably in a range from 0.1 parts by mass to 200 parts by mass, more preferably in a range from 1 parts by mass to 150 parts by mass, and even more preferably in a range from 3 parts by mass to 120 parts by mass, based on 100 parts by mass of the resin solid content in the aqueous coating composition.

Examples of the color pigment include titanium oxide, zinc oxide, carbon black, molybdenum red, Prussian blue, cobalt blue, azo-based pigments, phthalocyanine-based pigments, quinacridone-based pigments, isoindoline-based pigments, threne-based pigments, perylene-based pigments, dioxazine-based pigments, and diketopyrrolopyrrole-based pigments. Among them, titanium oxide and carbon black can be suitably used.

In a case where the aqueous coating composition of the present invention contains the color pigment, a compounding amount of the color pigment is preferably in a range from 1 parts by mass to 180 parts by mass, more preferably in a range from 5 parts by mass to 150 parts by mass, and even more preferably in a range from 15 parts by mass to 120 parts by mass, based on 100 parts by mass of the resin solid content in the aqueous coating composition.

Examples of the extender pigment include barium sulfate, talc, clay, kaolin, barium carbonate, calcium carbonate, silica, and alumina white. As the extender pigment, barium sulfate and talc can be suitably used from the perspective of coating material stability and finish.

In a case where the aqueous coating composition of the present invention contains the extender pigment, a compounding amount of the extender pigment is preferably in a range from 1 parts by mass to 180 parts by mass, more preferably in a range from 5 parts by mass to 140 parts by mass, and even more preferably in a range from 10 parts by mass to 120 parts by mass, based on 100 parts by mass of the resin solid content in the aqueous coating composition.

Examples of the photoluminescent pigment include aluminum (including vapor-deposited aluminum), copper, zinc, brass, nickel, glass flakes, aluminum oxide, mica, aluminum oxide coated with titanium oxide and/or iron oxide, and mica coated with titanium oxide and/or iron oxide. Among them, an aluminum pigment is preferably used. The aluminum pigment is classified into a non-leafing type aluminum pigment and a leafing type aluminum pigment, and any of them can be used.

The photoluminescent pigment is preferably a scale-shaped pigment. As the photoluminescent pigment, a photoluminescent pigment having a longitudinal dimension in a range from 1 μm to 100 μm, particularly from 5 μm to 40 μm, and a thickness in a range from 0.001 μm to 5 μm, particularly from μm to 2 μm is suitable.

In a case where the aqueous coating composition of the present invention contains the photoluminescent pigment, a compounding amount of the photoluminescent pigment is preferably in a range from 0.1 parts by mass to 100 parts by mass, more preferably in a range from 1 parts by mass to 50 parts by mass, and even more preferably in a range from 3 parts by mass to 25 parts by mass, based on 100 parts by mass of the resin solid content in the aqueous coating composition.

Examples of the organic solvent include: ketone-based solvents, such as acetone, methyl ethyl ketone, and methyl isobutyl ketone; ester-based solvents, such as ethyl acetate, butyl acetate, methyl benzoate, ethyl ethoxypropionate, ethyl propionate, and methyl propionate; alcohol-based solvents, such as isopropanol, n-butanol, isobutanol, and 2-ethylhexanol; ether-based solvents, such as tetrahydrofuran, dioxane, and dimethoxyethane; glycol ether-based solvents, such as ethylene glycol monomethyl ether, ethylene glycol monoethyl ether, diethylene glycol monomethyl ether, propylene glycol monomethyl ether acetate, and 3-methoxybutyl acetate; aromatic hydrocarbon-based solvents; and aliphatic hydrocarbon-based solvents.

When used, the aqueous coating composition of the present invention can be applied by being diluted with water and/or an organic solvent, as necessary, to have an appropriate viscosity adjusted.

The appropriate viscosity varies depending on the composition of the coating material. For example, a viscosity measured with a B-type viscometer at a temperature of 20° C. after 1 minute at 60 rpm (herein, sometimes referred to as a "B60 value") is preferably in a range from 100 mPas to 3000 mPas, more preferably in a range from 300 mPas to 2000 mPas, and even more preferably in a range from 500 mPas to 1500 mPas, from the perspective of appearance and the like of the coating film to be formed. The viscometer used at this time is "LVDV-I" (trade name, available from BROOKFIELD, a B-type viscometer).

In the above description, a coating solid content concentration of the aqueous coating composition of the present invention is usually about 5 to 70 mass %, and preferably about 10 to 55 mass %.

In addition, a gel fraction of the coating film to be formed from the aqueous coating composition of the present invention is preferably 85% or greater, more preferably 87% or greater, and even more preferably 90% or greater, from the perspective of chipping resistance, glass adhesiveness, and the like of the coating film to be formed.

In the present specification, the gel fraction is measured by the following method.

First, the aqueous coating composition of the present invention is applied to a polypropylene plate for gel fraction measurement to have a film thickness of 30 tim and heated at 80° C. for 20 minutes to form a cured coating film. Next, the formed cured coating film is peeled off from the polypropylene plate and placed in a 300-mesh stainless steel mesh vessel whose mass (W1) has been measured in advance, and a total mass (W2) of the cured coating film and the mesh vessel is measured. The mesh vessel including the cured coating film is placed in an equal mass mixture of acetone and methanol heated to 50° C., subjected to extraction treatment for 5 hours, and dried at 110° C. for 60 minutes, a total mass (W3) of the remaining cured coating film and the mesh vessel is then measured, and an insoluble coating film residual ratio (%) calculated according to the following equation is taken as the gel fraction $$\text{Gel fraction }(\%)=100\times(W3-W1)/(W2-W1)$$

The aqueous coating composition of the present invention may be either a one-component coating material or a multi-component coating material, but is preferably a one-component coating material from the perspective of excellent productivity without a mixing step of coating materials, simplification of maintenance of a coating machine, and the like.

Method of Forming Coating Film

In a case where a colored coating film is formed on an object to be coated, it is possible to use the aqueous coating composition of the present invention as an aqueous coating composition for forming the colored coating film. The method of forming the coating film in this case can be carried out according to, for example, the following method I.

Method I

A method of forming a coating film, including
 (I-1) applying the aqueous coating composition on an object to be coated to form an uncured colored coating film, and
 (I-2) heating and curing the uncured colored coating film formed in the step (I-1).

Examples of the object to be coated include: outer panel parts and inner panel parts of automobile bodies, such as those of passenger cars, trucks, motorcycles, and buses; automobile parts; outer panel parts of home electrical appliances, such as mobile phones and audio devices. Among them, outer panel parts and inner panel parts of automobile bodies and automobile parts are preferred.

Materials of the objects to be coated are not particularly limited. Examples thereof include: metal materials, such as iron, aluminum, brass, copper, tin plates, stainless steel, galvanized steel, and zinc alloy (such as Zn—Al, Zn—Ni, and Zn—Fe)-plated steel; resins, such as polyethylene resins, polypropylene resins, acrylonitrile-butadiene-styrene (ABS) resins, polyamide resins, acrylic resins, vinylidene chloride resins, polycarbonate resins, polyurethane resins, and epoxy resins; plastic materials, such as various FRPs; inorganic materials, such as glass, cement, and concrete; woods; and fiber materials, such as paper and cloth. As the material, a metal material and a plastic material are preferred.

The object to be coated to which the coating film is applied may be those subjected to surface treatment, such as phosphate salt treatment, chromate treatment, or composite oxide treatment, on metal surfaces of outer panel parts and inner panel parts of automobile bodies, automobile parts, home electrical appliances, metal substrates and the like of steel plates and the like constituting these.

A coating film may be further formed on an object that may or may not be surface-treated. For example, an object to be coated, which is a substrate, may be surface-treated as necessary, and an undercoating film may be formed on the treated surface. For example, in a case where the object to be coated is an automobile body, the undercoating film can be formed using a coating material for undercoating that is per se known and typically used in coating automobile bodies.

For example, an electrodeposition paint, preferably a cationic electrodeposition paint, can be used as the undercoating paint for undercoating to form the undercoating film.

In a case where the object to be coated has the undercoating film formed, an intermediate coating film may be further formed thereon. For example, in a case where the object to be coated is an automobile body, the intermediate coating film can be formed using a coating material for intermediate coating that is per se known and typically used in coating automobile bodies. The intermediate coating film may be heat-cured or need not be heat-cured.

The aqueous coating composition can be applied onto an object to be coated by a method known per se, such as by air spraying, air-less spraying, rotary atomization coating, or curtain coating, and electrostatic application may be implemented during coating. Among them, air spraying and rotary atomization coating are preferable. Such a coating method can be carried out once or several times until a desired film thickness is achieved.

A coating amount of the aqueous coating composition is preferably an amount such that a cured film thickness of the colored coating film to be formed is 5 to 40 μm, more preferably 7 to 35 μm, and even more preferably 10 to 30 μm.

The heating can be performed by a known means, and for example, a drying furnace, such as a hot air furnace, an electric furnace, or an infrared induction heating furnace, can be applied. The heating temperature is preferably in a range from 60° C. to 150° C., more preferably in a range from 70° C. to 120° C., and even more preferably in a range from 75° C. to 100° C. The heating time is not particularly limited, but is preferably in a range from 10 minutes to 90 minutes and more preferably in a range from 20 minutes to 60 minutes.

Method of Forming Multilayer Coating Film

The aqueous coating composition of the present invention can be used for forming an intermediate coating film and/or for forming a basecoat coating film in a case where a multilayer coating film including an intermediate coating film, a basecoat coating film, and a clearcoat coating film is formed on an object to be coated such as an automobile body by a 3-coat 1-bake scheme.

In a case where the aqueous coating composition of the present invention is used for forming the intermediate coating film, a multilayer coating film can be formed, for example, according to the following method II.

Method II

A method of forming a multilayer coating film including:
(II-1) applying the aqueous coating composition of the present invention onto an object to be coated to form an uncured intermediate coating film;
(II-2) applying a basecoat coating composition onto the uncured intermediate coating film formed in the step (II-1) to form an uncured basecoat coating film;
(II-3) applying a clearcoat coating composition onto the uncured basecoat coating film formed in the step (II-2) to form an uncured clearcoat coating film; and
(II-4) heating and curing the uncured intermediate coating film formed in the step (II-1), the uncured basecoat coating film formed in the step (II-2), and the uncured clearcoat coating film formed in the step (II-3) at a time.

As the object to be coated, the objects to be coated exemplified in the method I can be used.

The object to be coated to which the coating film is applied may be those subjected to surface treatment, such as phosphate salt treatment, chromate treatment, or composite oxide treatment, on metal surfaces of outer panel parts and inner panel parts of automobile bodies, automobile parts, home electrical appliances, metal substrates and the like of steel plates and the like constituting these.

A coating film may be further formed on an object that may or may not be surface-treated. For example, an object to be coated, which is a substrate, may be surface-treated as necessary, and an undercoating film may be formed on the treated surface. For example, in a case where the object to be coated is an automobile body, the undercoating film can be formed using a coating material for undercoating that is per se known and typically used in coating automobile bodies.

For example, an electrodeposition paint, preferably a cationic electrodeposition paint, can be used as the undercoating paint to form the undercoating film.

The aqueous coating composition can be applied onto an object to be coated by a method known per se, such as by air spraying, air-less spraying, rotary atomization coating, or curtain coating, and electrostatic application may be implemented during coating. Among them, air spraying and rotary atomization coating are preferable. Such a coating method can be carried out once or several times until a desired film thickness is achieved.

An amount of the aqueous coating composition to be applied is preferably an amount such that the intermediate coating film to be formed has a cured film thickness from 5 μm to 40 μm, more preferably from 7 μm to 35 μm, and even more preferably from 10 μm to 30 μm.

As the basecoat coating composition, it is possible to use a coating material prepared using: a base resin having a cross-linking functional group such as a carboxyl group or a hydroxyl group, such as an acrylic resin, a polyester resin, an alkyd resin, a urethane resin, or an epoxy resin; and a cross linking agent, such as an amino resin such as a melamine resin or a urea resin, or a polyisocyanate compound that may be blocked; together with a pigment, a thickener, and an optional additional component.

The method for applying the basecoat coating composition is not particularly limited, and it is possible to form a wet coating film by a coating method, for example, air spraying, airless spraying, rotary atomization coating, or curtain coating. In the application methods, an electrostatic voltage may be applied as necessary. Among them, air spraying or rotary atomization coating is particularly preferable. In general, an amount of the basecoat coating composition to be applied is preferably an amount that gives a cured film thickness from 5 μm to 40 μm, more preferably from 7 μm to 35 μm, and even more preferably from 10 μm to 30 μm.

As the clearcoat coating composition, it is possible to use any of thermosetting clear coating compositions that are known for coating of automobile bodies. Examples of the thermosetting clear coating composition include: organic solvent-type thermosetting coating compositions containing a base resin having a cross-linking functional group and a curing agent; aqueous thermosetting coating compositions; and powder thermosetting coating compositions. The clearcoat coating composition is preferably an organic solvent-based thermosetting coating composition containing a base resin having a crosslinkable functional group and a cross-linking agent from the perspective of finished appearance and the like of the multilayer coating film to be formed.

Examples of the crosslinkable functional group included in the base resin include a carboxyl group, a hydroxyl group, an epoxy group, and an alkoxysilyl group. Examples of the type of base resin include acrylic resins, polyester resins, alkyd resins, urethane resins, epoxy resins, and fluororesins. Examples of the curing agent include polyisocyanate compounds, blocked polyisocyanate compounds, melamine resins, urea resins, carboxyl group-containing compounds, carboxyl group-containing resins, epoxy group-containing resins, and epoxy group-containing compounds.

As the combination of the base resin/curing agent in the clearcoat coating composition, a hydroxyl group-containing resin/polyisocyanate compound, a carboxyl group-containing resin/epoxy group-containing resin, a hydroxyl group-containing resin/blocked polyisocyanate compound, a hydroxyl group-containing resin/melamine resin, and the like are preferable, and a hydroxyl group-containing resin/polyisocyanate compound is more preferable.

In addition, the clearcoat coating composition may be a one-component coating material or a multi-component coating material, such as a two-component urethane resin coating material.

Furthermore, the clearcoat coating composition may contain, as necessary in a range in which transparency is not inhibited, a color pigment, a photoluminescent pigment, a dye, or the like, and may further include, as appropriate, an extender pigment, an ultraviolet absorber, a photostabilizer, a defoaming agent, a thickener, a rust inhibitor, a surface conditioner, and the like.

The method for applying the clearcoat coating composition is not particularly limited, and it is possible to form a wet coating film by an application method, for example, air spraying, airless spraying, rotary atomization coating, or curtain coating. In the application methods, an electrostatic voltage may be applied as necessary. Among them, air spraying or rotary atomization coating is particularly preferable. An amount of the clear coating composition to be applied is typically an amount that gives a cured film thickness preferably from 10 μm to 70 μm, and more preferably from 20 μm to 50 μm.

In a case where air spraying, airless spraying, and rotary atomization coating are carried out, it is preferable to appropriately adjust a viscosity of the clear coating composition using a solvent such as an organic solvent to be in a viscosity range suitable for the coating, usually in a viscosity range from about seconds to about 60 seconds, particularly from about 20 seconds to about 50 seconds at 20° C. in a Ford cup No. 4 viscometer.

The heating can be performed by a known means, and for example, a drying furnace, such as a hot air furnace, an electric furnace, or an infrared induction heating furnace, can be applied. The heating temperature is preferably in a range from 60° C. to 150° C., more preferably in a range from 70° C. to 120° C., and even more preferably in a range from 75° C. to 100° C. The heating time is not particularly limited, but is preferably in a range from 10 minutes to 90 minutes and more preferably in a range from 20 minutes to minutes.

In a case where the aqueous coating composition of the present invention is used for forming the basecoat coating film, it is possible to form a multilayer coating film, for example, according to the following method III.

Method III

A method of forming a multilayer coating film including:
(III-1) applying an intermediate coating composition onto an object to be coated to form an uncured intermediate coating film;
(III-2) applying the aqueous coating composition of the present invention onto the uncured intermediate coating film formed in the step (III-1) to form an uncured basecoat coating film;
(III-3) applying a clearcoat coating composition onto the uncured basecoat coating film formed in the step (III-2) to form an uncured clearcoat coating film; and
(III-4) heating and curing the uncured intermediate coating film formed in the step (III-1), the uncured basecoat coating film formed in the step (III-2), and the uncured clearcoat coating film formed in the step (III-3) at a time.

As the object to be coated, the objects to be coated exemplified in the method I can be used.

The object to be coated to which the coating film is applied may be those subjected to surface treatment, such as phosphate salt treatment, chromate treatment, or composite oxide treatment, on metal surfaces of outer panel parts and inner panel parts of automobile bodies, automobile parts, home electrical appliances, metal substrates and the like of steel plates and the like constituting these.

A coating film may be further formed on an object that may or may not be surface-treated. For example, an object to be coated, which is a substrate, may be surface-treated as necessary, and an undercoating film may be formed on the treated surface. For example, in a case where the object to be coated is an automobile body, the undercoating film can be formed using a coating material for undercoating that is per se known and typically used in coating automobile bodies.

For example, an electrodeposition paint, preferably a cationic electrodeposition paint, can be used as the undercoating paint to form the undercoating film.

As the intermediate coating composition, it is possible to use a coating composition prepared using: a base resin having a crosslinkable functional group such as a carboxyl group or a hydroxyl group, such as an acrylic resin, a polyester resin, an alkyd resin, a urethane resin, or an epoxy resin; and a cross-linking agent, such as an amino resin such as a melamine resin or a urea resin, or a polyisocyanate compound that may be blocked; together with a pigment, a thickener, and an optional additional component.

The application method of the intermediate coating composition is not particularly limited, and it is possible to form a wet coating film by an application method, for example, air spraying, airless spraying, rotary atomization coating, or curtain coating. In the application methods, an electrostatic voltage may be applied as necessary. Among them, air spraying or rotary atomization coating is particularly preferable. In general, an amount of the intermediate coating composition to be applied is preferably an amount that gives a cured film thickness from 5 μm to 40 μm, more preferably from 7 μm to μm, and even more preferably from 10 μm to 30 μm.

The aqueous coating composition can be applied onto an object to be coated by a method known per se, such as by air spraying, air-less spraying, rotary atomization coating, or curtain coating, and electrostatic application may be implemented during coating. Among them, air spraying and rotary atomization coating are preferable. Such a coating method can be carried out once or several times until a desired film thickness is achieved.

The amount of the aqueous coating composition to be applied is preferably an amount such that the basecoat coating film to be formed has a cured film thickness from 5 μm to 40 μm, more preferably from 7 μm to 35 μm, and even more preferably from 10 μm to 30 μm.

As the clearcoat coating composition, the clearcoat coating compositions exemplified in the method II can be used.

The method for applying the clearcoat coating composition is not particularly limited, and it is possible to form a wet coating film by an application method, for example, air spraying, airless spraying, rotary atomization coating, or curtain coating. In the application methods, an electrostatic voltage may be applied as necessary. Among them, air spraying or rotary atomization coating is particularly preferable. An amount of the clear coating composition to be applied is typically an amount that gives a cured film thickness preferably from 10 μm to 70 μm, and more preferably from 20 μm to 50 μm.

In a case where air spraying, airless spraying, and rotary atomization coating are carried out, it is preferable to appropriately adjust a viscosity of the clear coating composition using a solvent such as an organic solvent to be in a viscosity range suitable for the coating, usually in a viscosity range from about seconds to about 60 seconds, particularly from about 20 seconds to about 50 seconds at 20° C. in a Ford cup No. 4 viscometer.

The heating can be performed by a known means, and for example, a drying furnace, such as a hot air furnace, an electric furnace, or an infrared induction heating furnace, can be applied. The heating temperature is preferably in a range from 60° C. to 150° C., more preferably in a range from 70° C. to 120° C., and even more preferably in a range from 75° C. to 100° C. The heating time is not particularly limited, but is preferably in a range from 10 minutes to 90 minutes and more preferably in a range from 20 minutes to minutes.

In a case where the aqueous coating composition of the present invention is used for forming the intermediate coating film and the basecoat coating film, a multilayer coating film can be formed, for example, according to the following method IV.

The aqueous coating composition of the present invention used for forming the intermediate coating film and the aqueous coating composition of the present invention used for forming the basecoat coating film may be the same or different from each other.

Method IV

A method of forming a multilayer coating film including:
(IV-1) applying the aqueous coating composition of the present invention onto an object to be coated to form an uncured intermediate coating film;
(IV-2) applying the aqueous coating composition of the present invention onto the uncured intermediate coating film formed in the step (IV-1) to form an uncured basecoat coating film;
(IV-3) applying a clearcoat coating composition onto the uncured basecoat coating film formed in the step (IV-2) to form an uncured clearcoat coating film; and
(IV-4) heating and curing the uncured intermediate coating film formed in the step (IV-1), the uncured basecoat coating film formed in the step (IV-2), and the uncured clearcoat coating film formed in the step (IV-3) at a time.

As the object to be coated, the objects to be coated exemplified in the method I can be used.

The object to be coated to which the coating film is applied may be those subjected to surface treatment, such as phosphate salt treatment, chromate treatment, or composite oxide treatment, on metal surfaces of outer panel parts and inner panel parts of automobile bodies, automobile parts, home electrical appliances, metal substrates and the like of steel plates and the like constituting these.

A coating film may be further formed on an object that may or may not be surface-treated. For example, an object to be coated, which is a substrate, may be surface-treated as necessary, and an undercoating film may be formed on the treated surface. For example, in a case where the object to be coated is an automobile body, the undercoating film can be formed using a coating material for undercoating that is per se known and typically used in coating automobile bodies.

For example, an electrodeposition paint, preferably a cationic electrodeposition paint, can be used as the undercoating paint to form the undercoating film.

The aqueous coating composition to be used for forming the intermediate coating film can be applied onto an object to be coated by a method known per se, such as by air spraying, air-less spraying, rotary atomization coating or curtain coating, and electrostatic application may be implemented during coating. Among them, air spraying and rotary atomization coating are preferable. Such a coating method can be carried out once or several times until a desired film thickness is achieved.

An applied amount of the aqueous coating composition to be used for forming the intermediate coating film is an amount such that the intermediate coating film to be formed has a cured film thickness preferably from 5 μm to 40 μm, more preferably from 7 μm to 35 μm, and even more preferably from 10 μm to 30 μm.

The aqueous coating composition used for forming the basecoat coating film can be applied onto an object to be coated by a method known per se, such as by air spraying, air-less spraying, rotary atomization coating, or curtain coating, and electrostatic application may be implemented during coating. Among them, air spraying and rotary atomization coating are preferable. Such a coating method can be carried out once or several times until a desired film thickness is achieved.

An applied amount of the aqueous coating composition used for forming the basecoat coating film is an amount such that the basecoat coating film to be formed has a cured film thickness preferably from 5 μm to 40 μm, more preferably from 7 μm to 35 μm, and even more preferably from 10 μm to 30 μM.

As the clearcoat coating composition, the clearcoat coating compositions exemplified in the method II can be used.

The method for applying the clearcoat coating composition is not particularly limited, and it is possible to a wet coating film by an application method, for example, air spraying, airless spraying, rotary atomization coating, or curtain coating. In the application methods, an electrostatic voltage may be applied as necessary. Among them, air spraying or rotary atomization coating is particularly preferable. An amount of the clear coating composition to be applied is typically an amount that gives a cured film thickness preferably from 10 μm to 70 μm, and more preferably from 20 μm to 50 μm.

In a case where air spraying, airless spraying, and rotary atomization coating are carried out, it is preferable to appropriately adjust a viscosity of the clear coating composition using a solvent such as an organic solvent to be in a viscosity range suitable for the coating, usually in a viscosity range from about seconds to about 60 seconds, particularly from about 20 seconds to about 50 seconds at 20° C. in a Ford cup No. 4 viscometer.

The heating can be performed by a known means, and for example, a drying furnace, such as a hot air furnace, an electric furnace, or an infrared induction heating furnace, can be applied. The heating temperature is preferably in a range from 60° C. to 150° C., more preferably in a range from 70° C. to 120° C., and even more preferably in a range from 75° C. to 100° C. The heating time is not particularly limited, but is preferably in a range from 10 minutes to 90 minutes and more preferably in a range from 20 minutes to 5 minutes.

EXAMPLES

The present invention will be described more specifically below through production examples, examples, and comparative examples. However, the present invention is not limited by these examples. In each example, "parts" and "%" are based on mass unless otherwise specified. In addition, the film thickness of the coating film is based on a cured coating film.

Production of Compound (a1) Having Secondary Amino Group and Alkoxysilyl Group

Production Example 1

To a reaction vessel equipped with a thermometer, a thermostat, a stirrer, and a reflux condenser, 55.89 parts of n-butyl acrylate and 0.01 parts of dibutylhydroxytoluene were charged, stirred and mixed under airflow, and heated to 50° C. Subsequently, 44.1 parts of "KBM-602" (trade name, available from Shin-Etsu Chemical Co., Ltd., N-2-(aminoethyl)-3-aminopropylmethyldimethoxysilane) was added dropwise to the reaction vessel maintained at the same temperature over 2 hours. After completion of the dropwise addition, 1.0 part of butyl acetate was charged into the reaction vessel, followed by aging for 2 hours. Subsequently, contents of the reaction vessel were discharged while being filtered through a 100-mesh nylon cloth, and then the discharged contents were allowed to stand in a thermostatic chamber at 50° C. for 1 week to produce a compound (a1-1) containing a secondary amino group and an alkoxysilyl group.

Production Examples 2 to 12

Compounds (a1-2) to (a1-12) each having a secondary amino group and an alkoxysilyl group were produced in the same manner as in Production Example 1, except that the formulation in Production Example 1 was changed to those shown in Table 1 below.

TABLE 1

| Production Example | | | | 1 | 2 | 3 | 4 | 5 | 6 |
|---|---|---|---|---|---|---|---|---|---|
| No. of compound (a1) containing secondary amino group and alkoxysilyl group | | | | a1-1 | a1-2 | a1-3 | a1-4 | a1-5 | a1-6 |
| Compound (a1) containing secondary amino group and alkoxysilyl group | Compound (a11) containing amino group and alkoxysilyl group | Compound (a11-1) containing primary amino group, secondary amino group, and alkoxysilyl group | KBM-602 | 44.1 | | | 54.0 | 50.2 | 35.4 |
| | | | KBM-603 (note 1) | | 46.0 | | | | |
| | | KBM-903 (note 2) | | | | 62.90 | | | |
| | Polymerizable unsaturated group-containing compound (a12) | Methyl acrylate | | | | | 46.02 | | |
| | | Ethyl acrylate | | | | | | 49.78 | |
| | | n-butyl acrylate | | 55.89 | 54.00 | 37.09 | | | |
| | | 2-Ethylhexyl acrylate | | | | | | | 64.60 |
| | | Lauryl acrylate | | | | | | | |
| | | Isostearyl acrylate | | | | | | | |
| | | Dimethyl maleate | | | | | | | |
| | | 2-hydroxyethyl acrylate | | | | | | | |
| | Antioxidant | Dibutylhydroxytoluene | | 0.01 | 0.01 | 0.01 | 0.01 | 0.01 | 0.01 |

| Production Example | | | | 7 | 8 | 9 | 10 | 11 | 12 |
|---|---|---|---|---|---|---|---|---|---|
| No. of compound (a1) containing secondary amino group and alkoxysilyl group | | | | a1-7 | a1-8 | a1-9 | a1-10 | a1-11 | a1-12 |
| Compound (a1) containing secondary amino group and alkoxysilyl group | Compound (a11) containing amino group and alkoxysilyl group | Compound (a11-1) containing primary amino group, secondary amino group, and alkoxysilyl group | KBM-602 | 29.6 | 23.7 | 37.0 | 46.5 | 51.3 | 61.2 |
| | | | KBM-603 (note 1) | | | | | | |
| | | KBM-903 (note 2) | | | | | | | |
| | Polymerizable unsaturated group-containing compound (a12) | Methyl acrylate | | | | | | | |
| | | Ethyl acrylate | | | | | | | |
| | | n-butyl acrylate | | | | | | 48.73 | 38.79 |
| | | 2-Ethylhexyl acrylate | | | | | | | |
| | | Lauryl acrylate | | 70.42 | | | | | |
| | | Isostearyl acrylate | | | 76.27 | | | | |
| | | Dimethyl maleate | | | | 63.03 | | | |
| | | 2-hydroxyethyl acrylate | | | | | 53.48 | | |
| | Antioxidant | Dibutylhydroxytoluene | | 0.01 | 0.01 | 0.01 | 0.01 | 0.01 | 0.01 |

The components shown in the table are as follows.
(note 1)
"KBM-603": trade name, available from Shin-Etsu Chemical Co., Ltd., N-2-(aminoethyl)-3-aminopropyltrimethoxysilane
(note 2)
"KBM-903": trade name, available from Shin-Etsu Chemical Co., Ltd., 3-aminopropyltrimethoxysilane Production of Aqueous Dispersion of Acrylic Urethane Composite Resin (AB') Particles Example 1

To a reaction vessel equipped with a thermometer, a thermostat, a stirrer, and a reflux condenser, 41.0 parts of n-butyl acrylate, 2.49 parts of allyl methacrylate, 16.1 parts of "ETERNACOLL UH-200" (trade name, available from UBE Corporation, polycarbonate diol having 1,6-hexanediol as main skeleton, molecular weight of 2000), 9.7 parts of "PTMG2000" (trade name, available from Mitsubishi Chemical Corporation, polytetramethylene ether glycol, molecular weight of 2000), 0.29 parts of 1,4-cyclohexanedimethanol, 4.7 parts of dimethylolpropionic acid, 0.02 parts of p-methoxyphenol (polymerization inhibitor of unsaturated group), and 0.004 parts of "NEOSTANN U-600" (trade name, available from Nitto Kasei Co., Ltd., bismuth-based catalyst) were charged, contents in the reaction vessel were heated to 80° C. while being stirred and mixed in airflow, and then, 2.1 parts of isophorone diisocyanate and 12.9 parts of dicyclohexylmethane-4,4'-diisocyanate were added dropwise to the reaction vessel over 30 minutes. Thereafter, the temperature of the contents in the reaction vessel was raised to 100° C., and the contents were reacted until a content of free isocyanate groups became 2.0% or less, thereby producing a diluted acrylic monomer liquid of urethane prepolymer.

Next, the diluted acrylic monomer liquid of urethane prepolymer in the reaction vessel was cooled to 60° C., 2.84 parts of the compound (a1-1) containing a secondary amino group and an alkoxysilyl group produced in Production Example 1 was added dropwise to the reaction vessel over 10 minutes, and after completion of the dropwise addition, contents of the reaction vessel were aged for 20 minutes. Next, the temperature of the contents of the reaction vessel was raised to 100° C., 4.97 parts of 2-hydroxyethyl methacrylate was added to the reaction vessel, reaction was carried out until a content of free isocyanate groups became 0.1% or less, and then the contents of the reaction vessel were cooled to room temperature.

Next, 2.7 parts of triethylamine and 117.8 parts of deionized water were added dropwise to the reaction vessel over 60 minutes.

Then, the temperature of the contents in the reaction vessel was raised to 70° C. while being stirred in airflow, a polymerization initiator solution prepared by dissolving 0.15 parts of "VA-057" (trade name, available from Wako Pure Chemical Industries, Ltd., polymerization initiator, 2,2'-azobisIN-(2-carboxyethyl)-2-methylpropionamidep in 9.2 parts of deionized water was added dropwise to the reaction vessel over 30 minutes, and then, the contents in the reaction vessel was stirred for 3 hours to carry out polymerization of acrylic resin components (polymerizable unsaturated groups) During this time, as necessary, the temperature of the contents in the reaction vessel was appropriately controlled.

Thereafter, the contents in the reaction vessel were cooled to room temperature, and the concentration of the contents ware adjusted using deionized water to produce an aqueous dispersion of acrylic urethane composite resin (AB'-1) particles having a solid content concentration of 40%, an acid value of 20 mg KOH/g, and an average particle size of 140 nm (diluted with deionized water and measured at 20° C. using a particle size distribution measurement device based on the dynamic light scattering method "ELSZ-2000" (trade name, available from Otsuka Electronics Co., Ltd.)) and having a core-shell structure composed of a shell portion of a urethane resin portion and a core portion of an acrylic resin portion.

Examples 2 to 40 and Comparative Examples 1 to 2

Aqueous dispersions of acrylic urethane composite resin (AB'-2) to (AB'-40) and (AB'-44) to (AB'-45) particles were produced in the same manner as in Example 1, except that the formulation in Example 1 was changed to those shown in Table 2 below.

Example 41

To a reaction vessel equipped with a thermometer, a thermostat, a stirrer, and a reflux condenser, 40.5 parts of n-butylacrylate, 2.46 parts of allyl methacrylate, 15.4 parts of "ETERNACOLL UH-200" (trade name, available from UBE Corporation, polycarbonate diol having 1,6-hexanediol as main skeleton, molecular weight of 2000), 9.0 parts of "PTMG2000" (trade name, available from Mitsubishi Chemical Corporation, polytetramethylene ether glycol, molecular weight of 2000), 0.23 parts of 1,4-cyclohexanedimethanol, 1.03 parts of "Blemmer GLM" (trade name, available from NOF Corporation, glycerin monomethacrylate), 4.7 parts of dimethylolpropionic acid, 0.02 parts of p-methoxyphenol (polymerization inhibitor of unsaturated groups), and 0.004 parts of "NEOSTANN U-600" (trade name, available from Nitto Kasei Co., Ltd., bismuth-based catalyst) were charged, contents in the reaction vessel were heated to 80° C. while being stirred and mixed in airflow, and then, 3.4 parts of isophorone diisocyanate and 12.6 parts of dicyclohexylmethane-4,4'-diisocyanate were added dropwise to the reaction vessel over 30 minutes. Thereafter, the temperature of the contents in the reaction vessel was raised to 100° C., and the contents were reacted until a content of free isocyanate groups became 2.0% or less, thereby producing a diluted solution of urethane prepolymer in an acrylic monomer.

Next, the diluted acrylic monomer liquid of urethane prepolymer in the reaction vessel was cooled to 60° C., and 2.79 parts of the compound (a1-1) containing a secondary amino group and an alkoxysilyl group produced in Production Example 1 was added dropwise to the reaction vessel over 10 minutes. After completion of the dropwise addition, the contents in the reaction vessel were aged for 20 minutes and cooled to room temperature.

Next, 4.91 parts of 2-hydroxyethyl methacrylate was added to the reaction vessel, and then 2.7 parts of triethylamine and 117.8 parts of deionized water were added dropwise to the reaction vessel over minutes. After the contents in the reaction vessel were emulsified, 3.6 parts of a 5% ethylenediamine aqueous solution was added dropwise to the reaction vessel over 15 minutes to perform a chain extension reaction.

Then, the temperature of the contents in the reaction vessel was raised to 70° C. while being stirred in airflow, a polymerization initiator solution prepared by dissolving 0.15 parts of "VA-057" (trade name, available from Wako Pure Chemical Industries, Ltd., polymerization initiator, 2,2'-azobis[N-(2-carboxyethyl)-2-methylpropionamide]) in 9.2 parts of deionized water was added dropwise to the reaction vessel over 30 minutes, and then, the contents in the reaction vessel was stirred for 3 hours to carry out polymerization of acrylic resin components (polymerizable unsaturated groups). During this time, as necessary, the temperature of the contents in the reaction vessel was appropriately controlled.

Thereafter, the contents in the reaction vessel were cooled to room temperature, and the concentration of the contents was adjusted using deionized water to produce an aqueous dispersion of acrylic urethane composite resin (AB'-41) particles having a solid content concentration of 40%, an acid value of 20 mg KOH/g, and an average particle size of 120 nm (diluted with deionized water and measured at 20° C. using a particle size distribution measurement device based on the dynamic light scattering method "ELSZ-2000" (trade name, available from Otsuka Electronics Co., Ltd.)) and having a core-shell structure composed of a shell portion of a urethane resin portion and a core portion of an acrylic resin portion.

Examples 42 to 43

Aqueous dispersions of acrylic urethane composite resin (AB'-42) to (AB'-43) particles were produced in the same manner as in Example 41, except that the formulation in Example 41 was changed to those shown in Table 2 below.

TABLE 2

| | | | | Examples | | | | | |
|---|---|---|---|---|---|---|---|---|---|
| | | | | 1 | 2 | 3 | 4 | 5 | 6 |
| No. of acrylic urethane composite resin (AB) | | | | AB'-1 | AB'-2 | AB'-3 | AB'-4 | AB'-5 | AB'-6 |
| Urethane resin portion (A) | Compound (a1) containing secondary amino group and alkoxysilyl group | No. of compound (a1) containing secondary amino group and alkoxysilyl group | | a1-1 | a1-2 | a1-3 | a1-4 | a1-5 | a1-6 |
| | | Amount of compound (a1) containing secondary amino group and alkoxysilyl group KBM-602 | | 2.84 | 2.00 | 1.31 | 1.94 | 1.94 | 3.47 |
| | Isocyanate group-containing urethane prepolymer (a2) | Polyisocyanate component (a21) | Alicyclic polyisocyanate compound (a21-1) | 2.1 | 2.2 | 1.9 | 2.0 | 2.0 | 2.2 |
| | | | Isophorone diisocyanate | 12.9 | 13.1 | 13.4 | 13.2 | 13.2 | 12.6 |
| | | | Dicyclohexylmethane-4,4'-diisocyanate | | | | | | |
| | | | Hexamethylene diisocyanate | | | | | | |
| | | Polyol component (a22) | Polycarbonate polyol (a22-1) | 16.1 | 16.4 | 16.8 | 16.6 | 16.6 | 15.8 |
| | | | ETERNACOLL UH-200 | | | | | | |
| | | | ETERNACOLL UM-90 (3/1) (Note 3) | | | | | | |
| | | | ETERNACOLL UC-100 (Note 4) | | | | | | |
| | | | ETERNACOLL UP-200 (Note 5) | | | | | | |
| | | | Kuraray Polyol C-3090 (Note 6) | | | | | | |
| | | | Polyether polyol (a22-2) | 9.7 | 9.8 | 10.1 | 9.9 | 9.9 | 9.5 |
| | | | PTMG3000 (Note 7) | | | | | | |
| | | | PTMG2000 (Note 8) | | | | | | |
| | | | PTMG1000 (Note 9) | | | | | | |
| | | | SANNIX PP-2000 (Note 10) | | | | | | |
| | | | Compound (a22-3) having two or more hydroxyl groups and one or more polymerizable unsaturated groups | | | | | | |
| | | | Blemmer GLM (Note 11) | | | | | | |
| | | | Epoxy Ester 70PA (Note 12) | | | | | | |
| | | | Epoxy Ester 200PA (Note 12) | | | | | | |
| | | | 1,4-cyclohexanedimethanol | 0.29 | 0.30 | 0.31 | 0.30 | 0.30 | 0.29 |
| | | | Dimethylolpropionic acid | 4.7 | 4.8 | 4.8 | 4.7 | 4.7 | 4.7 |
| | | | | 0.02 | 0.02 | 0.02 | 0.02 | 0.02 | 0.02 |
| Polymerization inhibitor | p-Methoxyphenol | | | 2.7 | 2.7 | 2.7 | 2.7 | 2.7 | 2.7 |
| Neutralizing agent | Triethylamine | | | | | | | | |
| | Dimethylethanolamine | | | | | | | | |
| Chain extender | Ethylenediamine | | | | | | | | |
| | Isophoronediamine | | | | | | | | |
| | Diethylenetriamine | | | | | | | | |
| Catalyst | NEOSTANN U-600 | | | 0.004 | 0.004 | 0.004 | 0.004 | 0.004 | 0.004 |

TABLE 2-continued

| | | | | 7 | 8 | 9 | 10 | 11 | 12 |
|---|---|---|---|---|---|---|---|---|---|
| Acrylic resin portion (B) | Compound (b) having polymerizable unsaturated group and having no hydroxyl group or one hydroxyl group | Compound (b1) having polymerizable unsaturated group and having one hydroxyl group | 2-Hydroxyethyl methacrylate | | | | | | |
| | | | 2-Hydroxypropyl acrylate | 4.97 | 4.97 | 4.97 | 4.97 | 4.97 | 4.97 |
| | | Compound (b2) having polymerizable unsaturated group and having no hydroxyl group | Compound (b2-1) having one polymerizable unsaturated group and having no hydroxyl group | | | | | | |
| | | | n-Butyl acrylate | 41.0 | 41.0 | 41.0 | 41.0 | 41.0 | 41.0 |
| | | | Compound (b2-2) having two or more polymerizable unsaturated groups and having no hydroxyl group | | | | | | |
| | | | Allyl methacrylate | 2.49 | 2.49 | 2.49 | 2.49 | 2.49 | 2.49 |
| | | | 1,6-Hexanediol diacrylate | | | | | | |
| Polymerization initiator | VA-057 | | | 0.15 | 0.15 | 0.15 | 0.15 | 0.15 | 0.15 |

| | | | | Examples | | | | | |
|---|---|---|---|---|---|---|---|---|---|
| | | | | 7 | 8 | 9 | 10 | 11 | 12 |
| No. of acrylic urethane composite resin (AB) | | | | AB'-7 | AB'-8 | AB'-9 | AB'-10 | AB'-11 | AB'-12 |
| Urethane resin portion (A) | Compound (a1) containing secondary amino group and alkoxysilyl group KBM-602 | No. of compound (a1) containing secondary amino group and alkoxysilyl group | | a1-7 | a1-8 | a1-9 | a1-10 | a1-11 | a1-12 |
| | | Amount of compound (a1) containing secondary amino group and alkoxysilyl group | | 4.07 | 4.93 | 3.02 | 2.71 | 2.47 | 1.14 |
| | Isocyanate group-containing urethane prepolymer (a2) | Polyisocyanate component (a21) | Isophorone diisocyanate | 2.3 | 2.5 | 2.2 | 2.1 | 2.1 | 2.0 |
| | | | Dicyclohexylmethane-4,4'-diisocyanate (Note 3) | 12.4 | 12.1 | 12.8 | 12.9 | 13.0 | 13.4 |
| | | Alicyclic polyisocyanate compound (a21-1) | ETERNACOLL UH-200 | | | | | | |
| | | Hexamethylene diisocyanate | ETERNACOLL UM-90 (3/1) (Note 4) | | | | | | |
| | | Polyol component (a22) | ETERNACOLL UC-100 (Note 5) | | | | | | |
| | | Polycarbonate polyol (a22-1) | ETERNACOLL UP-200 (Note 6) | | | | | | |
| | | | Kuraray Polyol C-3090 (Note 7) | 15.5 | 15.1 | 16.0 | 16.2 | 16.3 | 16.9 |
| | | Polyether polyol (a22-2) | PTMG3000 (Note 8) | | | | | | |
| | | | PTMG2000 | | | | | | |
| | | | PTMG1000 (Note 9) | 9.3 | 9.1 | 9.6 | 9.7 | 9.7 | 10.2 |
| | | | SANNIX PP-2000 (Note 10) | | | | | | |
| | | Compound (a22-3) | Blemmer GLM | | | | | | |

TABLE 2-continued

| | | | | | Examples | | | | |
|---|---|---|---|---|---|---|---|---|---|
| | | | | 13 | 14 | 15 | 16 | 17 | 18 |
| Acrylic resin portion (B) | | having two or more hydroxyl groups and one or more polymerizable unsaturated groups | Epoxy Ester 70PA (Note 11) | | | | | | |
| | | | Epoxy Ester 200PA (Note 12) | | | | | | |
| | | | 1,4-cyclohexanedimethanol | 0.28 | 0.28 | 0.29 | 0.30 | 0.30 | 0.31 |
| | | | Dimethylolpropionic acid | 4.7 | 4.7 | 4.7 | 4.7 | 4.7 | 4.8 |
| | Polymerization inhibitor | p-Methoxyphenol | | 0.02 | 0.02 | 0.02 | 0.02 | 0.02 | 0.02 |
| | Neutralizing agent | Triethylamine | | 2.7 | 2.7 | 2.7 | 2.7 | 2.7 | 2.7 |
| | | Dimethylethanolamine | | | | | | | |
| | Chain extender | Ethylenediamine | | | | | | | |
| | | Isophoronediamine | | | | | | | |
| | | Diethylenetriamine | | | | | | | |
| | Catalyst | NEOSTANN U-600 | | 0.004 | 0.004 | 0.004 | 0.004 | 0.004 | 0.004 |
| | Compound (b) having polymerizable unsaturated group and having no hydroxyl group or one hydroxyl group | Compound (b1) having one polymerizable unsaturated group and having one hydroxyl group | Compound (b1-1) 2-Hydroxyethyl methacrylate | 4.97 | 4.97 | 4.97 | 4.97 | 4.97 | 4.97 |
| | | | 2-Hydroxypropyl acrylate | | | | | | |
| | | Compound (b2) having one polymerizable unsaturated group and having no hydroxyl group | Compound (b2-1) n-Butyl acrylate | 41.0 | 41.0 | 41.0 | 41.0 | 41.0 | 41.0 |
| | | Compound (b2) having two or more polymerizable unsaturated groups and having no hydroxyl group | Compound (b2-2) Allyl methacrylate | 2.49 | 2.48 | 2.49 | 2.49 | 2.49 | 2.49 |
| | | | 1,6-Hexanediol diacrylate | | | | | | |
| Polymerization initiator | VA-057 | | | 0.15 | 0.15 | 0.15 | 0.15 | 0.15 | 0.15 |
| No. of acrylic urethane composite resin (AB) | | | | AB-13 | AB-14 | AB-15 | AB-16 | AB-17 | AB-18 |
| Urethane resin portion (A) | Compound (a1) containing secondary amino group and alkoxysilyl group KBM-602 | No. of compound (a1) containing secondary amino group and alkoxysilyl group | | a1-1 | a1-1 | a1-1 | a1-1 | a1-1 | a1-1 |
| | | Amount of compound (a1) containing secondary amino group and alkoxysilyl group | | 3.27 | 3.69 | 2.31 | 1.57 | 3.28 | 2.84 |
| | Isocyanate group-containing urethane prepolymer (a2) | Polyisocyanate component (a21) | Alicyclic polyisocyanate compound (a21-1) Isophorone diisocyanate | 2.2 | 2.3 | 2.0 | 2.0 | | 2.1 |
| | | | Dicyclohexylmethane-4,4'-diisocyanate | | | | | | |
| | | | Hexamethylene diisocyanate | | | | | | |
| | | Polyol component (a22) | Polycarbonate polyol (a22-1) ETERNACOLL UH-200 | 12.7 | 12.5 | 13.1 | 13.3 | 10.5 | 12.9 |
| | | | ETERNACOLL UM-90 (3/1) (Note 3) | 15.9 | 15.7 | 16.4 | 16.7 | 18.6 | |
| | | | ETERNACOLL UC-100 (Note 4) | | | | | | |

TABLE 2-continued

| | | | | | Examples | | | | |
|---|---|---|---|---|---|---|---|---|---|
| | | | | 19 | 20 | 21 | 22 | 23 | 24 |
| Urethane resin portion (A) | Polyether polyol (a22-2) | ETERNACOLL UP-200 (Note 5) | | | | | | | |
| | | Kuraray Polyol C-3090 (Note 6) | | | | | | | |
| | | PTMG3000 (Note 7) | | | | | | | |
| | | PTMG2000 (Note 8) | 9.5 | 9.4 | 9.8 | 10.0 | 11.1 | 25.8 |
| | | PTMG1000 | | | | | | |
| | | SANNIX PP-2000 (Note 9) | | | | | | |
| | | Blemmer GLM (Note 10) | | | | | | |
| | | Epoxy Ester 70PA (Note 11) | | | | | | |
| | | Epoxy Ester 200PA (Note 12) | | | | | | |
| | Compound (a22-3) having two or more hydroxyl groups and one or more polymerizable unsaturated groups | 1,4-cyclohexanedimethanol | | | | | | | |
| | | Dimethylolpropionic acid | 0.29 | 0.29 | 0.30 | 0.31 | 0.34 | 0.30 |
| | | | 4.7 | 4.8 | 4.7 | 4.8 | 4.8 | 4.7 |
| | Polymerization inhibitor | p-Methoxyphenol | 0.02 | 0.02 | 0.02 | 0.02 | 0.02 | 0.02 |
| | Neutralizing agent | Triethylamine | 2.7 | 2.7 | 2.7 | 2.7 | 2.7 | 2.7 |
| | Chain extender | Dimethylethanolamine | | | | | | |
| | | Ethylenediamine | | | | | | |
| | | Isophoronediamine | | | | | | |
| | | Diethylenetriamine | | | | | | |
| | Catalyst | NEOSTANN U-600 | 0.004 | 0.004 | 0.004 | 0.004 | 0.004 | 0.004 |
| | | | 4.97 | 4.97 | 4.97 | 4.97 | 4.98 | 4.97 |
| Acrylic resin portion (B) | Compound (b1) having polymerizable unsaturated group and having no hydroxyl group or one hydroxyl group | 2-Hydroxyethyl methacrylate | | | | | | |
| | | 2-Hydroxypropyl acrylate | | | | | | |
| | Compound (b1-1) having one polymerizable unsaturated group and one hydroxyl group | | 41.0 | 41.0 | 41.0 | 41.0 | 41.1 | 41.0 |
| | Compound (b2-1) having one polymerizable unsaturated group and having no hydroxyl group | n-Butyl acrylate | 2.49 | 2.49 | 2.49 | 2.49 | 2.49 | 2.49 |
| | Compound (b2-2) having two or more polymerizable unsaturated groups and having no hydroxyl group | Allyl methacrylate | | | | | | |
| | | 1,6-Hexanediol diacrylate | | | | | | |
| Polymerization initiator | VA-057 | | 0.15 | 0.15 | 0.15 | 0.15 | 0.15 | 0.15 |
| No. of acrylic urethane composite resin (AB) | | | AB-19 | AB-20 | AB-21 | AB-22 | AB-23 | AB-24 |
| Urethane resin portion (A) | Compound (a1) containing secondary amino group and alkoxysilyl group KBM-602 | No. of compound (a1) containing secondary amino group and alkoxysilyl group | a1-1 | a1-1 | a1-1 | a1-1 | a1-1 | a1-1 |
| | | Amount of compound (a1) containing secondary amino group and alkoxysilyl group | 2.86 | 2.85 | 2.84 | 2.85 | 2.84 | 2.84 |

TABLE 2-continued

| | | | | | | | | | |
|---|---|---|---|---|---|---|---|---|---|
| Isocyanate group-containing urethane prepolymer (a2) | Polyisocyanate component (a21) | Alicyclic polyisocyanate compound (a21-1) | Isophorone diisocyanate | 3.5 | 3.3 | 2.1 | 1.6 | 2.1 | 2.1 |
| | | | Dicyclohexylmethane-4,4'-diisocyanate | 12.9 | 12.9 | 12.9 | 12.9 | 12.9 | 12.9 |
| | | Hexamethylene diisocyanate | | | | | | | |
| | Polyol component (a22) | Polycarbonate polyol (a22-1) | ETERNACOLL UH-200 | 12.1 | | | | 21.0 | 11.3 |
| | | | ETERNACOLL UM-90 (3/1) (Note 3) | | 12.4 | | | | |
| | | | ETERNACOLL UC-100 (Note 4) | | | 16.1 | | | |
| | | | ETERNACOLL UP-200 (Note 5) | | | | 16.5 | | |
| | | | Kuraray Polyol C-3090 (Note 6) | | | | | | |
| | | Polyether polyol (a22-2) | PTMG3000 (Note 7) | 12.1 | 12.1 | 9.7 | 9.7 | 4.8 | 14.5 |
| | | | PTMG2000 (Note 8) | | | | | | |
| | | | SANNIX PP-2000 (Note 9) | | | | | | |
| | | | Blemmer GLM (Note 10) | | | | | | |
| | | | Epoxy Ester 70PA (Note 11) | | | | | | |
| | | | Epoxy Ester 200PA (Note 12) | | | | | | |
| | | Compound (a22-3) having two or more hydroxyl groups and one or more polymerizable unsaturated groups | 1,4-cyclohexanedimethanol | 0.30 | 0.30 | 0.29 | 0.30 | 0.29 | 0.29 |
| | | | Dimethylolpropionic acid | 4.7 | 4.7 | 4.7 | 4.8 | 4.7 | 4.7 |
| | Polymerization inhibitor | p-Methoxyphenol | | 0.02 | 0.02 | 0.02 | 0.02 | 0.02 | 0.02 |
| | Neutralizing agent | Triethylamine | | 2.7 | 2.7 | 2.7 | 2.7 | 2.7 | 2.7 |
| | | Dimethylethanolamine | | | | | | | |
| | Chain extender | Ethylenediamine | | | | | | | |
| | | Isophoronediamine | | | | | | | |
| | | Diethylenetriamine | | | | | | | |
| | Catalyst | NEOSTANN U-600 | | 0.004 | 0.004 | 0.004 | 0.004 | 0.004 | 0.004 |
| Acrylic resin portion (B) | Compound (b) having polymerizable unsaturated group and having no hydroxyl group or one hydroxyl group | Compound (b1) having one polymerizable unsaturated group and having one hydroxyl group | 2-Hydroxyethyl methacrylate | 4.97 | 4.97 | 4.97 | 4.97 | 4.97 | 4.97 |
| | | | 2-Hydroxypropyl acrylate | | | | | | |
| | | Compound (b2-1) having one polymerizable unsaturated group and having no hydroxyl group | n-Butyl acrylate | 41.0 | 41.0 | 41.0 | 41.0 | 41.0 | 41.0 |
| | | Compound (b2-2) having two or more polymerizable unsaturated groups and having no hydroxyl group | Allyl methacrylate | 2.49 | 2.49 | 2.49 | 2.49 | 2.49 | 2.49 |
| | | | 1,6-Hexanediol diacrylate | | | | | | |
| Polymerization initiator | VA-057 | | | 0.15 | 0.15 | 0.15 | 0.15 | 0.15 | 0.15 |

TABLE 2-continued

| No. of acrylic urethane composite resin (AB) | | | | 25 | 26 | 27 | 28 | 29 | 30 |
|---|---|---|---|---|---|---|---|---|---|
| Urethane resin portion (A) | Compound (a1) containing secondary amino group and alkoxysilyl group | No. of compound (a1) containing secondary amino group and alkoxysilyl group | | AB'-25 a1-1 | AB'-26 a1-1 | AB'-27 a1-1 | AB'-28 a1-1 | AB'-29 a1-1 | AB'-30 a1-1 |
| | KBM-602 | Amount of compound (a1) containing secondary amino group and alkoxysilyl group | | 2.84 | 2.84 | 2.85 | 2.84 | 2.84 | 2.84 |
| | Isocyanate group-containing urethane prepolymer (a2) | Polyisocyanate component (a21) | Isophorone diisocyanate | 2.1 | 1.8 | 3.0 | 2.1 | 2.1 | 2.1 |
| | | Alicyclic polyisocyanate compound (a21-1) | Dicyclohexylmethane-4,4'-diisocyanate | 12.9 | 12.9 | 12.9 | 12.9 | 12.9 | 12.9 |
| | | Hexamethylene diisocyanate | | | | | | | |
| | | Polyol component (a22) | Polycarbonate polyol (a22-1) | ETERNACOLL UH-200 | 25.8 | 16.1 | 16.2 | 16.1 | 12.9 | 19.3 |
| | | | | ETERNACOLL UM-90 (3/1) (Note 3) | | | | | | |
| | | | | ETERNACOLL UC-100 (Note 4) | | | | | | |
| | | | | ETERNACOLL UP-200 (Note 5) | | | | | | |
| | | | | Kuraray Polyol C-3090 (Note 6) | | | | | | |
| | | | Polyether polyol (a22-2) | PTMG3000 (Note 7) | | 10.0 | | | | |
| | | | | PTMG2000 | | | | | | |
| | | | | PTMG1000 (Note 8) | | | 8.7 | | | 6.4 |
| | | | | SANNIX PP-2000 (Note 9) | | | | 9.7 | | |
| | | | | Blemmer GLM (Note 10) | | | | | 12.9 | |
| | | | Compound (a22-3) having two or more hydroxyl groups and one or more polymerizable unsaturated groups | Epoxy Ester 70PA (Note 11) | | | | | | |
| | | | | Epoxy Ester 200PA (Note 12) | | | | | | |
| | | | 1,4-cyclohexanedimethanol | | | | | | | |
| | | | Dimethylolpropionic acid | | 0.29 | 0.29 | 0.30 | 0.29 | 0.29 | 0.29 |
| | | | | | 4.7 | 4.7 | 4.8 | 4.7 | 4.7 | 4.7 |
| | Polymerization inhibitor | p-Methoxyphenol | | 0.02 | 0.02 | 0.02 | 0.02 | 0.02 | 0.02 |
| | Neutralizing agent | Triethylamine | | 2.7 | 2.7 | 2.7 | 2.7 | 2.7 | 2.7 |
| | | Dimethylethanolamine | | | | | | | |
| | Chain extender | Ethylenediamine | | | | | | | |
| | | Isophoronediamine | | | | | | | |
| | | Diethylenetriamine | | | | | | | |
| | Catalyst | NEOSTANN U-600 | | 0.004 | 0.004 | 0.004 | 0.004 | 0.004 | 0.004 |

TABLE 2-continued

|  |  |  |  | | Examples | | | | |
|---|---|---|---|---|---|---|---|---|---|
|  |  |  |  | | 31 | 32 | 33 | 34 | 35 |
| Acrylic resin portion (B) | Compound (b) having polymerizable unsaturated group and having no hydroxyl group or one hydroxyl group | Compound (b1) having polymerizable unsaturated group and having one hydroxyl group | Compound (b1-1) having one polymerizable unsaturated group and one hydroxyl group | 2-Hydroxyethyl methacrylate | 4.97 | 4.97 | 4.97 | 4.97 | 4.97 |
|  |  |  |  | 2-Hydroxypropyl acrylate | 4.97 | 4.97 | 4.97 | 4.97 | 4.97 |
|  |  | Compound (b2) having polymerizable unsaturated group and having no hydroxyl group | Compound (b2-1) having one polymerizable unsaturated group and having no hydroxyl group | n-Butyl acrylate | 41.0 | 41.0 | 41.0 | 41.0 | 41.0 |
|  |  |  | Compound (b2-2) having two or more polymerizable unsaturated groups and having no hydroxyl group | Allyl methacrylate | 2.49 | 2.49 | 2.49 | 2.49 | 2.49 |
|  |  |  |  | 1,6-Hexanediol diacrylate |  |  |  |  |  |
| Polymerization initiator | VA-057 |  |  |  | 0.15 | 0.15 | 0.15 | 0.15 | 0.15 |
| No. of acrylic urethane composite resin (AB) |  |  |  |  | AB'-31 | AB'-32 | AB'-33 | AB'-34 | AB'-35 |
| Urethane resin portion (A) | Compound (a1) containing secondary amino group and alkoxysilyl group | No. of compound (a1) containing secondary amino group and alkoxysilyl group |  |  | a1-1 | a1-1 | a1-1 | a1-1 | a1-1 |
|  |  | Amount of compound (a1) containing secondary amino group and alkoxysilyl group |  |  | 2.80 | 2.79 | 2.80 | 2.85 | 2.84 |
|  | Isocyanate group-containing urethane prepolymer (a2) | Polyisocyanate component (a21) | Alicyclic polyisocyanate compound (a21-1) | Isophorone diisocyanate | 3.4 | 3.1 | 2.8 | 2.1 | 2.1 |
|  |  |  |  | Dicyclohexylmethane-4,4'-diisocyanate | 12.7 | 12.7 | 12.7 | 12.9 | 12.9 |
|  |  |  | Hexamethylene diisocyanate |  |  |  |  |  |  |
|  |  | Polyol component (a22) | Polycarbonate polyol (a22-1) | ETERNACOLL UH-200 | 15.4 | 15.4 | 15.2 | 16.2 | 16.1 |
|  |  |  |  | ETERNACOLL UM-90 (3/1) (Note 3) |  |  |  |  |  |
|  |  |  |  | ETERNACOLL UC-100 (Note 4) |  |  |  |  |  |
|  |  |  |  | ETERNACOLL UP-200 (Note 5) |  |  |  |  |  |
|  |  |  |  | Kuraray Polyol C-3090 (Note 6) |  |  |  |  |  |
|  |  |  | Polyether polyol (a22-2) | PTMG3000 (Note 7) | 9.0 | 8.7 | 8.7 | 9.7 | 9.7 |
|  |  |  |  | PTMG2000 |  |  |  |  |  |
|  |  |  |  | PTMG1000 (Note 8) |  |  |  |  |  |
|  |  |  |  | SANNIX PP-2000 (Note 9) |  |  |  |  |  |
|  |  |  | Compound (a22-3) | Blemmer GLM (Note 10) | 1.03 |  |  |  |  |

TABLE 2-continued

|  |  |  |  | | Examples | | | |
|---|---|---|---|---|---|---|---|---|
|  |  |  |  | 36 | 37 | 38 | 39 | 40 |
|  |  | | Epoxy Ester 70PA (Note 11) | | | 1.68 | | 0.29 |
|  |  | | Epoxy Ester 200PA (Note 12) | | | | | 4.7 |
|  |  | | 1,4-cyclohexanedimethanol | | | | | 0.02 |
|  |  | | Dimethylolpropionic acid | | | | 2.02 | |
|  | Polymerization inhibitor | p-Methoxyphenol | | 0.23 | 0.23 | 0.23 | 0.30 | 0.23 |
|  |  |  |  | 4.7 | 4.7 | 4.7 | 4.8 | 4.7 |
|  |  |  |  | 0.02 | 0.02 | 0.02 | 0.02 | 0.02 |
|  | Neutralizing agent | Triethylamine | | 2.7 | 2.7 | 2.7 | 2.37 | 2.7 |
|  |  | Dimethylethanolamine | | | | | | |
|  | Chain extender | Ethylenediamine | | | | | | |
|  |  | Isophoronediamine | | | | | | |
|  |  | Diethylenetriamine | | | | | | |
|  | Catalyst | NEOSTANN U-600 | | 0.004 | 0.004 | 0.004 | 0.004 | 0.004 |
| Acrylic resin portion (B) | Compound (b) having polymerizable unsaturated group and having no hydroxyl group or one hydroxyl group | Compound (b1) having polymerizable unsaturated group and having one hydroxyl group | Compound (b1-1) 2-Hydroxyethyl methacrylate 2-Hydroxypropyl acrylate | 4.92 | 4.92 | 4.92 | 4.99 | 4.97 |
|  |  | Compound (b2) having polymerizable unsaturated group and having no hydroxyl group | Compound (b2-1) n-Butyl acrylate | 40.6 | 40.6 | 40.6 | 41.2 | 41.0 |
|  |  |  | Compound (b2-2) having two or more polymerizable unsaturated groups and having no hydroxyl group | 2.46 | 2.46 | 2.46 | 2.49 | 2.49 |
|  |  |  | Allyl methacrylate 1,6-Hexanediol diacrylate | | | | | |
| Polymerization initiator | VA-057 |  |  | 0.15 | 0.15 | 0.15 | 0.15 | 0.15 |

| | | | | 36 | 37 | 38 | 39 | 40 |
|---|---|---|---|---|---|---|---|---|
| No. of acrylic urethane composite resin (AB) | | | | AB'-36 | AB'-37 | AB'-38 | AB'-39 | AB'-40 |
| Urethane resin portion (A) | Compound (a1) containing secondary amino group and alkoxysilyl group KBM-602 | No. of compound (a1) containing secondary amino group and alkoxysilyl group | | a1-1 | a1-1 | a1-1 | a1-1 | a1-1 |
|  |  | Amount of compound (a1) containing secondary amino group and alkoxysilyl group | | 2.84 | 2.84 | 2.84 | 2.31 | 3.36 |
|  | Isocyanate group-containing urethane prepolymer (a2) | Polyisocyanate component (a21) | Alicyclic polyisocyanate compound (a21-1) Isophorone diisocyanate Dicyclohexylmethane-4,4'-diisocyanate | 2.1 | 2.1 | 2.1 | 1.7 | 2.5 |
|  |  |  | Hexamethylene diisocyanate | 12.9 | 12.9 | 12.9 | 10.5 | 15.2 |
|  |  | Polyol component (a22) | Polycarbonate polyol (a22-1) ETERNACOLL UH-200 ETERNACOLL UM-90 (3/1) (Note 3) ETERNACOLL UC-100 (Note 4) | 16.1 | 16.1 | 16.1 | 13.1 | 19.1 |

TABLE 2-continued

| | | | | | | | |
|---|---|---|---|---|---|---|---|
| | | Polyether polyol (a22-2) | ETERNACOLL UP-200 (Note 5) | | | | | |
| | | | Kuraray Polyol C-3090 (Note 6) | | | | | |
| | | | PTMG3000 (Note 7) | 9.7 | 9.7 | 9.7 | 7.8 | 11.4 |
| | | | PTMG2000 | | | | | |
| | | | PTMG1000 (Note 8) | | | | | |
| | | | SANNIX PP-2000 (Note 9) | | | | | |
| | | Compound (a22-3) having two or more hydroxyl groups and one or more polymerizable unsaturated groups | Blemmer GLM (Note 10) | | | | | |
| | | | Epoxy Ester 70PA (Note 11) | | | | | |
| | | | Epoxy Ester 200PA (Note 12) | | | | | |
| | | | 1,4-cyclohexanedimethanol | 0.29 | 0.29 | 0.29 | 0.24 | 0.35 |
| | | | Dimethylolpropionic acid | 4.7 | 4.7 | 4.7 | 3.9 | 5.6 |
| | Polymerization inhibitor | | p-Methoxyphenol | 0.02 | 0.02 | 0.02 | 0.03 | 0.02 |
| | Neutralizing agent | | Triethylamine | 2.7 | 2.7 | 2.7 | 2.2 | 3.2 |
| | Chain extender | | Dimethylethanolamine | | | | | |
| | | | Ethylenediamine | | | | | |
| | | | Isophoronediamine | | | | | |
| | | | Diethylenetriamine | | | | | |
| | Catalyst | | NEOSTANN U-600 | 0.004 | 0.004 | 0.004 | 0.003 | 0.005 |
| Acrylic resin portion (B) | Compound (b) having polymerizable unsaturated group and having no hydroxyl group or one hydroxyl group | Compound (b1) having one polymerizable unsaturated group and having one hydroxyl group | 2-Hydroxyethyl methacrylate | 4.97 | 4.97 | 4.97 | 5.05 | 4.90 |
| | | | 2-Hydroxypropyl acrylate | | | | | |
| | | Compound (b2-1) having one polymerizable unsaturated group and having no hydroxyl group | n-Butyl acrylate | 41.0 | 39.2 | 42.9 | 50.0 | 32.3 |
| | | Compound (b2-2) having two or more polymerizable unsaturated groups and having no hydroxyl group | Allyl methacrylate | 2.49 | 4.35 | 0.62 | 3.03 | 1.96 |
| | | | 1,6-Hexanediol diacrylate | | | | | |
| Polymerization initiator | VA-057 | | | 0.15 | 0.15 | 0.15 | 0.18 | 0.12 |

TABLE 2-continued

| | | | | Examples | | | Comparative Example | |
|---|---|---|---|---|---|---|---|---|
| | | | | 41 | 42 | 43 | 1 | 2 |
| No. of acrylic urethane composite resin (AB) | | | | AB'-41 | AB'-42 | AB'-43 | AB'-44 | AB'-45 |
| Urethane resin portion (A) | Compound (a1) containing secondary amino group and alkoxysilyl group | No. of compound (a1) containing secondary amino group and alkoxysilyl group | | a1-1 | a1-1 | a1-1 | | |
| | | Amount of compound (a1) containing secondary amino group and alkoxysilyl group KBM-602 | | 2.79 | 2.78 | 2.79 | | 0.50 |
| | Isocyanate group-containing urethane prepolymer (a2) | Polyisocyanate component (a21) | Alicyclic polyisocyanate compound (a21-1) Isophorone diisocyanate | 3.4 | 3.4 | 3.4 | 1.7 | 2.5 |
| | | | Dicyclohexylmethane-4,4'-diisocyanate | 12.6 | 12.6 | 12.6 | 13.9 | 12.7 |
| | | | Hexamethylene diisocyanate | | | | | |
| | | Polyol component (a22) | Polycarbonate polyol (a22-1) ETERNACOLL UH-200 | 15.4 | 15.3 | 15.3 | 17.5 | 16.7 |
| | | | ETERNACOLL UM-90 (3/1) (Note 3) | | | | | |
| | | | ETERNACOLL UC-100 (Note 4) | | | | | |
| | | | ETERNACOLL UP-200 (Note 5) | | | | | |
| | | | Kuraray Polyol C-3090 (Note 6) | | | | | |
| | | Polyether polyol (a22-2) | PTMG3000 (Note 7) | 9.0 | 9.0 | 9.0 | 10.5 | 11.1 |
| | | | PTMG2000 | | | | | |
| | | | PTMG1000 (Note 8) | | | | | |
| | | | SANNIX PP-2000 (Note 9) | | | | | |
| | | Compound (a22-3) having two or more hydroxyl groups and one or more polymerizable unsaturated groups | Blemmer GLM (Note 10) | 1.03 | 1.03 | 1.03 | | |
| | | | Epoxy Ester 70PA (Note 11) | | | | | |
| | | | Epoxy Ester 200PA (Note 12) | | | | | |
| | | 1,4-cyclohexanedimethanol | | | | | | |
| | | Dimethylolpropionic acid | | 0.23 | 0.23 | 0.23 | 0.32 | 0.29 |
| | | | | 4.7 | 4.7 | 4.7 | 4.8 | 4.8 |
| | | | | 0.02 | 0.02 | 0.02 | 0.02 | 0.02 |
| | Polymerization inhibitor | p-Methoxyphenol | | 2.7 | 2.6 | 2.7 | 2.7 | 2.7 |
| | Neutralizing agent | Triethylamine | | 0.18 | | | | |
| | | Dimethylethanolamine | | | 0.51 | | | |
| | Chain extender | Ethylenediamine | | | | | | |
| | | Isophoronediamine | | | | 0.31 | | |
| | | Diethylenetriamine | | | | | | |
| | Catalyst | NEOSTANN U-600 | | 0.004 | 0.004 | 0.004 | 0.004 | 0.004 |

TABLE 2-continued

| Acrylic resin portion (B) | Compound (b) having polymerizable unsaturated group and having no hydroxyl group or one hydroxyl group | Compound (b1) having polymerizable unsaturated group and having one hydroxyl group | Compound (b1-1) having one polymerizable unsaturated group and one hydroxyl group | 2-Hydroxyethyl methacrylate 2-Hydroxypropyl acrylate | 4.91 | 4.89 | 4.90 | 4.98 | 4.97 |
|---|---|---|---|---|---|---|---|---|---|
| | | Compound (b2) having polymerizable unsaturated group and having no hydroxyl group | Compound (b2-1) having one polymerizable unsaturated group and having no hydroxyl group | n-Butyl acrylate | 40.5 | 40.4 | 40.5 | 41.1 | 41.0 |
| | | | Compound (b2-2) having two or more polymerizable unsaturated groups and having no hydroxyl group | Allyl methacrylate 1,6-Hexanediol diacrylate | 2.46 | 2.45 | 2.45 | 2.49 | 2.49 |
| Polymerization initiator | VA-057 | | | | 0.15 | 0.15 | 0.15 | 0.15 | 0.15 |

The components shown in the table are as follows.
(Note 3)
ETERNACOLL UM-90 (3/1): trade name, available from UBE Corporation, polycarbonate diol having 1,6-hexanediol and 1,4-cyclohexanedimethanol as main skeletons, molecular weight of 900
(Note 4)
ETERNACOLL UC-100: trade name, available from UBE Corporation, polycarbonate diol having 1,4-cyclohexanedimethanol as a main skeleton, molecular weight of 1000
(Note 5)
ETERNACOLL UP-200: trade name, available from UBE Corporation, polycarbonate diol, molecular weight of 2000
(Note 6)
Kuraray Polyol C-3090: trade name, available from Kuraray Co., Ltd., polycarbonate diol, molecular weight of 3000
(Note 7)
PTMG3000: trade name, available from Mitsubishi Chemical Corporation, polytetramethylene ether glycol, molecular weight of 3000
(Note 8)
PTMG1000: trade name, available from Mitsubishi Chemical Corporation, polytetramethylene ether glycol, molecular weight of 1000
(Note 9)
SANNIX PP-2000: trade name, available from Sanyo Chemical Industries, Ltd., polypropylene glycol, molecular weight of 2000
(Note 10)
Blemmer GLM: trade name, available from NOF Corporation, glycerin monomethacrylate
(Note 11)
Epoxy Ester 70PA: trade name, available from KYOEISHA CHEMICAL Co., Ltd., acrylic acid adduct of propylene glycol diglycidyl ether
(Note 12)
Epoxy Ester 200PA: trade name, available from KYOEISHA CHEMICAL Co., Ltd., acrylic acid adduct of tripropylene glycol diglycidyl ether Production of Acrylic Resin (C)

Production Example 13

To a reaction vessel equipped with a thermometer, a thermostat, a stirrer, a reflux condenser, a nitrogen-introducing tube, and a dripping device, 120 parts of deionized water and 0.8 parts of "ADEKA REASOAP SR-1025" (trade name, available from ADEKA CORPORATION, an emulsifier, active ingredient 25%) were charged, and mixed by stirring in a nitrogen stream, and the temperature of contents in the reaction vessel was raised to 80° C.

Next, an amount of 5% of the total amount of a monomer emulsion for a core portion described below and 2.5 parts of a 6% ammonium persulfate aqueous solution were introduced into the reaction vessel, and the contents in the reaction vessel were maintained at 80° C. for 15 minutes. Subsequently, the remaining portion of the emulsion for the core portion was added dropwise over 3 hours into the reaction vessel maintained at the same temperature, and after completion of the dropwise addition, the mixture was aged for 1 hour. Next, a monomer emulsion for a shell portion described below was then added dropwise over 1 hour, and the mixture was aged for 1 hour, after which the mixture was cooled to 30° C. while 3.8 parts of a 5% 2-(dimethylamino) ethanol aqueous solution was gradually added to the reaction vessel. The mixture was discharged while being filtered with a 100-mesh nylon cloth, and an aqueous dispersion of acrylic resin (C-1) particles having an average particle size of 100 nm and a solid content of 30% was produced. The resulting acrylic resin (C-1) particles had an acid value of 17.2 mg KOH/g and a hydroxyl value of 27.2 mg KOH/g.

Monomer emulsion for core portion: The monomer emulsion for the core portion was produced by mixing and stirring 54 parts of deionized water, 3.1 parts of the "ADEKA RREASOAP SR-1025", 1 part of allyl methacrylate, 10 parts of styrene, 35 parts of n-butyl acrylate, 10 parts of methyl methacrylate, 20 parts of ethyl acrylate, and 1 part of 2-hydroxyethyl methacrylate.

Monomer emulsion for shell portion: The monomer emulsion for the shell portion was produced by mixing and stirring 50 parts of deionized water, 1.8 parts of "ADEKA RREASOAP SR-1025", 0.04 parts of ammonium persulfate, 5.3 parts of 2-hydroxyethyl acrylate, 2.6 parts of methacrylic acid, 8 parts of ethyl acrylate, and 7.1 parts of methyl methacrylate.

Production of Polyester Resin (D)

Production Example 14

To a reaction vessel equipped with a thermometer, a thermostat, a stirrer, a reflux condenser, and a water separator, 126 parts of trimesic acid, 1365 parts of "PTMG650" (trade name, available from Mitsubishi Chemical Corporation, polytetramethylene ether glycol, molecular weight of 650), and 37 parts of glycerin were charged, and the temperature of contents in the reaction vessel was raised from 160° C. to 230° C. over 3 hours, followed by condensation reaction at 230° C. until an end point acid value reached 3 mg KOH/g. Then, to add carboxyl groups to the resulting condensation reaction product, 77 parts of trimellitic anhydride was added and reacted at 170° C. for 30 minutes, and then, 2-(dimethylamino)ethanol was added thereto in 0.5 equivalents with respect to acid groups, the mixture was further diluted with 2-ethyl-1-hexanol, and a polyester resin (D-1) solution having a solid content concentration of 70% was produced. The resulting polyester resin had an acid value of 32 mg KOH/g, a hydroxyl value of 117 mg KOH/g, a solid content concentration of 70%, and a number average molecular weight of 1200.

Production of Blocked Polyisocyanate Compound (E4)

Production Example 15

To a reaction vessel equipped with a thermometer, a thermostat, a stirrer, a reflux condenser, a nitrogen-introducing tube, a dropping device, and a simple trap for a removal solvent, 360 parts of "Sumidur N-3300", 60 parts of "UNIOX M-550" (available from NOF Corporation, polyethylene glycol monomethyl ether, average molecular weight of about 550), and 0.2 parts of 2,6-di-tert-butyl-4-methylphenol were charged, and contents in the reaction vessel were heated at 130° C. for 3 hours under a nitrogen stream while being thoroughly mixed. Next, 110 parts of ethyl acetate and 252 parts of diisopropyl malonate were charged into the reaction vessel, 3 parts of a 28% methanol solution of sodium methoxide was added to the reaction vessel while the contents in the reaction vessel is being stirred under a nitrogen stream, and the contents in the reaction vessel were stirred at 65° C. for 8 hours to produce a resin solution. An amount of isocyanate in the produced resin solution was 0.12 mol/Kg. To the resin solution, 683 parts of 4-methyl-2-pentanol was added, and the solvent was distilled off over 3 hours under reduced pressure while the temperature of the system at 80 to 85° C. being maintained to produce 1010 parts of an active methylene-type blocked polyisocyanate compound (E4-1) solution. The simple trap for solvent removal contained 95 parts of isopropanol. A solid content concentration of the produced active methylene-type blocked polyisocyanate compound (E4-1) was about 60%.

Production of Phosphate Group-Containing Dispersion Resin (R)

Production Example 16

To a reaction vessel equipped with a thermometer, a thermostat, a stirrer, a reflux condenser, a nitrogen-introducing tube, and a dropping device, a mixed solvent of 27.5 parts of methoxypropanol and 27.5 parts of isobutanol, the mixed solvent in the reaction vessel was heated to 110° C., and 121.5 parts of a mixture were added over 4 hours to the mixed solvent, the mixture including 25 parts of styrene, 27.5 parts of n-butyl methacrylate, 20 parts of "isostearyl acrylate" (trade name, available from Osaka Organic Chemical Ind. Ltd., branched higher alkyl acrylate), 7.5 parts of 4-hydroxybutyl acrylate, 15 parts of a phosphate group-containing polymerizable unsaturated monomer (Note 1), 12.5 parts of 2-methacryloyloxyethyl acid phosphate, 10 parts of isobutanol, and 4 parts of t-butylperoxy octanoate. A mixture of 0.5 parts of t-butylperoxy octanoate and 20 parts of isopropanol was further added dropwise over one hour. The contents in the reaction vessel were then aged under stirring for one hour, and a phosphate group-containing dispersion resin solution (R-1) with a solid content concentration of 50% was produced. The acid value due to the phosphate group of the phosphate group-containing dispersion resin (R-1) was 83 mg KOH/g, the hydroxyl value was 29 mg KOH/g, and the weight average molecular weight was 10000.

(Note 1) Phosphate group-containing polymerizable unsaturated monomer: To a reaction vessel equipped with a thermometer, a thermostat, a stirrer, a reflux condenser, a nitrogen gas-introducing tube, and a dropping device, 57.5 parts of monobutyl phosphate and 41 parts of isobutanol were charged, and the temperature of contents in the reaction vessel was raised to 90° C., after which 42.5 parts of glycidyl methacrylate were added dropwise for over 2 hours, and the contents in the reaction vessel were further stirred and aged for 1 hour. Subsequently, 59 parts of isopropanol were added to the reaction vessel, and a phosphate group-containing polymerizable unsaturated monomer solution having a solid content concentration of 50% was produced. The acid value due to the phosphate group of the resulting monomer was 285 mg KOH/g.

Production of Pigment Dispersion Liquid (P)

Production Example 17

28.6 parts (a solid content of 20 parts) of the polyester resin (D-1) solution produced in Production Example 14, 90 parts of "JR-806" (trade name, available from Tayca Corporation, rutile-type titanium dioxide), 30 parts of "BARI-ACE B-35" (trade name, available from Sakai Chemical Industry Co., Ltd., barium sulfate powder), 0.8 parts of "Carbon MA100" (trade name, available from Mitsubishi Chemical Corporation, carbon black), and 10 parts of deionized water were mixed to form a mixed solution, and the pH of the mixed solution was adjusted to 8.0 using 2-(dimethylamino)ethanol. The resulting mixed solution was then placed in a wide-mouth glass bottle, glass beads with a diameter of about 1.3 mm were added as dispersion media, and the wide-mouth glass bottle was sealed. The content was dispersed with a paint shaker for 30 minutes, and a pigment dispersion liquid (P-1) was produced.

Production Example 18

In a vessel equipped with a stirrer, 66.7 parts of the dispersion liquid of acrylic resin (C-1) particles produced in Production Example 13 (solid content 20 parts), 10 parts of "Carbon MA-100" (trade name, available from Mitsubishi Chemical Corporation, carbon black) and 50 parts of deionized water were placed and uniformly mixed to form a mixed solution. The pH of the mixed solution was adjusted to 7.5 using 2-(dimethylamino) ethanol. The resulting mixed solution was then placed in a wide-mouth glass bottle, glass beads with a diameter of about 1.3 mm were added as dispersion media, and the wide-mouth glass bottle was sealed. The content was dispersed with a paint shaker for 4 hours, and a pigment dispersion liquid (P-2) was produced.

Preparation of Aqueous Coating Composition

Example 44

112.5 parts (a solid content of 45 parts) of the aqueous dispersion of acrylic urethane composite resin (AB'-1) particles produced in Example 1, 50 parts (a solid content of 15 parts) of the dispersion of acrylic resin (C-1) particles produced in Production Example 13, 25 parts (a solid content of parts) of "CARBODILITE SV02" (trade name, available from Nisshinbo Chemical, Inc., carbodiimide compound, a solid content of 40%, carbodiimide equivalent per solid content of 429), 6.25 parts (a solid content of 5 parts) of "CYMEL 325" (trade name, available from Allnex Japan Inc., melamine resin, a solid content concentration of 80%), 8.3 parts (a solid content of 5 parts) of the active methylene-type blocked polyisocyanate compound (E4-1) solution produced in Production Example 15, and 159.4 parts (a resin solid content of 20 parts) of the pigment dispersion liquid (P-1) produced in Production Example 17 were uniformly mixed to form a mixture, "UH-752" (trade name, available from ADEKA Corporation, thickener, a solid content concentration of 28%), 2-(dimethylamino)ethanol, and deionized water were further added to the mixture to produce an aqueous coating composition No. 1 having a pH of 8.0, a solid content concentration of 48%, and a viscosity of 800 mPa·s measured with a B-type viscometer at a temperature of 20° C. after 1 minute at 60 rpm.

Examples 45 to 92 and Comparative Examples 3 to 4

Aqueous coating compositions Nos. 2 to 49 and aqueous coating compositions Nos. 99 to 100 were produced in the same manner as the aqueous coating composition No. 1 of Example 44 except that coating material compositions were as shown in Table 3 below.

Example 93

87.5 parts (a solid content of 35 parts) of the aqueous dispersion of acrylic urethane composite resin (AB'-1) particles produced in Example 1, 76.6 parts (a solid content of 23 parts) of the dispersion liquid of acrylic resin (C-1) particles produced in Production Example 13, 12.4 parts (a solid content of 5 parts) of "CARBODILITE SV02" (trade name, available from Nisshinbo Chemical, Inc., carbodiimide compound, a solid content of 40%, carbodiimide equivalent per solid content of 429), 6.25 parts (a solid content of 5 parts) of "CYMEL 325" (trade name, available from Allnex Japan Inc., melamine resin, a solid content of 80%), 16.7 parts (a solid content of 10 parts) of the active methylene-type blocked polyisocyanate compound (E4-1) produced in Production Example 15, 126.7 parts (a solid content of 20 parts) of the pigment dispersion (P-2) produced in Production Example 18, and the 4 parts (a resin solid content of 2 parts) of the phosphate group-containing acrylic resin (R-1) produced in Production Example 16 were uniformly mixed to form a mixed solution, and "UH-752" (trade name, available from ADEKA Corporation, a solid content of 28%), 2-(dimethylamino)ethanol, and deionized water were further added thereto to produce an aqueous coating composition No. 50 having a pH of 8.0, a solid content concentration of 25%, and a viscosity of 800 mPa·s measured with a B-type viscometer at a temperature of 20° C. after 1 minute at 60 rpm.

Examples 94 to 141 and Comparative Examples 5 to 6

Aqueous coating compositions Nos. 51 to 98 and aqueous coating compositions Nos. 101 to 102 were produced in the same manner as the aqueous coating composition No. 50 of Example 93 except that coating material compositions were as shown in Table 3 below.

Gel Fraction

Each of the aqueous coating compositions produced in Examples 44 to 141 and Comparative Examples 3 to 6 was applied onto a polypropylene plate for gel fraction measurement to have a film thickness of 30 μm, and heated at 80° C. for 20 minutes to form a cured coating film. Next, the formed cured coating film was peeled off from the polypropylene plate and placed in a 300-mesh stainless steel mesh vessel whose mass (W1) had been measured in advance, and a total mass (W2) of the cured coating film and the mesh vessel was measured. The mesh vessel including the cured coating film was placed in an equal mass mixed solvent of acetone and methanol heated to 50° C., subjected to extraction treatment for 5 hours, dried at 110° C. for 60 minutes, a total mass (W3) of the remaining cured coating film and the mesh vessel was then measured, and an insoluble coating film residual ratio (%) calculated according to the following equation was taken as a gel fraction.

Gel fraction (%)=100×(W3−W1)/(W2−W1)

Measurement results of the gel fraction are shown in Table 3.

Storage Stability Test

Storage stability of each of the aqueous coating compositions produced in Examples 44 to 141 and Comparative Examples 3 to 6 was evaluated by a change rate between a viscosity immediately after production and a viscosity after standing at 40° C. for 10 days, based on the viscosity after 1 minute at 60 rpm measured using "LVDV-I" (trade name, available from Brookfield, B-type viscometer).

Viscosity change rate (%)=|(viscosity after standing at 40° C. for 10 days/viscosity immediately after production)−1|×100

Excellent and Good are acceptable. The evaluation results are shown in Table 3.

Excellent: Viscosity change rate is less than 50%
Good: Viscosity change rate is 50% or greater and less than 100%
Poor: Viscosity change rate is 100% or greater.

Abrasion Resistance Test

"Elecron GT-10" (trade name, available from Kansai Paint Co., Ltd., cationic electrodeposition paint) was applied by electrodeposition onto a cold-rolled steel sheet chemically treated with zinc phosphate to have a cured film thickness of 20 μm, the coated steel sheet was heated at 170° C. for 30 minutes to cure the electrodeposited coating film to prepare an object to be coated for the abrasion resistance test. Each of the aqueous coating compositions produced in Examples 44 to 141 and Comparative Examples 3 to 6 was electrostatically applied onto the object to be coated for the abrasion resistance test using a rotary atomizing electrostatic coating machine to have a dry film thickness of 15 μm, thereby forming an uncured coating film. After the uncured coating film was allowed to stand for 3 minutes, the uncured coating film was preheated at 80° C. for 3 minutes and then heated at 80° C. for 20 minutes to prepare a coated plate for the abrasion resistance test.

The coated plate for the abrasion resistance test prepared above was weighed before the abrasion test, then mounted on "5130 ABRASER" (trade name, available from Toyo Seiki Seisaku-sho, Ltd., taber abrasion tester), and each coating film was abraded using "CS-10 CALIBRASE" (trade name, available from Taber Industries, abrasion wheel) under conditions of a load of 500 gf and the number of revolutions of 500 times. After the abrasion test, a weight was measured, and a weight change amount (mg) was calculated according to the following equation.

Weight change amount (mg)=[weight before test]−[weight after test]

Excellent and Good are acceptable. The evaluation results are shown in Table 3.

Excellent: Weight change amount is less than 20 mg.
Good: Weight change amount is 20 mg or greater and less than 30 mg.
Poor: Weight change amount is 30 mg or greater.

TABLE 3

| | | | Examples | | | | | |
|---|---|---|---|---|---|---|---|---|
| | | | 44 | 45 | 46 | 47 | 48 | 49 |
| No. of aqueous coating composition | | | 1 | 2 | 3 | 4 | 5 | 6 |
| Color pigment dispersion liquid (P) | No. of color pigment dispersion liquid (P) | | P-1 | P-1 | P-1 | P-1 | P-1 | P-1 |
| | Acrylic resin (C) | Acrylic resin (C-1) | | | | | | |
| | Polyester resin (D) | Polyester resin (D-1) | 20 | 20 | 20 | 20 | 20 | 20 |
| | JR-806 | | 90 | 90 | 90 | 90 | 90 | 90 |
| | Baryace B-35 | | 30 | 30 | 30 | 30 | 30 | 30 |
| | Carbon MA100 | | 0.8 | 0.8 | 0.8 | 0.8 | 0.8 | 0.8 |
| Acrylic urethane composite resin (AB) | No. of acrylic urethane composite resin (AB) | | AB'-1 | AB'-2 | AB'-3 | AB'-4 | AB'-5 | AB'-6 |
| | Compounding amount of acrylic urethane composite resin (AB) | | 45 | 45 | 45 | 45 | 45 | 45 |
| Acrylic resin (C) | Acrylic resin (C-1) | | 15 | 15 | 15 | 15 | 15 | 15 |
| Curing agent (E) | Polycarbodiimide compound (E1) | CARBODILITE SV02 | 10 | 10 | 10 | 10 | 10 | 10 |
| | Melamine compound (E2) | CYMEL 325 | 5 | 5 | 5 | 5 | 5 | 5 |
| | Blocked polyisocyanate compound (E4) | Blocked polyisocyanate compound (E4-1) | 5 | 5 | 5 | 5 | 5 | 5 |
| Phosphate group-containing acrylic resin (R-1) | | | | | | | | |
| Gel fraction (%) | | | 93 | 92 | 91 | 92 | 93 | 93 |
| Evaluation | Storage stability | | Excellent | Excellent | Good | Good | Excellent | Excellent |
| | Abrasion resistance | | Excellent | Excellent | Good | Good | Excellent | Excellent |

TABLE 3-continued

| | | | Examples | | | | | | |
|---|---|---|---|---|---|---|---|---|---|
| | | | 50 | 51 | 52 | 53 | 54 | 55 | 56 |
| No. of aqueous coating composition | | | 7 | 8 | 9 | 10 | 11 | 12 | 13 |
| Color pigment dispersion liquid (P) | No. of color pigment dispersion liquid (P) | | P-1 | P-1 | P-1 | P-1 | P-1 | P-1 | P-1 |
| | Acrylic resin (C) | Acrylic resin (C-1) | | | | | | | |
| | Polyester resin (D) | Polyester resin (D-1) | 20 | 20 | 20 | 20 | 20 | 20 | 20 |
| | JR-806 | | 90 | 90 | 90 | 90 | 90 | 90 | 90 |
| | Baryace B-35 | | 30 | 30 | 30 | 30 | 30 | 30 | 30 |
| | Carbon MA100 | | 0.8 | 0.8 | 0.8 | 0.8 | 0.8 | 0.8 | 0.8 |
| Acrylic urethane composite resin (AB) | No. of acrylic urethane composite resin (AB) | | AB'-7 | AB'-8 | AB'-9 | AB'-10 | AB'-11 | AB'-12 | AB'-13 |
| | Compounding amount of acrylic urethane composite resin (AB) | | 45 | 45 | 45 | 45 | 45 | 45 | 45 |
| Acrylic resin (C) | Acrylic resin (C-1) | | 15 | 15 | 15 | 15 | 15 | 15 | 15 |
| Curing agent (E) | Polycarbodiimide compound (E1) | CARBODILITE SV02 | 10 | 10 | 10 | 10 | 10 | 10 | 10 |
| | Melamine compound (E2) | CYMEL 325 | 5 | 5 | 5 | 5 | 5 | 5 | 5 |
| | Blocked polyisocyanate compound (E4) | Blocked polyisocyanate compound (E4-1) | 5 | 5 | 5 | 5 | 5 | 5 | 5 |
| Phosphate group-containing acrylic resin (R-1) | | | | | | | | | |
| Gel fraction (%) | | | 92 | 93 | 94 | 93 | 94 | 93 | 94 |
| Evaluation | Storage stability | | Excellent | Excellent | Excellent | Good | Excellent | Good | Excellent |
| | Abrasion resistance | | Excellent | Excellent | Good | Excellent | Excellent | Good | Excellent |

| | | | Examples | | | | | | |
|---|---|---|---|---|---|---|---|---|---|
| | | | 57 | 58 | 59 | 60 | 61 | 62 | 63 |
| No. of aqueous coating composition | | | 14 | 15 | 16 | 17 | 18 | 19 | 20 |
| Color pigment dispersion liquid (P) | No. of color pigment dispersion liquid (P) | | P-1 | P-1 | P-1 | P-1 | P-1 | P-1 | P-1 |
| | Acrylic resin (C) | Acrylic resin (C-1) | | | | | | | |
| | Polyester resin (D) | Polyester resin (D-1) | 20 | 20 | 20 | 20 | 20 | 20 | 20 |
| | JR-806 | | 90 | 90 | 90 | 90 | 90 | 90 | 90 |
| | Baryace B-35 | | 30 | 30 | 30 | 30 | 30 | 30 | 30 |
| | Carbon MA100 | | 0.8 | 0.8 | 0.8 | 0.8 | 0.8 | 0.8 | 0.8 |
| Acrylic urethane composite resin (AB) | No. of acrylic urethane composite resin (AB) | | AB'-14 | AB'-15 | AB'-16 | AB'-17 | AB'-18 | AB'-19 | AB'-20 |
| | Compounding amount of acrylic urethane composite resin (AB) | | 45 | 45 | 45 | 45 | 45 | 45 | 45 |
| Acrylic resin (C) | Acrylic resin (C-1) | | 15 | 15 | 15 | 15 | 15 | 15 | 15 |
| Curing agent (E) | Polycarbodiimide compound (E1) | CARBODILITE SV02 | 10 | 10 | 10 | 10 | 10 | 10 | 10 |
| | Melamine compound (E2) | CYMEL 325 | 5 | 5 | 5 | 5 | 5 | 5 | 5 |
| | Blocked polyisocyanate compound (E4) | Blocked polyisocyanate compound (E4-1) | 5 | 5 | 5 | 5 | 5 | 5 | 5 |
| Phosphate group-containing acrylic resin (R-1) | | | | | | | | | |
| Gel fraction (%) | | | 94 | 91 | 89 | 91 | 88 | 90 | 93 |
| Evaluation | Storage stability | | Excellent | Excellent | Excellent | Excellent | Excellent | Excellent | Excellent |
| | Abrasion resistance | | Excellent | Excellent | Good | Excellent | Excellent | Excellent | Excellent |

| | | | Examples | | | | | |
|---|---|---|---|---|---|---|---|---|
| | | | 64 | 65 | 66 | 67 | 68 | 69 |
| No. of aqueous coating composition | | | 21 | 22 | 23 | 24 | 25 | 26 |
| Color pigment dispersion liquid (P) | No. of color pigment dispersion liquid (P) | | P-1 | P-1 | P-1 | P-1 | P-1 | P-1 |
| | Acrylic resin (C) | Acrylic resin (C-1) | | | | | | |
| | Polyester resin (D) | Polyester resin (D-1) | 20 | 20 | 20 | 20 | 20 | 20 |
| | JR-806 | | 90 | 90 | 90 | 90 | 90 | 90 |
| | Baryace B-35 | | 30 | 30 | 30 | 30 | 30 | 30 |
| | Carbon MA100 | | 0.8 | 0.8 | 0.8 | 0.8 | 0.8 | 0.8 |
| Acrylic urethane composite resin (AB) | No. of acrylic urethane composite resin (AB) | | AB'-21 | AB'-22 | AB'-23 | AB'-24 | AB'-25 | AB'-26 |
| | Compounding amount of acrylic urethane composite resin (AB) | | 45 | 45 | 45 | 45 | 45 | 45 |
| Acrylic resin (C) | Acrylic resin (C-1) | | 15 | 15 | 15 | 15 | 15 | 15 |

TABLE 3-continued

| | | | | | | | | |
|---|---|---|---|---|---|---|---|---|
| Curing agent (E) | Polycarbodiimide compound (E1) | CARBODILITE SV02 | 10 | 10 | 10 | 10 | 10 | 10 |
| | Melamine compound (E2) | CYMEL 325 | 5 | 5 | 5 | 5 | 5 | 5 |
| | Blocked polyisocyanate compound (E4) | Blocked polyisocyanate compound (E4-1) | 5 | 5 | 5 | 5 | 5 | 5 |
| Phosphate group-containing acrylic resin (R-1) | | | | | | | | |
| Gel fraction (%) | | | 92 | 92 | 94 | 91 | 92 | 93 |
| Evaluation | Storage stability | | Excellent | Excellent | Excellent | Excellent | Excellent | Good |
| | Abrasion resistance | | Excellent | Excellent | Excellent | Good | Excellent | Good |

| | | | Examples | | | | | |
|---|---|---|---|---|---|---|---|---|
| | | | 70 | 71 | 72 | 73 | 74 | 75 |
| No. of aqueous coating composition | | | 27 | 28 | 29 | 30 | 31 | 32 |
| Color pigment dispersion liquid (P) | No. of color pigment dispersion liquid (P) | | P-1 | P-1 | P-1 | P-1 | P-1 | P-1 |
| | Acrylic resin (C) | Acrylic resin (C-1) | | | | | | |
| | Polyester resin (D) | Polyester resin (D-1) | 20 | 20 | 20 | 20 | 20 | 20 |
| | JR-806 | | 90 | 90 | 90 | 90 | 90 | 90 |
| | Baryace B-35 | | 30 | 30 | 30 | 30 | 30 | 30 |
| | Carbon MA100 | | 0.8 | 0.8 | 0.8 | 0.8 | 0.8 | 0.8 |
| Acrylic urethane composite resin (AB) | No. of acrylic urethane composite resin (AB) | | AB'-27 | AB'-28 | AB'-29 | AB'-30 | AB'-31 | AB'-32 |
| | Compounding amount of acrylic urethane composite resin (AB) | | 45 | 45 | 45 | 45 | 45 | 45 |
| Acrylic resin (C) | Acrylic resin (C-1) | | 15 | 15 | 15 | 15 | 15 | 15 |
| Curing agent (E) | Polycarbodiimide compound (E1) | CARBODILITE SV02 | 10 | 10 | 10 | 10 | 10 | 10 |
| | Melamine compound (E2) | CYMEL 325 | 5 | 5 | 5 | 5 | 5 | 5 |
| | Blocked polyisocyanate compound (E4) | Blocked polyisocyanate compound (E4-1) | 5 | 5 | 5 | 5 | 5 | 5 |
| Phosphate group-containing acrylic resin (R-1) | | | | | | | | |
| Gel fraction (%) | | | 91 | 92 | 93 | 91 | 93 | 91 |
| Evaluation | Storage stability | | Excellent | Good | Excellent | Excellent | Excellent | Good |
| | Abrasion resistance | | Excellent | Good | Good | Excellent | Excellent | Excellent |

| | | | Examples | | | | | |
|---|---|---|---|---|---|---|---|---|
| | | | 76 | 77 | 78 | 79 | 80 | 81 |
| No. of aqueous coating composition | | | 33 | 34 | 35 | 36 | 37 | 38 |
| Color pigment dispersion liquid (P) | No. of color pigment dispersion liquid (P) | | P-1 | P-1 | P-1 | P-1 | P-1 | P-1 |
| | Acrylic resin (C) | Acrylic resin (C-1) | | | | | | |
| | Polyester resin (D) | Polyester resin (D-1) | 20 | 20 | 20 | 20 | 20 | 20 |
| | JR-806 | | 90 | 90 | 90 | 90 | 90 | 90 |
| | Baryace B-35 | | 30 | 30 | 30 | 30 | 30 | 30 |
| | Carbon MA100 | | 0.8 | 0.8 | 0.8 | 0.8 | 0.8 | 0.8 |
| Acrylic urethane composite resin (AB) | No. of acrylic urethane composite resin (AB) | | AB'-33 | AB'-34 | AB'-35 | AB'-36 | AB'-37 | AB'-38 |
| | Compounding amount of acrylic urethane composite resin (AB) | | 45 | 45 | 45 | 45 | 45 | 45 |
| Acrylic resin (C) | Acrylic resin (C-1) | | 15 | 15 | 15 | 15 | 15 | 15 |
| Curing agent (E) | Polycarbodiimide compound (E1) | CARBODILITE SV02 | 10 | 10 | 10 | 10 | 10 | 10 |
| | Melamine compound (E2) | CYMEL 325 | 5 | 5 | 5 | 5 | 5 | 5 |
| | Blocked polyisocyanate compound (E4) | Blocked polyisocyanate compound (E4-1) | 5 | 5 | 5 | 5 | 5 | 5 |
| Phosphate group-containing acrylic resin (R-1) | | | | | | | | |
| Gel fraction (%) | | | 94 | 89 | 92 | 93 | 94 | 93 |
| Evaluation | Storage stability | | Good | Excellent | Good | Good | Excellent | Good |
| | Abrasion resistance | | Excellent | Excellent | Excellent | Excellent | Excellent | Excellent |

TABLE 3-continued

|  |  |  | Examples | | | | |
| --- | --- | --- | --- | --- | --- | --- | --- |
|  |  |  | 82 | 83 | 84 | 85 | 86 |
| No. of aqueous coating composition | | | 39 | 40 | 41 | 42 | 43 |
| Color pigment dispersion liquid (P) | No. of color pigment dispersion liquid (P) | | P-1 | P-1 | P-1 | P-1 | P-1 |
| | Acrylic resin (C) | Acrylic resin (C-1) | | | | | |
| | Polyester resin (D) | Polyester resin (D-1) | 20 | 20 | 20 | 20 | 20 |
| | JR-806 | | 90 | 90 | 90 | 90 | 90 |
| | Baryace B-35 | | 30 | 30 | 30 | 30 | 30 |
| | Carbon MA100 | | 0.8 | 0.8 | 0.8 | 0.8 | 0.8 |
| Acrylic urethane composite resin (AB) | No. of acrylic urethane composite resin (AB) | | AB'-39 | AB'-40 | AB'-41 | AB'-42 | AB'-43 |
| | Compounding amount of acrylic urethane composite resin (AB) | | 45 | 45 | 45 | 45 | 45 |
| Acrylic resin (C) | Acrylic resin (C-1) | | 15 | 15 | 15 | 15 | 15 |
| Curing agent (E) | Polycarbodiimide compound (E1) | CARBODILITE SV02 | 10 | 10 | 10 | 10 | 10 |
| | Melamine compound (E2) | CYMEL 325 | 5 | 5 | 5 | 5 | 5 |
| | Blocked polyisocyanate compound (E4) | Blocked polyisocyanate compound (E4-1) | 5 | 5 | 5 | 5 | 5 |
| Phosphate group-containing acrylic resin (R-1) | | | | | | | |
| Gel fraction (%) | | | 88 | 92 | 92 | 94 | 94 |
| Evaluation | Storage stability | | Excellent | Excellent | Excellent | Excellent | Excellent |
| | Abrasion resistance | | Excellent | Excellent | Excellent | Excellent | Excellent |

|  |  |  | Examples | | | | | |
| --- | --- | --- | --- | --- | --- | --- | --- | --- |
|  |  |  | 87 | 88 | 89 | 90 | 91 | 92 |
| No. of aqueous coating composition | | | 44 | 45 | 46 | 47 | 48 | 49 |
| Color pigment dispersion liquid (P) | No. of color pigment dispersion liquid (P) | | P-1 | P-1 | P-1 | P-1 | P-1 | P-1 |
| | Acrylic resin (C) | Acrylic resin (C-1) | | | | | | |
| | Polyester resin (D) | Polyester resin (D-1) | 20 | 20 | 20 | 20 | 20 | 20 |
| | JR-806 | | 90 | 90 | 90 | 90 | 90 | 90 |
| | Baryace B-35 | | 30 | 30 | 30 | 30 | 30 | 30 |
| | Carbon MA100 | | 0.8 | 0.8 | 0.8 | 0.8 | 0.8 | 0.8 |
| Acrylic urethane composite resin (AB) | No. of acrylic urethane composite resin (AB) | | AB'-1 | AB'-1 | AB'-1 | AB'-1 | AB'-1 | AB'-1 |
| | Compounding amount of acrylic urethane composite resin (AB) | | 70 | 10 | 45 | 45 | 45 | 45 |
| Acrylic resin (C) | Acrylic resin (C-1) | | | 60 | 15 | 16 | 14 | 15 |
| Curing agent (E) | Polycarbodiimide compound (E1) | CARBODILITE SV02 | 10 | 10 | | 5 | 15 | 20 |
| | Melamine compound (E2) | CYMEL 325 | | | | 10 | 7 | 3 |
| | Blocked polyisocyanate compound (E4) | Blocked polyisocyanate compound (E4-1) | | | | 10 | 7 | 3 |
| Phosphate group-containing acrylic resin (R-1) | | | | | | | | |
| Gel fraction (%) | | | 95 | 86 | 86 | 90 | 94 | 89 |
| Evaluation | Storage stability | | Excellent | Excellent | Excellent | Excellent | Excellent | Excellent |
| | Abrasion resistance | | Excellent | Excellent | Good | Excellent | Excellent | Good |

|  |  |  | Examples | | | | | | |
| --- | --- | --- | --- | --- | --- | --- | --- | --- | --- |
|  |  |  | 93 | 94 | 95 | 96 | 97 | 98 | 99 |
| No. of aqueous coating composition | | | 50 | 51 | 52 | 53 | 54 | 55 | 56 |
| Color pigment dispersion liquid (P) | No. of color pigment dispersion liquid (P) | | P-2 | P-2 | P-2 | P-2 | P-2 | P-2 | P-2 |
| | Acrylic resin (C) | Acrylic resin (C-1) | 20 | 20 | 20 | 20 | 20 | 20 | 20 |
| | Polyester resin (D) | Polyester resin (D-1) | | | | | | | |
| | JR-806 | | | | | | | | |
| | Baryace B-35 | | | | | | | | |
| | Carbon MA100 | | 10 | 10 | 10 | 10 | 10 | 10 | 10 |
| Acrylic urethane composite resin (AB) | No. of acrylic urethane composite resin (AB) | | AB'-1 | AB'-2 | AB'-3 | AB'-4 | AB'-5 | AB'-6 | AB'-7 |
| | Compounding amount of acrylic urethane composite resin (AB) | | 35 | 35 | 35 | 35 | 35 | 35 | 35 |
| Acrylic resin (C) | Acrylic resin (C-1) | | 23 | 23 | 23 | 23 | 23 | 23 | 23 |

TABLE 3-continued

| | | | | | | | | | |
|---|---|---|---|---|---|---|---|---|---|
| Curing agent (E) | Polycarbodiimide compound (E1) | CARBODILITE SV02 | 5 | 5 | 5 | 5 | 5 | 5 | 5 |
| | Melamine compound (E2) | CYMEL 325 | 5 | 5 | 5 | 5 | 5 | 5 | 5 |
| | Blocked polyisocyanate compound (E4) | Blocked polyisocyanate compound (E4-1) | 10 | 10 | 10 | 10 | 10 | 10 | 10 |
| Phosphate group-containing acrylic resin (R-1) | | | 2 | 2 | 2 | 2 | 2 | 2 | 2 |
| Gel fraction (%) | | | 85 | 86 | 86 | 84 | 86 | 87 | 82 |
| Evaluation | Storage stability | | Excellent | Excellent | Good | Good | Excellent | Excellent | Excellent |
| | Abrasion resistance | | Excellent | Excellent | Good | Good | Excellent | Excellent | Excellent |

| | | | Examples | | | | | | |
|---|---|---|---|---|---|---|---|---|---|
| | | | 100 | 101 | 102 | 103 | 104 | 105 | 106 |
| No. of aqueous coating composition | | | 57 | 58 | 59 | 60 | 61 | 62 | 63 |
| Color pigment dispersion liquid (P) | No. of color pigment dispersion liquid (P) | | P-2 | P-2 | P-2 | P-2 | P-2 | P-2 | P-2 |
| | Acrylic resin (C) | Acrylic resin (C-1) | 20 | 20 | 20 | 20 | 20 | 20 | 20 |
| | Polyester resin (D) | Polyester resin (D-1) | | | | | | | |
| | JR-806 | | | | | | | | | |
| | Baryace B-35 | | | | | | | | | |
| | Carbon MA100 | | 10 | 10 | 10 | 10 | 10 | 10 | 10 |
| Acrylic urethane composite resin (AB) | No. of acrylic urethane composite resin (AB) | | AB'-8 | AB'-9 | AB'-10 | AB'-11 | AB'-12 | AB'-13 | AB'-14 |
| | Compounding amount of acrylic urethane composite resin (AB) | | 35 | 35 | 35 | 35 | 35 | 35 | 35 |
| Acrylic resin (C) | Acrylic resin (C-1) | | 23 | 23 | 23 | 23 | 23 | 23 | 23 |
| Curing agent (E) | Polycarbodiimide compound (E1) | CARBODILITE SV02 | 5 | 5 | 5 | 5 | 5 | 5 | 5 |
| | Melamine compound (E2) | CYMEL 325 | 5 | 5 | 5 | 5 | 5 | 5 | 5 |
| | Blocked polyisocyanate compound (E4) | Blocked polyisocyanate compound (E4-1) | 10 | 10 | 10 | 10 | 10 | 10 | 10 |
| Phosphate group-containing acrylic resin (R-1) | | | 2 | 2 | 2 | 2 | 2 | 2 | 2 |
| Gel fraction (%) | | | 85 | 85 | 85 | 85 | 86 | 87 | 88 |
| Evaluation | Storage stability | | Excellent | Excellent | Good | Excellent | Good | Excellent | Excellent |
| | Abrasion resistance | | Excellent | Good | Excellent | Excellent | Good | Excellent | Excellent |

| | | | Examples | | | | | | |
|---|---|---|---|---|---|---|---|---|---|
| | | | 107 | 108 | 109 | 110 | 111 | 112 | 113 |
| No. of aqueous coating composition | | | 64 | 65 | 66 | 67 | 68 | 69 | 70 |
| Color pigment dispersion liquid (P) | No. of color pigment dispersion liquid (P) | | P-2 | P-2 | P-2 | P-2 | P-2 | P-2 | P-2 |
| | Acrylic resin (C) | Acrylic resin (C-1) | 20 | 20 | 20 | 20 | 20 | 20 | 20 |
| | Polyester resin (D) | Polyester resin (D-1) | | | | | | | |
| | JR-806 | | | | | | | | | |
| | Baryace B-35 | | | | | | | | | |
| | Carbon MA100 | | 10 | 10 | 10 | 10 | 10 | 10 | 10 |
| Acrylic urethane composite resin (AB) | No. of acrylic urethane composite resin (AB) | | AB'-15 | AB'-16 | AB'-17 | AB'-18 | AB'-19 | AB'-20 | AB'-21 |
| | Compounding amount of acrylic urethane composite resin (AB) | | 35 | 35 | 35 | 35 | 35 | 35 | 35 |
| Acrylic resin (C) | Acrylic resin (C-1) | | 23 | 23 | 23 | 23 | 23 | 23 | 23 |
| Curing agent (E) | Polycarbodiimide compound (E1) | CARBODILITE SV02 | 5 | 5 | 5 | 5 | 5 | 5 | 5 |
| | Melamine compound (E2) | CYMEL 325 | 5 | 5 | 5 | 5 | 5 | 5 | 5 |
| | Blocked polyisocyanate compound (E4) | Blocked polyisocyanate compound (E4-1) | 10 | 10 | 10 | 10 | 10 | 10 | 10 |
| Phosphate group-containing acrylic resin (R-1) | | | 2 | 2 | 2 | 2 | 2 | 2 | 2 |
| Gel fraction (%) | | | 83 | 82 | 84 | 83 | 84 | 84 | 82 |
| Evaluation | Storage stability | | Excellent | Excellent | Excellent | Excellent | Excellent | Excellent | Excellent |
| | Abrasion resistance | | Excellent | Good | Excellent | Excellent | Excellent | Excellent | Excellent |

TABLE 3-continued

|  |  |  | Examples | | | | | | |
| --- | --- | --- | --- | --- | --- | --- | --- | --- | --- |
|  |  |  | 114 | 115 | 116 | 117 | 118 | 119 | 120 |
| No. of aqueous coating composition |  |  | 71 | 72 | 73 | 74 | 75 | 76 | 77 |
| Color pigment dispersion liquid (P) | No. of color pigment dispersion liquid (P) |  | P-2 | P-2 | P-2 | P-2 | P-2 | P-2 | P-2 |
|  | Acrylic resin (C) | Acrylic resin (C-1) | 20 | 20 | 20 | 20 | 20 | 20 | 20 |
|  | Polyester resin (D) | Polyester resin (D-1) |  |  |  |  |  |  |  |
|  | JR-806 |  |  |  |  |  |  |  |  |
|  | Baryace B-35 |  |  |  |  |  |  |  |  |
|  | Carbon MA100 |  | 10 | 10 | 10 | 10 | 10 | 10 | 10 |
| Acrylic urethane composite resin (AB) | No. of acrylic urethane composite resin (AB) |  | AB'-22 | AB'-23 | AB'-24 | AB'-25 | AB'-26 | AB'-27 | AB'-28 |
|  | Compounding amount of acrylic urethane composite resin (AB) |  | 35 | 35 | 35 | 35 | 35 | 35 | 35 |
| Acrylic resin (C) | Acrylic resin (C-1) |  | 23 | 23 | 23 | 23 | 23 | 23 | 23 |
| Curing agent (E) | Polycarbodiimide compound (E1) | CARBODILITE SV02 | 5 | 5 | 5 | 5 | 5 | 5 | 5 |
|  | Melamine compound (E2) | CYMEL 325 | 5 | 5 | 5 | 5 | 5 | 5 | 5 |
|  | Blocked polyisocyanate compound (E4) | Blocked polyisocyanate compound (E4-1) | 10 | 10 | 10 | 10 | 10 | 10 | 10 |
| Phosphate group-containing acrylic resin (R-1) |  |  | 2 | 2 | 2 | 2 | 2 | 2 | 2 |
| Gel fraction (%) |  |  | 81 | 85 | 82 | 83 | 82 | 83 | 83 |
| Evaluation | Storage stability |  | Excellent | Excellent | Excellent | Excellent | Good | Excellent | Good |
|  | Abrasion resistance |  | Excellent | Excellent | Good | Excellent | Good | Excellent | Good |

|  |  |  | Examples | | | | | | |
| --- | --- | --- | --- | --- | --- | --- | --- | --- | --- |
|  |  |  | 121 | 122 | 123 | 124 | 125 | 126 | 127 |
| No. of aqueous coating composition |  |  | 78 | 79 | 80 | 81 | 82 | 83 | 84 |
| Color pigment dispersion liquid (P) | No. of color pigment dispersion liquid (P) |  | P-2 | P-2 | P-2 | P-2 | P-2 | P-2 | P-2 |
|  | Acrylic resin (C) | Acrylic resin (C-1) | 20 | 20 | 20 | 20 | 20 | 20 | 20 |
|  | Polyester resin (D) | Polyester resin (D-1) |  |  |  |  |  |  |  |
|  | JR-806 |  |  |  |  |  |  |  |  |
|  | Baryace B-35 |  |  |  |  |  |  |  |  |
|  | Carbon MA100 |  | 10 | 10 | 10 | 10 | 10 | 10 | 10 |
| Acrylic urethane composite resin (AB) | No. of acrylic urethane composite resin (AB) |  | AB'-29 | AB'-30 | AB'-31 | AB'-32 | AB'-33 | AB'-34 | AB'-35 |
|  | Compounding amount of acrylic urethane composite resin (AB) |  | 35 | 35 | 35 | 35 | 35 | 35 | 35 |
| Acrylic resin (C) | Acrylic resin (C-1) |  | 23 | 23 | 23 | 23 | 23 | 23 | 23 |
| Curing agent (E) | Polycarbodiimide compound (E1) | CARBODILITE SV02 | 5 | 5 | 5 | 5 | 5 | 5 | 5 |
|  | Melamine compound (E2) | CYMEL 325 | 5 | 5 | 5 | 5 | 5 | 5 | 5 |
|  | Blocked polyisocyanate compound (E4) | Blocked polyisocyanate compound (E4-1) | 10 | 10 | 10 | 10 | 10 | 10 | 10 |
| Phosphate group-containing acrylic resin (R-1) |  |  | 2 | 2 | 2 | 2 | 2 | 2 | 2 |
| Gel fraction (%) |  |  | 83 | 82 | 84 | 81 | 85 | 82 | 86 |
| Evaluation | Storage stability |  | Excellent | Excellent | Excellent | Good | Good | Excellent | Good |
|  | Abrasion resistance |  | Good | Excellent | Excellent | Excellent | Excellent | Excellent | Excellent |

|  |  |  | Examples | | | | | | |
| --- | --- | --- | --- | --- | --- | --- | --- | --- | --- |
|  |  |  | 128 | 129 | 130 | 131 | 132 | 133 | 134 |
| No. of aqueous coating composition |  |  | 85 | 86 | 87 | 88 | 89 | 90 | 91 |
| Color pigment dispersion liquid (P) | No. of color pigment dispersion liquid (P) |  | P-2 | P-2 | P-2 | P-2 | P-2 | P-2 | P-2 |
|  | Acrylic resin (C) | Acrylic resin (C-1) | 20 | 20 | 20 | 20 | 20 | 20 | 20 |
|  | Polyester resin (D) | Polyester resin (D-1) |  |  |  |  |  |  |  |
|  | JR-806 |  |  |  |  |  |  |  |  |
|  | Baryace B-35 |  |  |  |  |  |  |  |  |
|  | Carbon MA100 |  | 10 | 10 | 10 | 10 | 10 | 10 | 10 |
| Acrylic urethane composite resin (AB) | No. of acrylic urethane composite resin (AB) |  | AB'-36 | AB'-37 | AB'-38 | AB'-39 | AB'-40 | AB'-41 | AB'-42 |
|  | Compounding amount of acrylic urethane composite resin (AB) |  | 35 | 35 | 35 | 35 | 35 | 35 | 35 |
| Acrylic resin (C) | Acrylic resin (C-1) |  | 23 | 23 | 23 | 23 | 23 | 23 | 23 |

TABLE 3-continued

| | | | | | | | | | |
|---|---|---|---|---|---|---|---|---|---|
| Curing agent (E) | Polycarbodiimide compound (E1) | CARBODILITE SV02 | 5 | 5 | 5 | 5 | 5 | 5 | 5 |
| | Melamine compound (E2) | CYMEL 325 | 5 | 5 | 5 | 5 | 5 | 5 | 5 |
| | Blocked polyisocyanate compound (E4) | Blocked polyisocyanate compound (E4-1) | 10 | 10 | 10 | 10 | 10 | 10 | 10 |
| Phosphate group-containing acrylic resin (R-1) | | | 2 | 2 | 2 | 2 | 2 | 2 | 2 |
| Gel fraction (%) | | | 86 | 87 | 86 | 80 | 84 | 83 | 85 |
| Evaluation | Storage stability | | Good | Excellent | Good | Excellent | Excellent | Excellent | Excellent |
| | Abrasion resistance | | Excellent | Excellent | Excellent | Excellent | Excellent | Excellent | Excellent |

| | | | Examples | | | | | |
|---|---|---|---|---|---|---|---|---|
| | | | 135 | 136 | 137 | 138 | 139 | 140 |
| No. of aqueous coating composition | | | 92 | 93 | 94 | 95 | 96 | 97 |
| Color pigment dispersion liquid (P) | No. of color pigment dispersion liquid (P) | | P-2 | P-2 | P-2 | P-2 | P-2 | P-2 |
| | Acrylic resin (C) | Acrylic resin (C-1) | 20 | 20 | 20 | 20 | 20 | 20 |
| | Polyester resin (D) | Polyester resin (D-1) | | | | | | |
| | JR-806 | | | | | | | |
| | Baryace B-35 | | | | | | | |
| | Carbon MA100 | | 10 | 10 | 10 | 10 | 10 | 10 |
| Acrylic urethane composite resin (AB) | No. of acrylic urethane composite resin (AB) | | AB'-43 | AB'-1 | AB'-1 | AB'-1 | AB'-1 | AB'-1 |
| | Compounding amount of acrylic urethane composite resin (AB) | | 35 | 48 | 15 | 35 | 35 | 35 |
| Acrylic resin (C) | Acrylic resin (C-1) | | 23 | 15 | 48 | 23 | 25 | 23 |
| Curing agent (E) | Polycarbodiimide compound (E1) | CARBODILITE SV02 | 5 | 5 | 5 | | 2 | 10 |
| | Melamine compound (E2) | CYMEL 325 | 5 | 5 | 5 | 10 | 8 | 5 |
| | Blocked polyisocyanate compound (E4) | Blocked polyisocyanate compound (E4-1) | 10 | 5 | 5 | 10 | 8 | 5 |
| Phosphate group-containing acrylic resin (R-1) | | | 2 | 2 | 2 | 2 | 2 | 2 |
| Gel fraction (%) | | | 86 | 86 | 81 | 80 | 85 | 87 |
| Evaluation | Storage stability | | Excellent | Excellent | Excellent | Excellent | Excellent | Excellent |
| | Abrasion resistance | | Excellent | Excellent | Excellent | Good | Excellent | Excellent |

| | | | Examples | Comparative Example | | | |
|---|---|---|---|---|---|---|---|
| | | | 141 | 3 | 4 | 5 | 6 |
| No. of aqueous coating composition | | | 98 | 99 | 100 | 101 | 102 |
| Color pigment dispersion liquid (P) | No. of color pigment dispersion liquid (P) | | P-2 | P-1 | P-1 | P-2 | P-2 |
| | Acrylic resin (C) | Acrylic resin (C-1) | 20 | 20 | 20 | 20 | 20 |
| | Polyester resin (D) | Polyester resin (D-1) | | | | | |
| | JR-806 | | | 90 | 90 | | |
| | Baryace B-35 | | | 30 | 30 | | |
| | Carbon MA100 | | 10 | 0.8 | 0.8 | 10 | 10 |
| Acrylic urethane composite resin (AB) | No. of acrylic urethane composite resin (AB) | | AB'-1 | AB'-44 | AB'-45 | AB'-44 | AB'-45 |
| | Compounding amount of acrylic urethane composite resin (AB) | | 35 | 45 | 45 | 30 | 30 |
| Acrylic resin (C) | Acrylic resin (C-1) | | 23 | 15 | 15 | 28 | 28 |
| Curing agent (E) | Polycarbodiimide compound (E1) | CARBODILITE SV02 | 20 | 10 | 10 | 10 | 10 |
| | Melamine compound (E2) | CYMEL 325 | | 5 | 5 | 5 | 5 |
| | Blocked polyisocyanate compound (E4) | Blocked polyisocyanate compound (E4-1) | | 5 | 5 | 5 | 5 |
| Phosphate group-containing acrylic resin (R-1) | | | 2 | | | 2 | 2 |
| Gel fraction (%) | | | 83 | 65 | 61 | 58 | 53 |
| Evaluation | Storage stability | | Excellent | Good | Poor | Good | Poor |
| | Abrasion resistance | | Good | Poor | Poor | Poor | Poor |

Preparation of Coated Plate for Multilayer Coating Film Test

Example 142

"Elecron GT-10" (trade name, available from Kansai Paint Co., Ltd., cationic electrodeposition paint) was applied by electrodeposition onto a cold-rolled steel sheet chemically treated with zinc phosphate to give a cured film thickness of 20 μm to form an electrodeposited coating film, the electrodeposited coating film was heated at 170° C. for 30 minutes to cure the electrodeposited coating film, thereby preparing an object to be coated.

The aqueous coating composition No. 1 produced in Example 44 was electrostatically applied onto the object to be coated by a rotary atomizing type electrostatic coating machine as an intermediate coating composition to give a dry film thickness of 25 μm to form a coating film, and the coating film was allowed to stand for 5 minutes and then preheated at 80° C. for 3 minutes to form an uncured intermediate coating film. Next, the aqueous coating composition No. 50 produced in Example 93 was electrostatically applied onto the uncured intermediate coating film by a rotary atomizing type electrostatic coating machine as a basecoat coating composition to give a dry film thickness of 15 μm to form a coating film, and the coating film was allowed to stand for 5 minutes and then preheated at 80° C. for 3 minutes to form an uncured basecoat coating film. "KIN06510" (trade name, available from Kansai Paint Co., Ltd., a hydroxyl group/isocyanate group curable acrylic resin-urethane resin-based two-component organic solvent-based clearcoat paint) was electrostatically applied onto the uncured basecoat coating film to give a cured film thickness of 35 μm, thereby forming an uncured clearcoat coating film. The uncured clearcoat coating film was allowed to stand for 7 minutes to form an uncured multilayer coating film including the intermediate coating film, the basecoat coating film, and the clearcoat coating film. The uncured multilayer coating film was heated at 80° C. for 30 minutes to simultaneously bake the intermediate coating film, the basecoat coating film, and the clearcoat coating film to prepare a coated plate for the multilayer coating film test.

Examples 143 to 192, Comparative Examples 7 to 8

Coated plates for the multilayer coating film test were prepared in the same manner as in Example 142 except that the combination of the aqueous coating compositions in Example 142 was changed to those shown in Table 4.
Glass Adhesiveness Test A urethane-based adhesive (trade name "3740", available from Sunstar Inc., windshield agent for automobiles) was further applied onto the multilayer coating film of each of the coated plates for the multilayer coating film test prepared in Examples 142 to 192 and Comparative Examples 7 to 8 to give an applied shape having a width of 20 mm, a thickness of 3 mm, and a length of 100 mm or greater, and release paper is placed thereon and then uniformly pressed with a flat plate. After the flat plate was removed from each of the coated plates for the multilayer coating film test, the urethane-based adhesive on each of the coated plates for the multilayer coating film test was left to stand for 72 hours at a temperature of 23±2° C. and a relative humidity of 50±5% with the release paper placed thereon to be cured to form an adhesive layer. Thereafter, the release paper was peeled off from each of the coated plates for the multilayer coating film test. Next, each of the coated plates for the multilayer coating film test was immersed in a constant-temperature water bath set at 50° C. for 240 hours, and then immersed in water at 23° C. for 1 hour to be cooled, after which each of the coated plates for the multilayer coating film test was subjected to the following peeling test.

While the cured adhesive layer is pulled by hand in a direction of 90° or greater with respect to the multilayer coating film, cuts are made in the multilayer coating film with a cutter knife at intervals of 2 to 3 mm at an angle of about 60° with respect to the multilayer coating film to reach the coating film surface. A peeling state after peeling off the adhesive layer was evaluated according to the following criteria. Excellent, Good+ and Good are acceptable. The evaluation results are shown in Table 4.

Excellent: No peeling of the adhesive layer was observed, and no exposure of the multilayer coating film was observed.

Good+: The multilayer coating film is not broken, and only the adhesive layer undergoes cohesive failure and is peeled off, but adhesion between the multilayer coating film and the adhesive layer is substantially maintained.

Good: The multilayer coating film underwent cohesive failure and was peeled off, and the width thereof was less than 1 mm from a portion where a cut was made with the cutter knife.

Marginal: The multilayer coating film underwent cohesive failure and was peeled off, and the width thereof was 1 mm or greater from a portion where a cut was made with the cutter knife.

Poor: Peeling was observed at the interface between the multilayer coating film and the adhesive layer.

Chipping Resistance Test

Each of the coated plates for the multilayer coating film test prepared in Examples 142 to 192 and Comparative Examples 7 to 8 was placed on a specimen holding table of a gravel test instrument "JA-400 type" (trade name, available from Suga Test Instruments Co., Ltd., chipping resistance tester), and 50 g of crushed stone for road (S-5) described in JIS A 5001 was caused to collide with the test plate at an angle of 90° by compressed air of 0 39 MPa (4 kgf/cm2) from a position 35 cm away from the test plate at −20° C. Thereafter, the resultant test plate was washed with water and dried, and a cloth adhesive tape (available from Nichiban Co., Ltd.) was attached to the coated surface and peeled off, and then a degree of occurrence of scratches on the coating film was visually observed and evaluated according to the following criteria. Excellent and Good are acceptable. The evaluation results are shown in Table 4.

Excellent: The size of a scratch is extremely small, and neither electrodeposited surface nor the base steel sheet is exposed.

Good: The size of a scratch is small, and neither electrodeposited surface nor the base steel sheet is exposed.

Marginal: The size of a scratch is small, but the electrodeposited surface or the base steel sheet is exposed.

Poor: The size of a scratch is considerably large, and the base steel sheet is also largely exposed.

TABLE 4

| | | | Examples | | | | | | | | |
|---|---|---|---|---|---|---|---|---|---|---|---|
| | | | 142 | 143 | 144 | 145 | 146 | 147 | 148 | 149 | 150 |
| Coated plate for multilayer coating | Intermediate coating composition | No. of aqueous coating composition | 1 | 2 | 3 | 4 | 5 | 6 | 7 | 8 | 9 |

TABLE 4-continued

|  |  |  | | | | | | | | | |
|---|---|---|---|---|---|---|---|---|---|---|---|
| film test | Basecoat coating composition | No. of aqueous coating composition | 50 | 50 | 50 | 50 | 50 | 50 | 50 | 50 | 50 |
| Evaluation | Glass adhesiveness | | Excellent | Excellent | Good | Good | Excellent | Good | Good | Good | Excellent |
|  | Chipping resistance | | Excellent | Excellent | Good | Good | Good | Excellent | Excellent | Excellent | Excellent |

|  |  |  | Examples | | | | | | | | |
|---|---|---|---|---|---|---|---|---|---|---|---|
|  |  |  | 151 | 152 | 153 | 154 | 155 | 156 | 157 | 158 | 159 |
| Coated plate for multilayer coating film test | Intermediate coating composition | No. of aqueous coating composition | 10 | 11 | 12 | 13 | 14 | 15 | 16 | 17 | 18 |
|  | Basecoat coating composition | No. of aqueous coating composition | 50 | 50 | 50 | 50 | 50 | 50 | 50 | 50 | 50 |
| Evaluation | Glass adhesiveness | | Excellent | Good | Good | Excellent | Excellent | Excellent | Good | Good | Good |
|  | Chipping resistance | | Excellent | Good | Good | Excellent | Excellent | Excellent | Excellent | Excellent | Good |

|  |  |  | Examples | | | | | | | | |
|---|---|---|---|---|---|---|---|---|---|---|---|
|  |  |  | 160 | 161 | 162 | 163 | 164 | 165 | 166 | 167 | 168 |
| Coated plate for multilayer coating film test | Intermediate coating composition | No. of aqueous coating composition | 19 | 20 | 21 | 22 | 23 | 24 | 25 | 26 | 27 |
|  | Basecoat coating composition | No. of aqueous coating composition | 50 | 50 | 50 | 50 | 50 | 50 | 50 | 50 | 50 |
| Evaluation | Glass adhesiveness | | Excellent | Excellent | Excellent | Excellent | Excellent | Good | Excellent | Good | Excellent |
|  | Chipping resistance | | Good | Good | Excellent | Excellent | Good | Good | Good | Excellent | Good |

|  |  |  | Examples | | | | | | | | |
|---|---|---|---|---|---|---|---|---|---|---|---|
|  |  |  | 169 | 170 | 171 | 172 | 173 | 174 | 175 | 176 | 177 |
| Coated plate for multilayer coating film test | Intermediate coating composition | No. of aqueous coating composition | 28 | 29 | 30 | 31 | 32 | 33 | 34 | 35 | 36 |
|  | Basecoat coating composition | No. of aqueous coating composition | 50 | 50 | 50 | 50 | 50 | 50 | 50 | 50 | 50 |
| Evaluation | Glass adhesiveness | | Excellent | Good | Excellent | Excellent | Excellent | Excellent | Excellent | Excellent | Excellent |
|  | Chipping resistance | | Good | Excellent | Good | Excellent | Good | Good | Excellent | Excellent | Excellent |

|  |  |  | Examples | | | | | | | | |
|---|---|---|---|---|---|---|---|---|---|---|---|
|  |  |  | 178 | 179 | 180 | 181 | 182 | 183 | 184 | 185 | 186 |
| Coated plate for multilayer coating film test | Intermediate coating composition | No. of aqueous coating composition | 37 | 38 | 39 | 40 | 41 | 42 | 43 | 44 | 45 |
|  | Basecoat coating composition | No. of aqueous coating composition | 50 | 50 | 50 | 50 | 50 | 50 | 50 | 50 | 50 |
| Evaluation | Glass adhesiveness | | Excellent | Excellent | Excellent | Excellent | Excellent | Excellent | Excellent | Excellent | Good |
|  | Chipping resistance | | Excellent | Excellent | Excellent | Excellent | Excellent | Excellent | Excellent | Excellent | Good |

|  |  |  | Examples | | | | | | Comparative Example | |
|---|---|---|---|---|---|---|---|---|---|---|
|  |  |  | 187 | 188 | 189 | 190 | 191 | 192 | 7 | 8 |
| Coated plate for multilayer coating film test | Intermediate coating composition | No. of aqueous coating composition | 46 | 47 | 48 | 49 | 1 | 1 | 99 | 100 |
|  | Basecoat coating composition | No. of aqueous coating composition | 50 | 50 | 50 | 50 | 101 | 102 | 101 | 102 |

TABLE 4-continued

| Evaluation | Glass adhesiveness | Good | Excellent | Excellent | Good | Good | Good | Poor | Poor |
|---|---|---|---|---|---|---|---|---|---|
| | Chipping resistance | Good | Excellent | Excellent | Good | Good | Good | Poor | Good |

The invention claimed is:

1. An aqueous coating composition comprising an aqueous dispersion of acrylic urethane composite resin (AB) particles comprising:
   a urethane resin portion (A) produced from constituent components including a compound (a1) having a secondary amino group and an alkoxysilyl group and an isocyanate group-containing urethane prepolymer (a2);
   an acrylic resin portion (B) produced from constituent components including a compound (b) having a polymerizable unsaturated group and having no hydroxyl group or one hydroxyl group, and
   further containing at least one resin selected from the group consisting of an acrylic resin (C) and a polyester resin (D), wherein
   the compound (a1) having a secondary amino group and an alkoxysilyl group is produced from constituent components including a compound (a11) containing a primary amino group and an alkoxysilyl group and a polymerizable unsaturated group-containing compound (a12), and the isocyanate group-containing urethane prepolymer (a2) is produced from constituent components including a polyisocyanate component (a21) and a polyol component (a22).

2. The aqueous coating composition according to claim 1, wherein the compound (a11) containing a primary amino group and an alkoxysilyl group includes a compound (a11-1) containing a primary amino group, a secondary amino group, and an alkoxysilyl group.

3. The aqueous coating composition according to claim 1, wherein the polymerizable unsaturated group-containing compound (a12) includes (meth)acrylate.

4. The aqueous coating composition according to claim 1, wherein the polyisocyanate component (a21) includes an alicyclic polyisocyanate compound (a21-1).

5. The aqueous coating composition according to claim 1, wherein the polyol component (a22) includes at least one selected from the group consisting of a polycarbonate polyol (a22-1) and a polyether polyol (a22-2).

6. The aqueous coating composition according to claim 1, having a core-shell structure consisting of a shell portion of the urethane resin portion (A) and a core portion of the acrylic resin portion (B).

7. The aqueous coating composition according to claim 1, wherein a content of the acrylic urethane composite resin (AB) particles is in a range from 10 parts by mass to 70 parts by mass based on 100 parts by mass of a total resin solid content in the aqueous coating composition.

8. The aqueous coating composition according to claim 1, further containing a curing agent (E).

9. A method of forming a coating film, the method comprising:
   (1-1) applying the aqueous coating composition according to claim 1 onto an object to be coated to form an uncured colored coating film; and
   (1-2) heating and curing the uncured colored coating film formed in the step (1-1).

10. A method of forming a multilayer coating film, the method comprising:
   (II-1) applying the aqueous coating composition according to claim 1 onto an object to be coated to form an uncured intermediate coating film;
   (II-2) applying a basecoat coating composition onto the uncured intermediate coating film formed in the step (II-1) to form an uncured basecoat coating film;
   (II-3) applying a clearcoat coating composition onto the uncured basecoat coating film formed in the step (II-2) to form an uncured clearcoat coating film; and
   (II-4) heating and curing the uncured intermediate coating film formed in the step (II-1), the uncured basecoat coating film formed in the step (II-2), and the uncured clearcoat coating film formed in the step (II-3) at a time.

11. A method of forming a multilayer coating film, the method comprising:
   (IV-1) applying the aqueous coating composition according to claim 1 onto an object to be coated to form an uncured intermediate coating film;
   (IV-2) applying the aqueous coating composition according to claim 1 onto the uncured intermediate coating film formed in the step (IV-1) to form an uncured basecoat coating film;
   (IV-3) applying a clearcoat coating composition onto the uncured basecoat coating film formed in the step (IV-2) to form an uncured clearcoat coating film; and
   (IV-4) heating and curing the uncured intermediate coating film formed in the step (IV-1), the uncured basecoat coating film formed in the step (IV-2), and the uncured clearcoat coating film formed in the step (IV-3) at a time.

* * * * *